US012790008B2

(12) United States Patent
Carle et al.

(10) Patent No.: US 12,790,008 B2
(45) Date of Patent: Nov. 10, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US); Trevor H. Wood, Clifton Park, NY (US); Kishore Ramakrishnan, Rexford, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/358,002

(22) Filed: Oct. 14, 2025

(65) Prior Publication Data

US 2026/0035081 A1 Feb. 5, 2026

Related U.S. Application Data

(63) Continuation-in-part of application No. PCT/US2024/040754, filed on Aug. 2, 2024, which is (Continued)

(51) Int. Cl.
*B64D 27/18* (2006.01)
*B64C 11/16* (2006.01)

(52) U.S. Cl.
CPC .............. *B64D 27/18* (2013.01); *B64C 11/16* (2013.01)

(58) Field of Classification Search
CPC ....... B64D 27/12; B64C 11/305; B64C 11/48; F01D 5/022
See application file for complete search history.

(56) References Cited

U.S. PATENT DOCUMENTS

| | | | |
|---|---|---|---|
| 4,012,172 | A | 3/1977 | Schwaar |
| 4,171,183 | A | 10/1979 | Cornell |

(Continued)

FOREIGN PATENT DOCUMENTS

| | | | |
|---|---|---|---|
| FR | 3129428 | A1 | 5/2023 |
| FR | 3129436 | A1 | 5/2023 |

(Continued)

OTHER PUBLICATIONS

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.

(Continued)

*Primary Examiner* — Joshua J Michener
*Assistant Examiner* — Cindi M Curry
(74) *Attorney, Agent, or Firm* — Fitch, Even, Tabin & Flannery LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

14 Claims, 22 Drawing Sheets

Related U.S. Application Data a continuation-in-part of application No. 18/652,052, filed on May 1, 2024, now Pat. No. 12,384,522, and a continuation-in-part of application No. 18/230,609, filed on Aug. 4, 2023, now Pat. No. 12,365,471.

(56) References Cited

U.S. PATENT DOCUMENTS

| | | | | |
|---|---|---|---|---|
| 4,370,097 | A | 1/1983 | Hanson | |
| 4,730,985 | A | 3/1988 | Rothman | |
| 4,971,641 | A | 11/1990 | Nelson | |
| 5,079,916 | A | 1/1992 | Johnson | |
| 5,102,302 | A | 4/1992 | Schilling | |
| 5,135,185 | A | 8/1992 | Adamson | |
| 5,136,185 | A | 8/1992 | Fleming | |
| 6,328,533 | B1 | 12/2001 | Decker | |
| 6,358,003 | B2 | 3/2002 | Schlechtriem | |
| 7,476,086 | B2 | 1/2009 | Wadia | |
| 8,083,487 | B2 | 12/2011 | Wood | |
| 8,221,081 | B2 | 7/2012 | Lebrun | |
| 8,317,482 | B2 | 11/2012 | Bois | |
| 8,714,475 | B2 | 5/2014 | Gall | |
| 8,944,774 | B2 | 2/2015 | Bielek | |
| 9,242,721 | B2 | 1/2016 | Neuteboom | |
| 9,249,666 | B2 | 2/2016 | Wood | |
| 9,340,277 | B2 | 5/2016 | Breeze-Stringfellow | |
| 9,347,323 | B2 | 5/2016 | Gallagher | |
| 9,567,090 | B2 | 2/2017 | Gallet | |
| 9,593,582 | B2 | 3/2017 | Dejeu | |
| 9,630,704 | B2 | 4/2017 | Vion | |
| 9,759,160 | B2 | 9/2017 | Sankrithi | |
| 9,776,707 | B2 | 10/2017 | Louet | |
| 10,040,559 | B2 | 8/2018 | Hoisington | |
| 10,113,431 | B2 | 10/2018 | Namgoong | |
| 10,202,865 | B2 | 2/2019 | Breeze-Stringfellow | |
| 10,316,669 | B2 | 6/2019 | Romero | |
| 10,358,926 | B2 | 7/2019 | Tweedt | |
| 10,358,938 | B2 | 7/2019 | Romano | |
| 10,370,086 | B2 | 8/2019 | Vion | |
| 10,442,541 | B2 | 10/2019 | Miller | |
| 10,465,520 | B2 | 11/2019 | Vandeputte | |
| 10,669,881 | B2 | 6/2020 | Breeze-Stringfellow | |
| 10,710,705 | B2 | 7/2020 | Tweedt | |
| 10,837,286 | B2 | 11/2020 | Jain | |
| 10,907,495 | B2 | 2/2021 | Breeze-Stringfellow | |
| 10,907,648 | B2 | 2/2021 | Vogiatzis | |
| 11,136,109 | B2 | 10/2021 | Wood | |
| 11,168,567 | B2 | 11/2021 | Gondre | |
| 11,187,083 | B2 | 11/2021 | Stauter | |
| 11,203,935 | B2 | 12/2021 | Hiernaux | |
| 11,371,357 | B2 | 6/2022 | De Gaillard | |
| 11,608,743 | B1 | 3/2023 | Tweedt | |
| 12,000,344 | B2 | 6/2024 | Levisse | |
| 12,215,596 | B2 | 2/2025 | Ramakrishnan | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,359,588 | B1 * | 7/2025 | Khalid | F01D 21/003 |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 2012/0119023 | A1 | 5/2012 | Moore | |
| 2013/0115083 | A1 | 5/2013 | Vuillemin | |
| 2018/0010613 | A1 | 1/2018 | Martin | |
| 2018/0362170 | A1 * | 12/2018 | Stuart | B64D 27/12 |
| 2019/0048724 | A1 | 2/2019 | Tweedt | |
| 2019/0185170 | A1 | 6/2019 | Schelfaut | |
| 2022/0065118 | A1 | 3/2022 | Kray | |
| 2022/0268159 | A1 | 8/2022 | Postec | |
| 2023/0021836 | A1 | 1/2023 | Riddle | |
| 2023/0076976 | A1 | 3/2023 | Ostdiek | |
| 2024/0328320 | A1 | 10/2024 | Ramakrishnan | |
| 2024/0410319 | A1 | 12/2024 | Becoulet | |
| 2025/0018895 | A1 | 1/2025 | Howell | |
| 2025/0042537 | A1 | 2/2025 | Carle | |
| 2025/0042538 | A1 | 2/2025 | Carle | |
| 2025/0042558 | A1 | 2/2025 | Carle | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Olivier | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |
| 2026/0015090 | A1 | 1/2026 | Carle | |

FOREIGN PATENT DOCUMENTS

| | | | |
|---|---|---|---|
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |
| WO | 2025034565 | | 2/2025 |

OTHER PUBLICATIONS

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published February/Mar. 2016 Issue (Oct. 26, 2017); https://www.armadainternational.com/2017/10/airbus-a400m-strategic-turboprop-freighter-programme/; 9 pgs.

Groeneweg et al., Advanced Propeller Research, N88-15806, NASA Technical Reports Server, pp. 5-123 to 5-152. Retrieved Dec. 1, 2022 from Webpage https://core.ac.uk/reader/42833770.

Tangopaso, A400M Propeller (Hamilton-Sundstrand) Retrieved Mar. 29, 2023 from weblink https://commons.wikimedia.org/wiki/File:A400M_Propeller_%28Hamilton-Sundstrand%29.jpg.

U.S. Appl. No. 17/994,549, filed Nov. 28, 2022.

U.S. Appl. No. 17/994,549, filed Nov. 28, 2022. (GECV-2222).

U.S. Appl. No. 18/192,859, filed Mar. 30, 2023. (GECV-2263).

Ziemianski et al., NASA/Industry Advanced Turboprop Technology Program, ICAS-88-0.6, 14 Pages. Retrieved Dec. 1, 2022 from Webpage https://www.icas.org/ICAS_ARCHIVE/ICAS1988/ICAS-88-0.6.

* cited by examiner

AIRCRAFT WITH AN UNDUCTED FAN PROPULSOR

CROSS-REFERENCE TO RELATED APPLICATION

This application is a continuation-in-part of International Appl. No. PCT/US2024/040754, filed Aug. 2, 2024, which claims priority to U.S. patents application Ser. No. 18/230,609, filed on Aug. 4, 2023, and Ser. No. 18/652,052, filed May 1, 2024, the latter of which is a continuation-in-part of the former, the disclosures of which are hereby incorporated by reference in their entireties.

FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Figure 1:
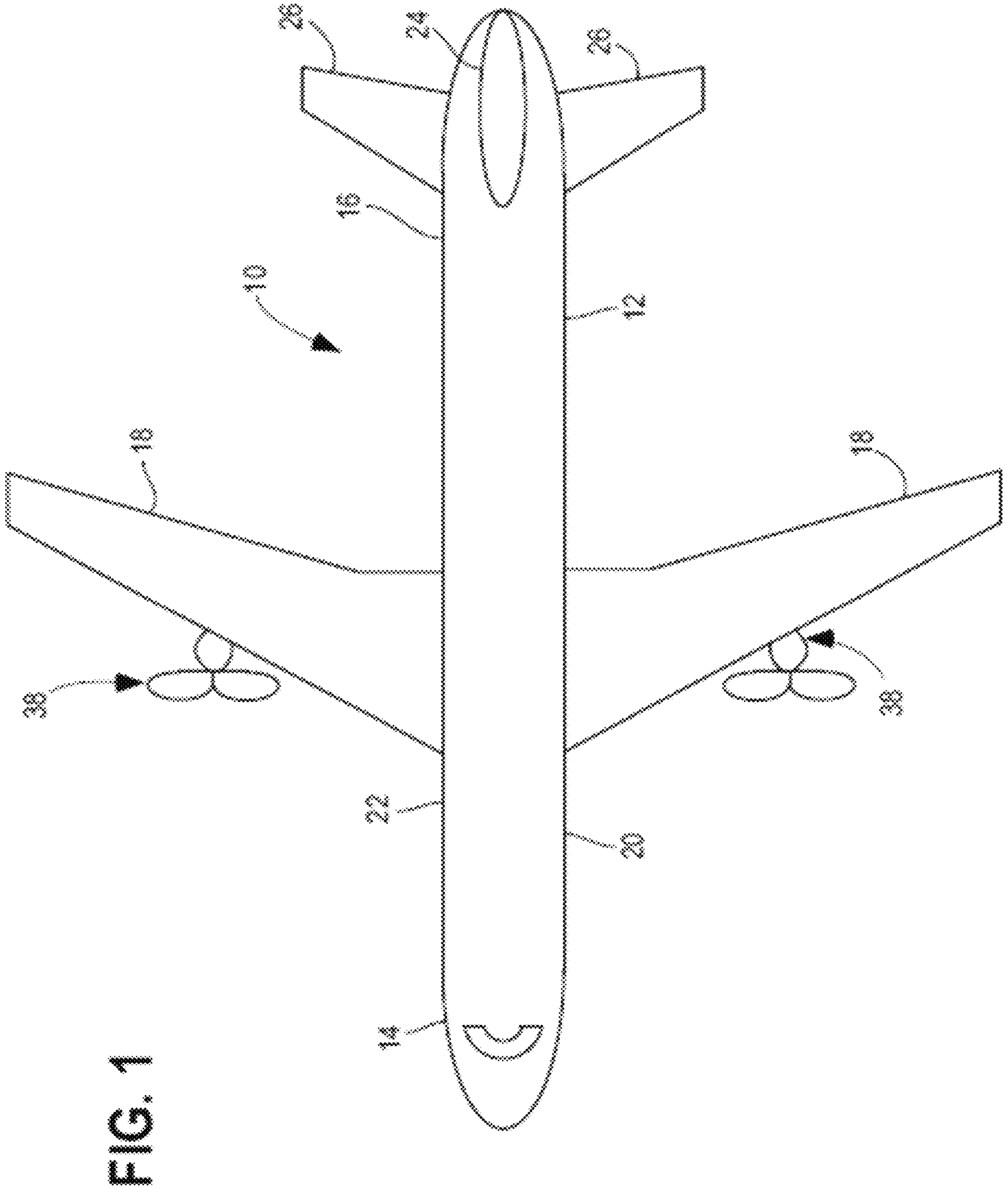
FIG. 1 comprises a top plan view of an aircraft as configured in accordance with various embodiments of these teachings, with undermounted, unducted fan propulsors mounted on forward wings of the aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like refer to both direct coupling, fixing, or attaching, as well as indirect coupling, fixing, or attaching through one or more intermediate components or features, unless otherwise specified herein.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

The terms "coupled", "fixed", "attached to", and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Airfoil section" and "effective quarter chord point (QC)" are defined as follows.

Figure 6A:
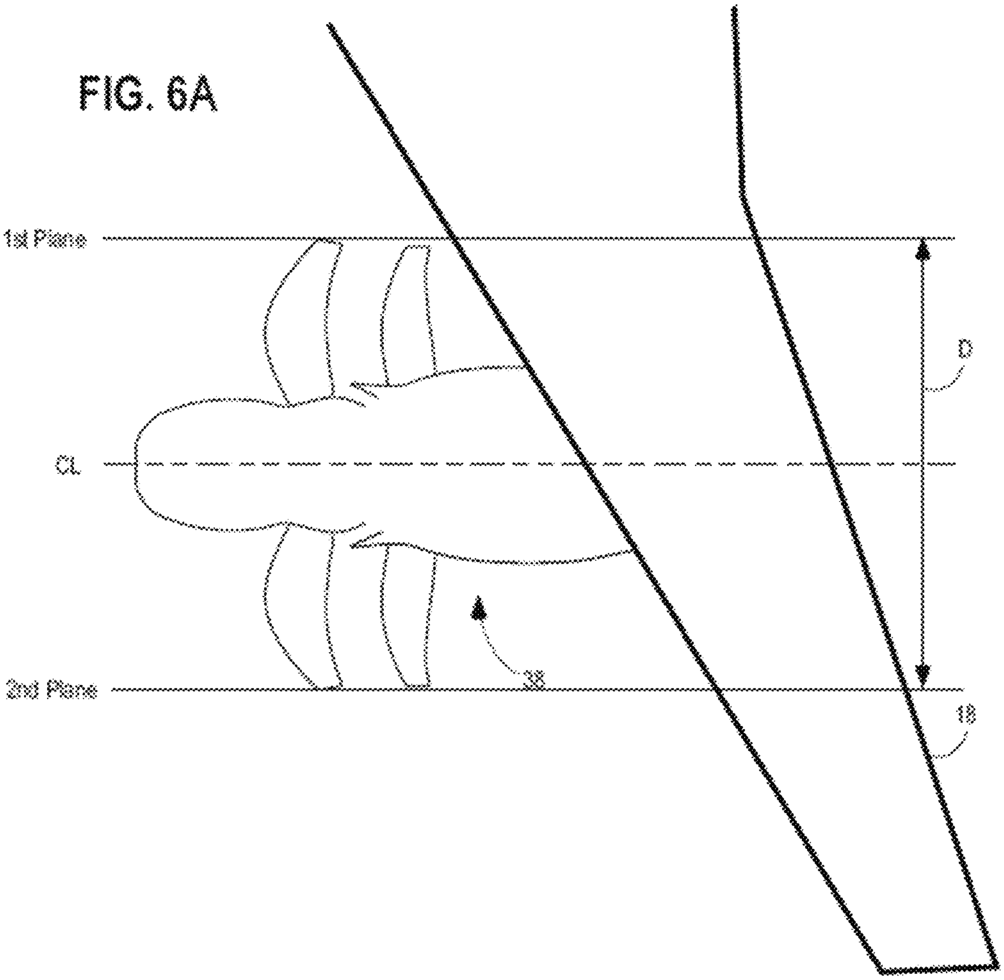
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
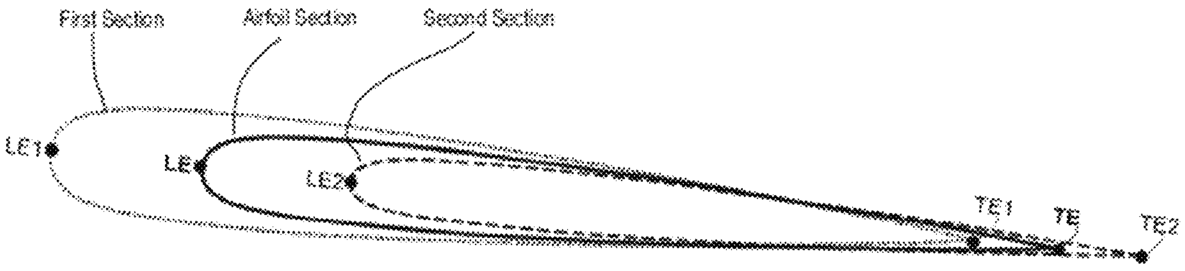
FIG. 6B comprises a schematic side elevation view of a first section and a second section of the aircraft wing, which sections are used to determine an effective quarter chord point (QC) of the airfoil section in FIG. 4.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

"Cruise Speed" refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

It is understood that the plurality blades, whether forward or rearward, may have a variation of root forward-most points and root rearward-most points. This can be due to both installed position as well as orientation in the case of variable pitch blades. For purposes of defining the distances TRL, RTL, and VTL it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

Figure 3:
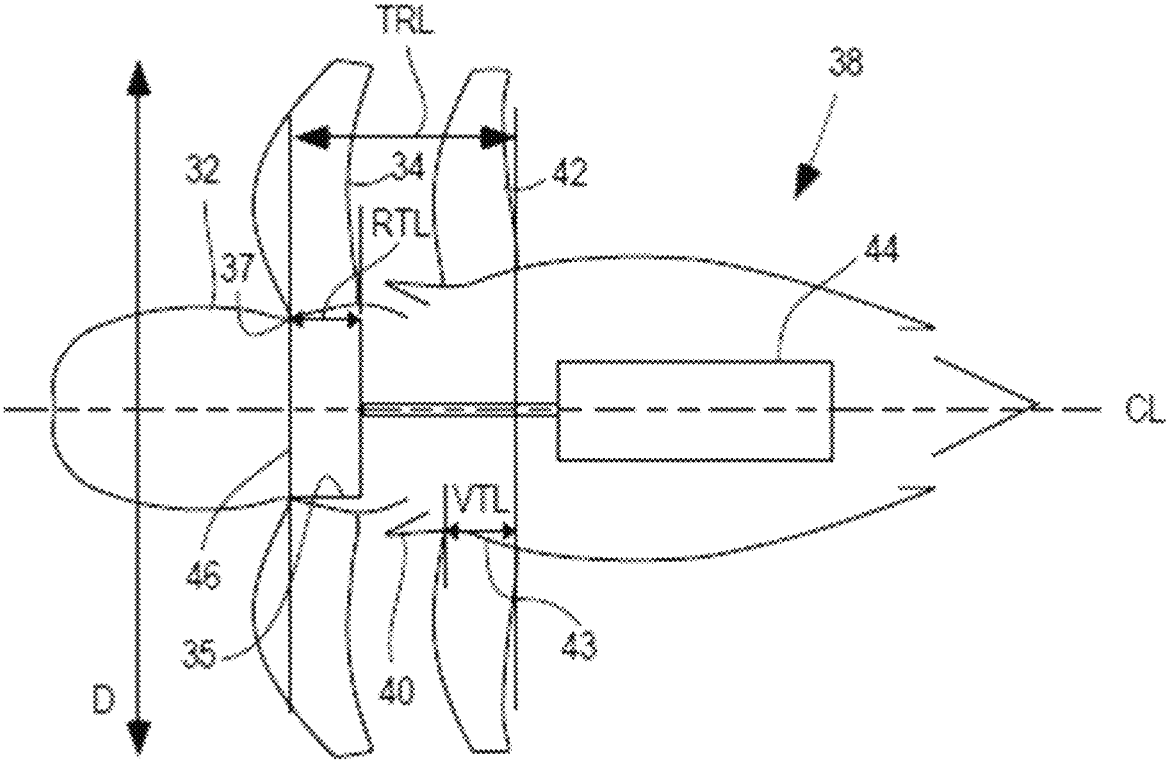
FIG. 3 comprises an elevational cross-sectional view of an exemplary unducted fan propulsor having a plurality of blades arranged in a forward array and a rearward array.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIG. 3 depicts an unducted fan propulsor. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

As used herein, the terms "axial" and "axially" refer to directions and orientations that extend substantially parallel to a centerline of the gas turbine engine. Moreover, the terms "radial" and "radially" refer to directions and orientations that extend substantially perpendicular to the centerline of the gas turbine engine. In addition, as used herein, the terms "circumferential" and "circumferentially" refer to directions and orientations that extend arcuately about the centerline of the gas turbine engine.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

It was surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 2:
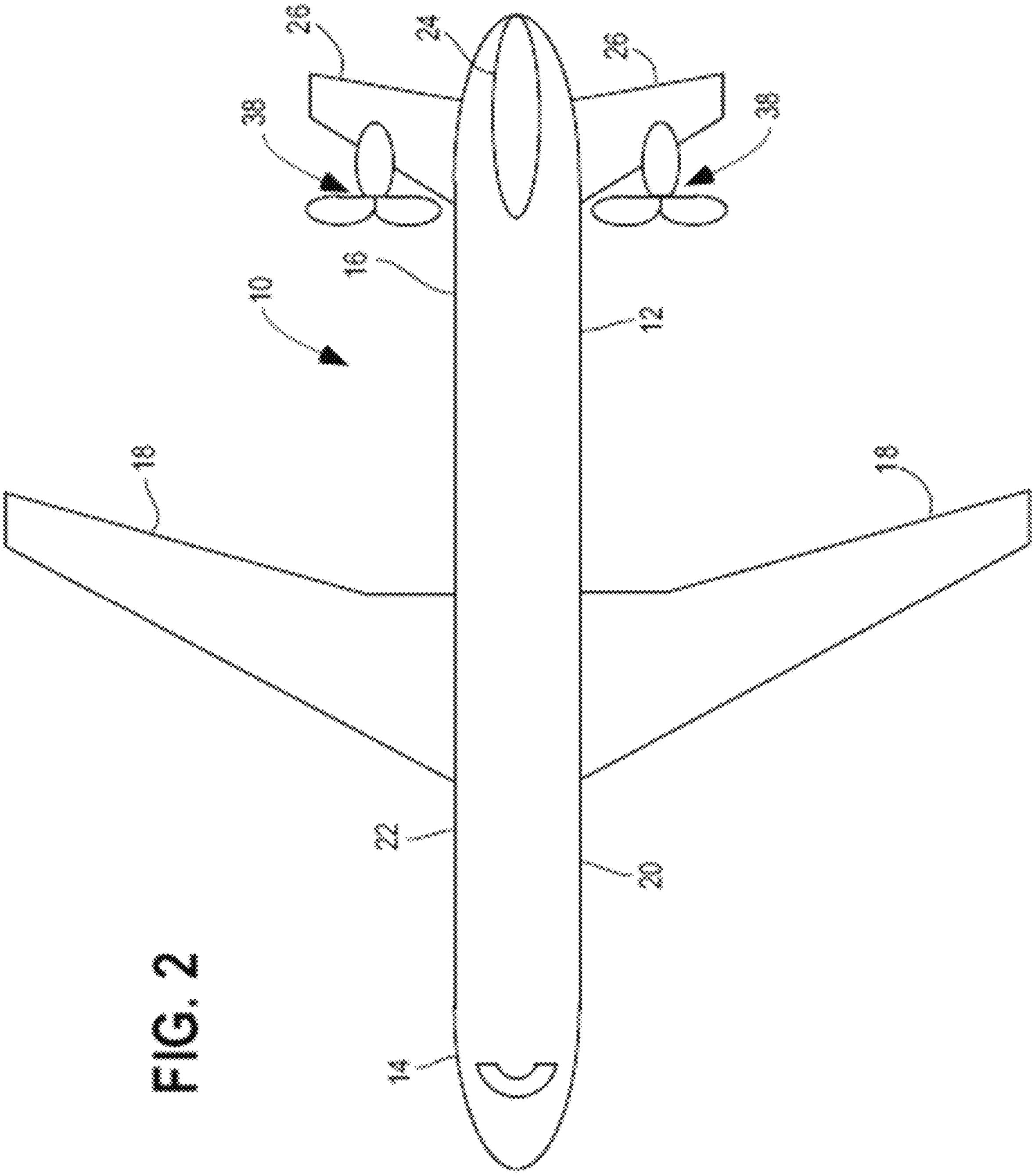
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
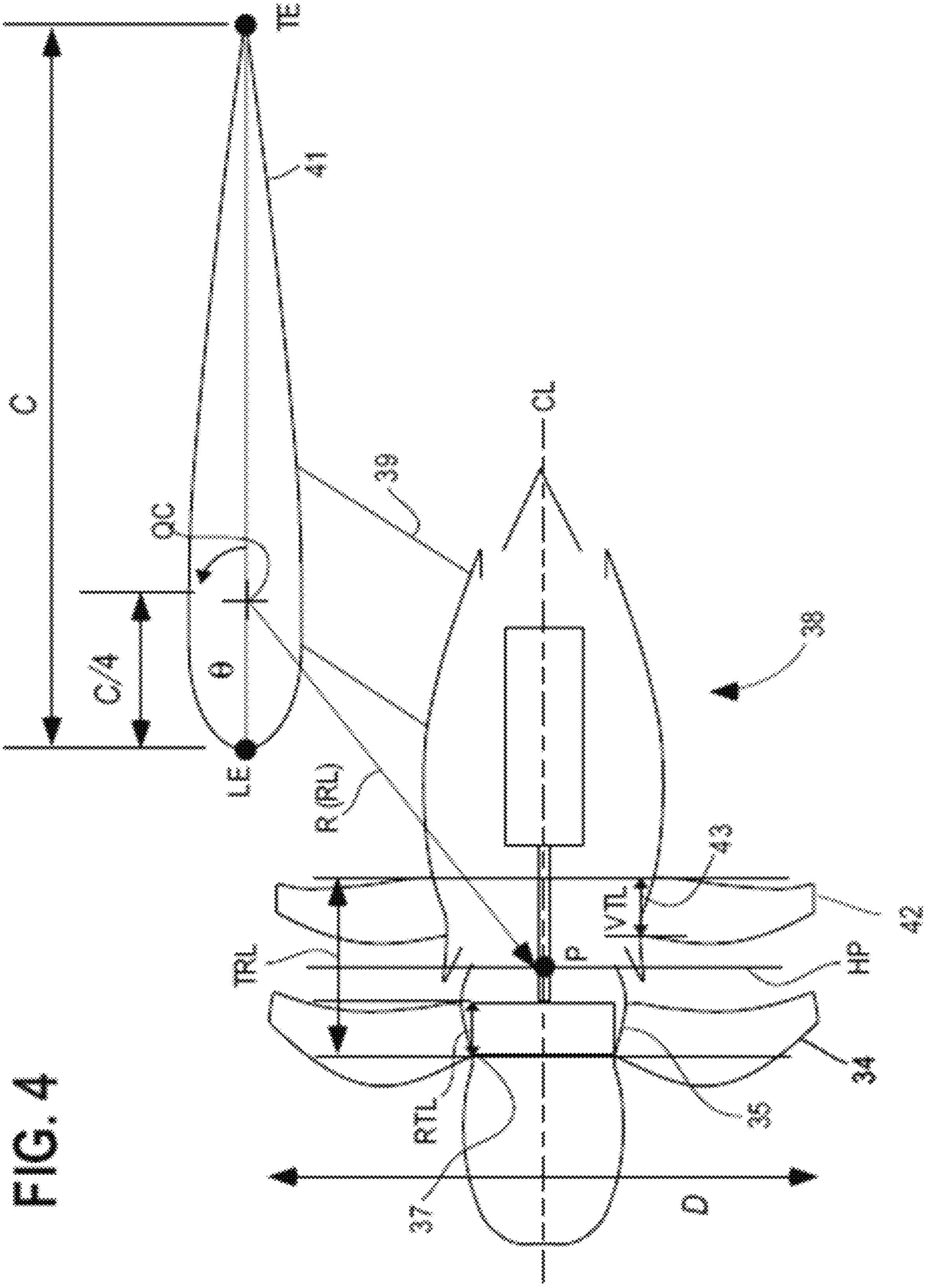
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades or vanes 34 and a second array of blades or vanes 42, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 may be a gas turbine engine and associated transmission 46. Transmission 46 delivers torque from the drive mechanism 44 to the propeller assembly 32. The transmission system can be configured as a direct drive engine, transferring power from a power turbine or low pressure turbine (LPT) to the propeller assembly, or an indirect drive system where torque from the LPT is transferred to the propeller assembly 32 through a gearbox. The gearbox reduces a rotation speed of the drive shaft to match a desired rotational speed for the propeller assembly 32. The gas turbine engine includes in serial order a compressor, combustor, high pressure turbine and the LPT. In other embodiments the drive mechanism may generate power partially or fully by an electric motor. In the former case the drive mechanism is a hybrid electric drive mechanism including a gas turbine engine where a drive shaft includes an electric motor-generator for generating torque. In the latter case the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5A:
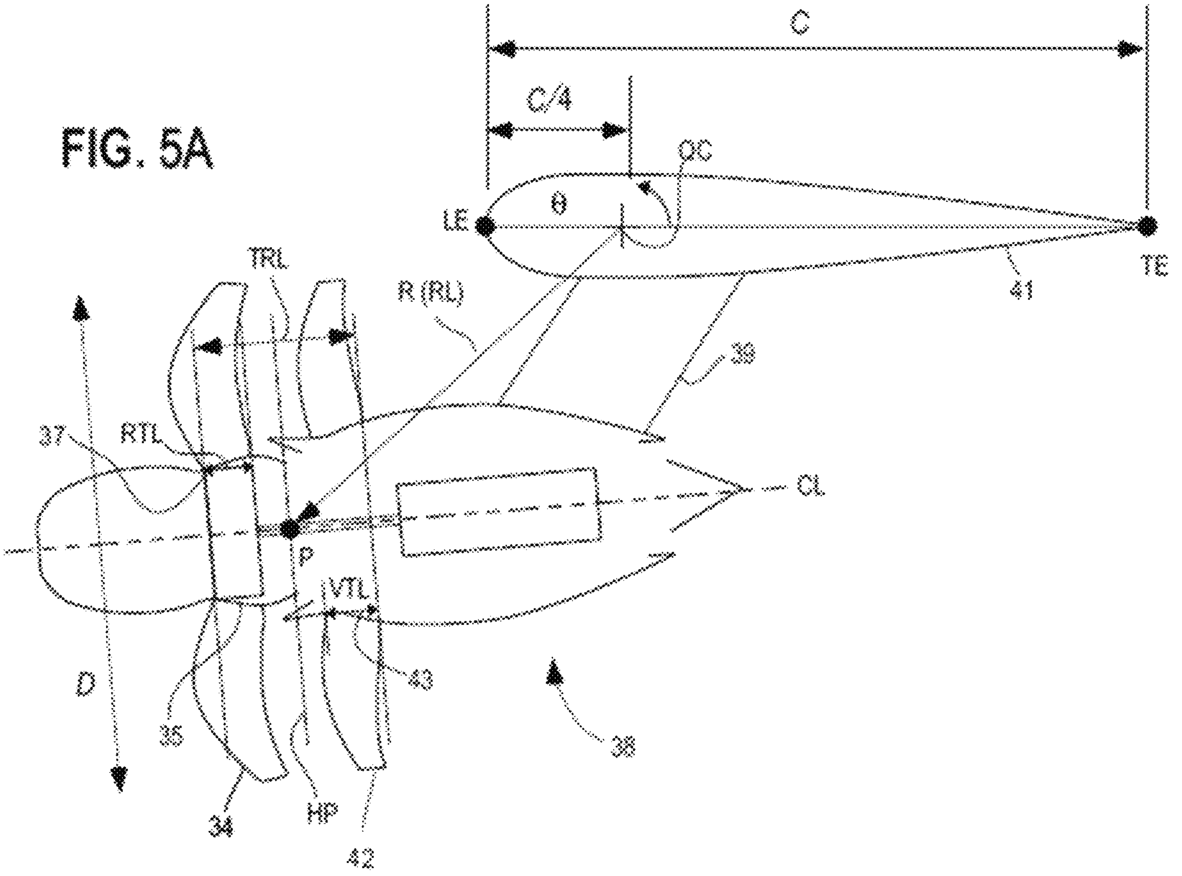
FIG. 5A is a schematic side elevation view similar to FIG. 4 and showing the unducted fan propulsor pitched downward relative to the airfoil section.
Figure 5B:
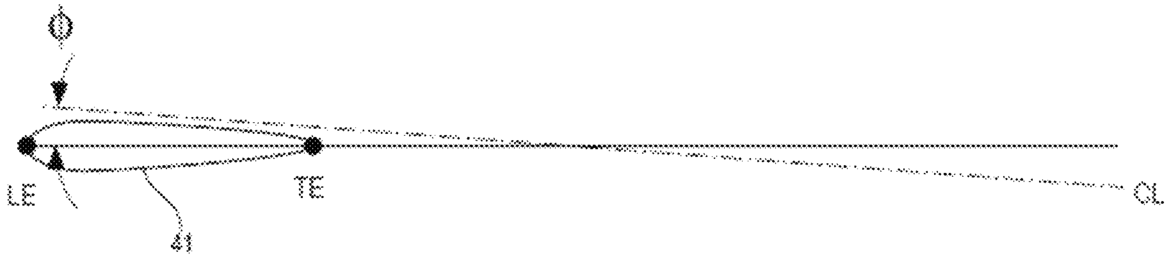
FIG. 5B defines a pitch angle Φ for the unducted fan propulsor relative to a chord line of the airfoil section in FIG. 4.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A. FIG. 5B defines a pitch angle Φ for the propulsor 38, which is the angle spanned between the propulsor centerline CL and chord line C. Positive pitch corresponds to a clockwise rotation of CL relative to C. The pitch angle Φ can be fixed or variable during flight. For underwing installations, the pitch angle Φ can vary between −5 and +2 degrees, or it can vary between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle Φ can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
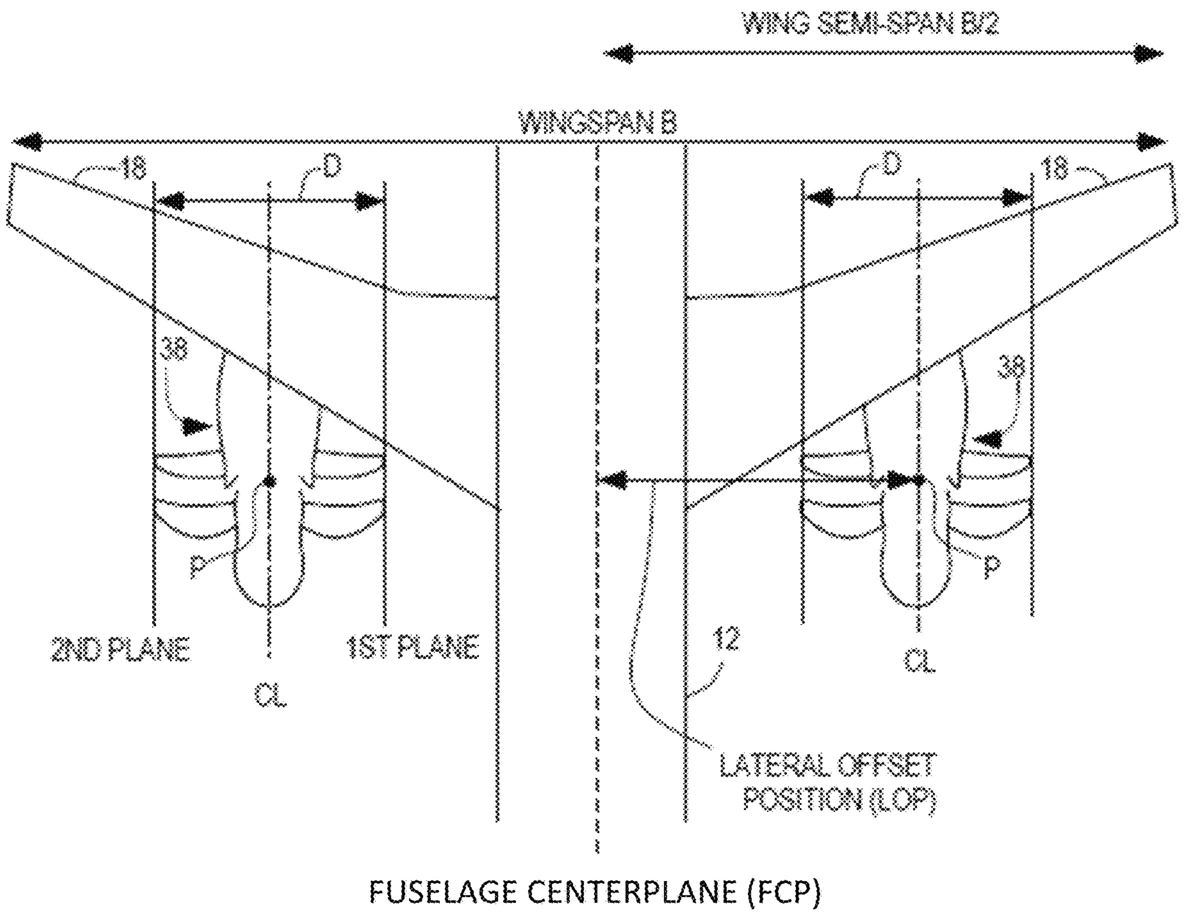
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
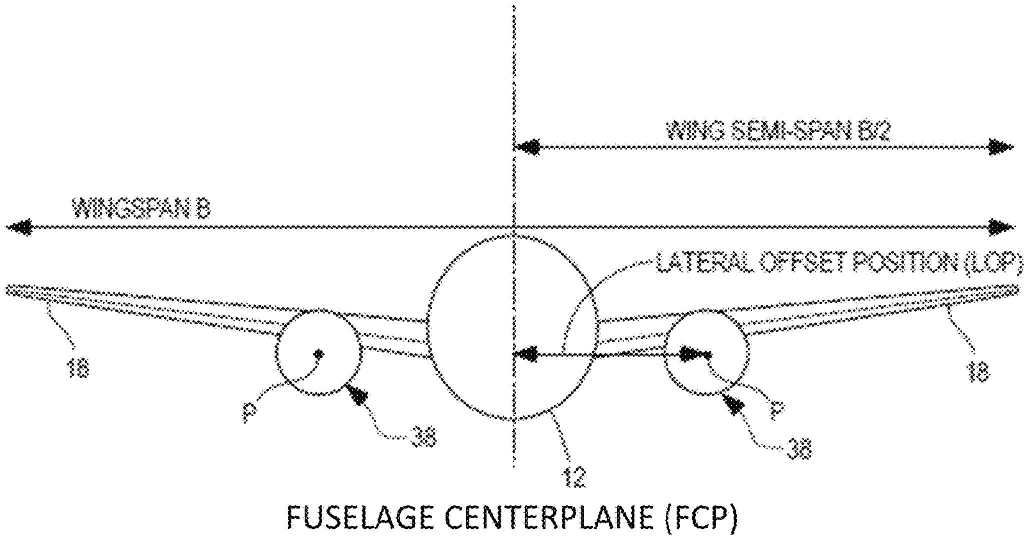
FIG. 6D comprises a schematic front elevation view of the aircraft portion of FIG. 6C.
Figure 6E:
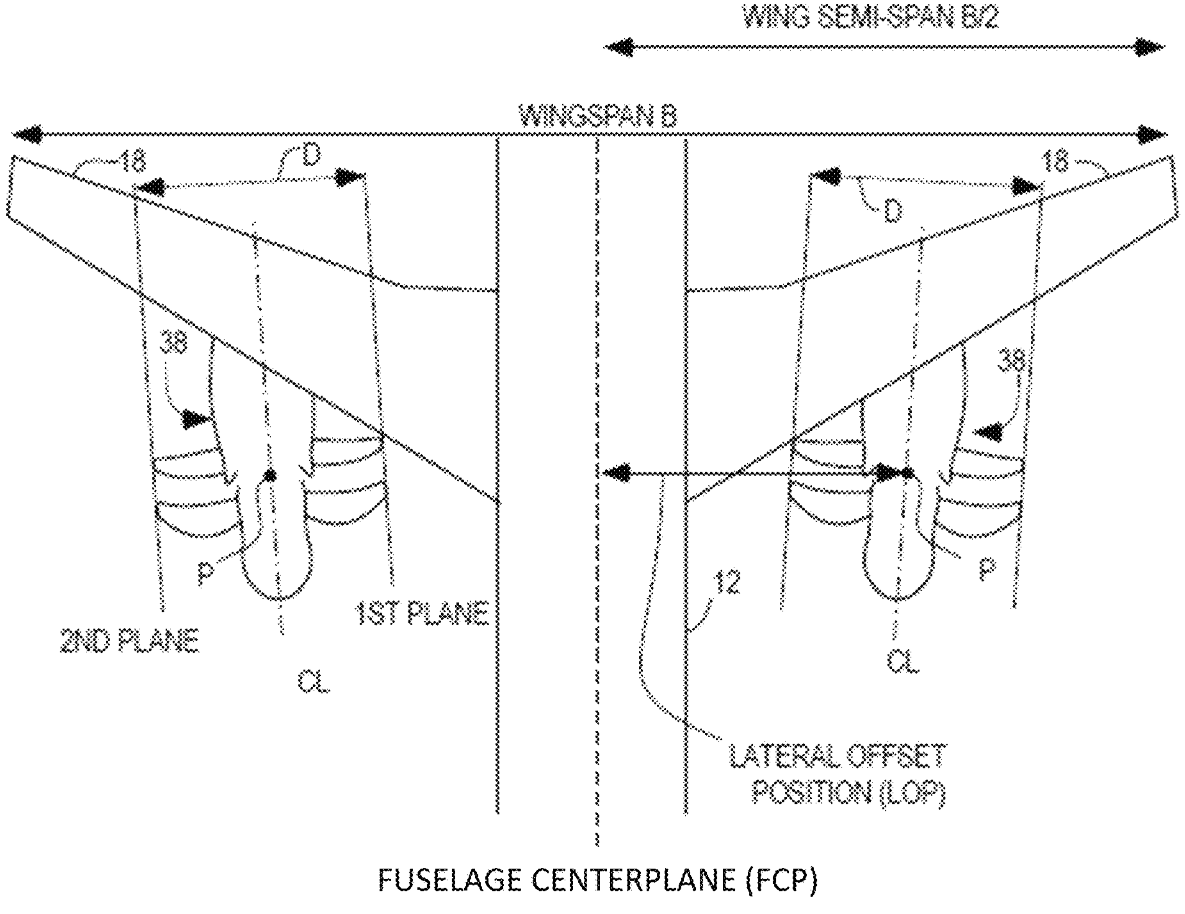
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), θ is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
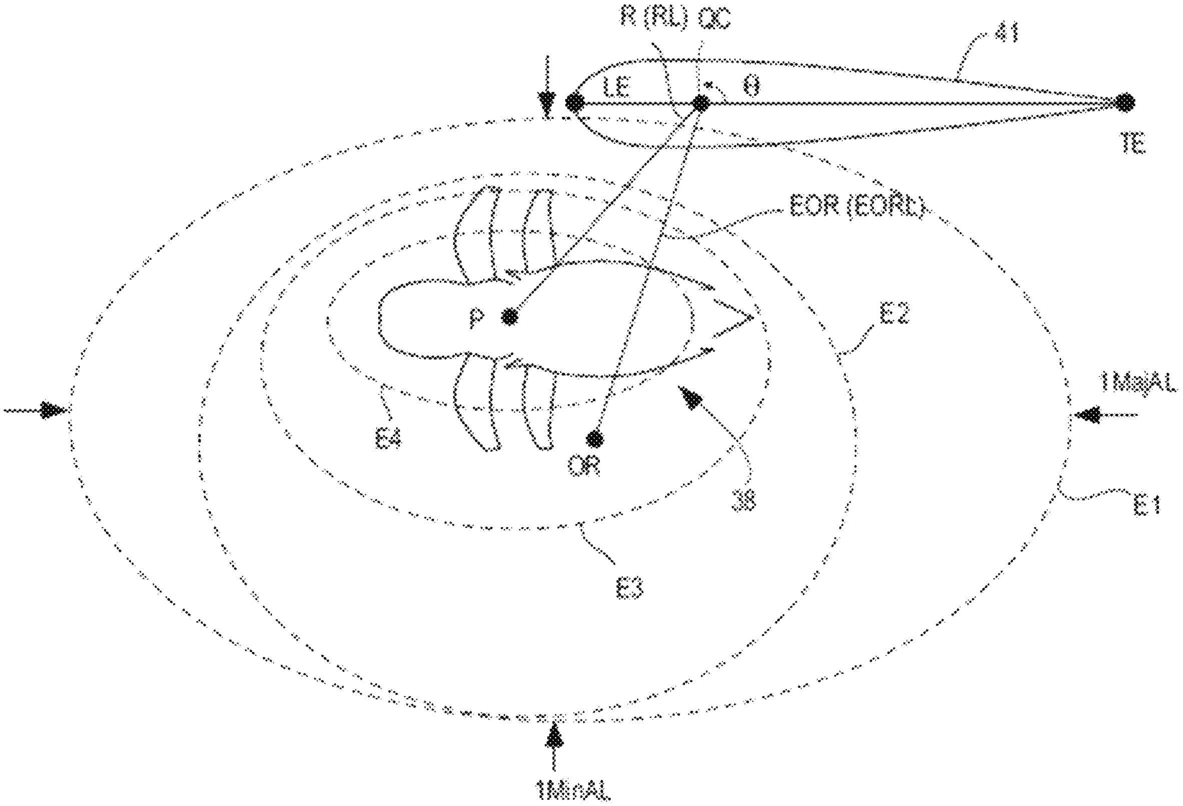
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
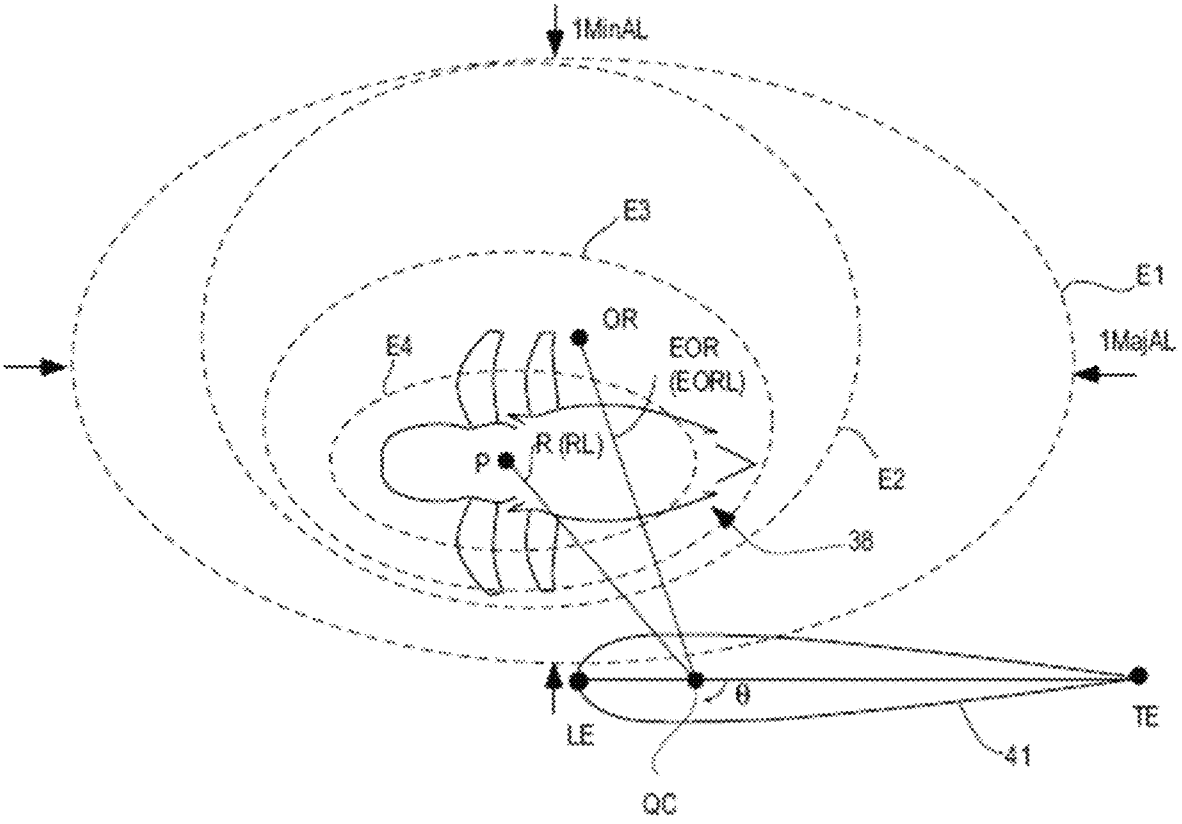
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/Dis 2.8 and 1MinAL/Dis 1.7. A unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2MajAL) and a second minor axis length (2MinAL), where 2MajAL/D is 1.86 and 2MinAL/D is 1.56. A unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. A unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. A unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D} + \frac{\left(\sqrt{a*\left[b*\sin^2(\theta) - c*\cos^2(\theta) + d*\sin(\theta)*\cos(\theta)\right]} + e*\sin(\theta) + f*\cos(\theta)\right)}{g*\sin^2(\theta) + h*\cos^2(\theta)} > 0$$

and $$\frac{RL}{D} + \frac{\left(-\sqrt{a*\left[b*\sin^2(\theta) - c*\cos^2(\theta) + d*\sin(\theta)*\cos(\theta)\right]} + e*\sin(\theta) + f*\cos(\theta)\right)}{g*\sin^2(\theta) + h*\cos^2(\theta)} < 0$$

where 0.07<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and 0 is between 199° and 306°, and where a, b, c, d, e, f, g and h have the values set forth in the above table under the heading "Sixth Emb."

In a seventh embodiment, the point P of the unducted fan propulsor 38 can be defined by the above expression, but where 0.369<RL/D<1.43 and 0 is between 204° and 291°, and where a, b, c, d, e, f, g and h have the values set forth in the above table under the heading "Seventh Emb.".

In an eighth embodiment, the point P of the unducted fan propulsor 38 can be defined by the above expression, but where 0.477<RL/D<0.9455 and 0 is between 211° and 274°, And where a, b, c, d, e, f, g and h have the values set forth in the above table under the heading "Eighth Emb."

Figure 7:
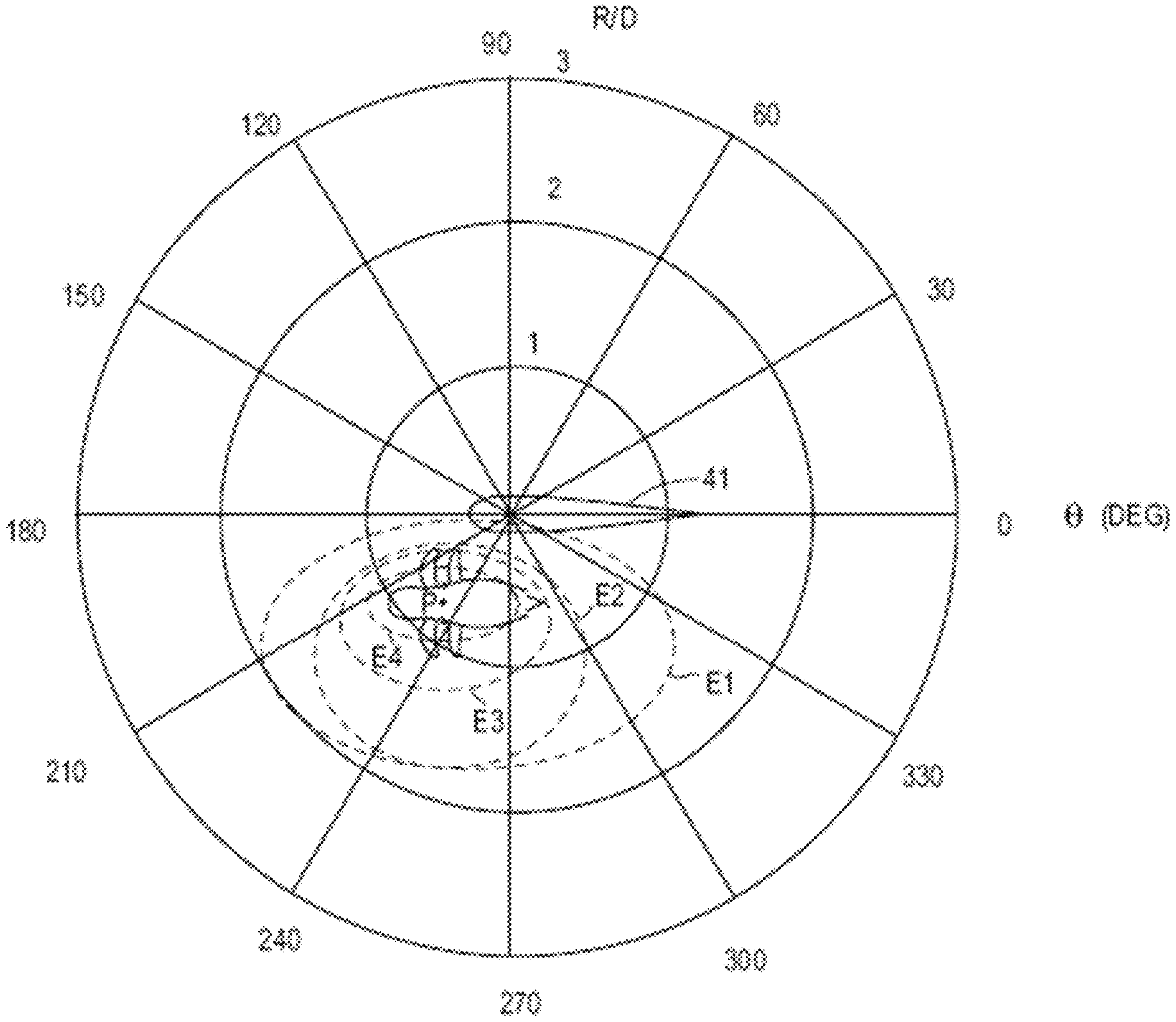
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
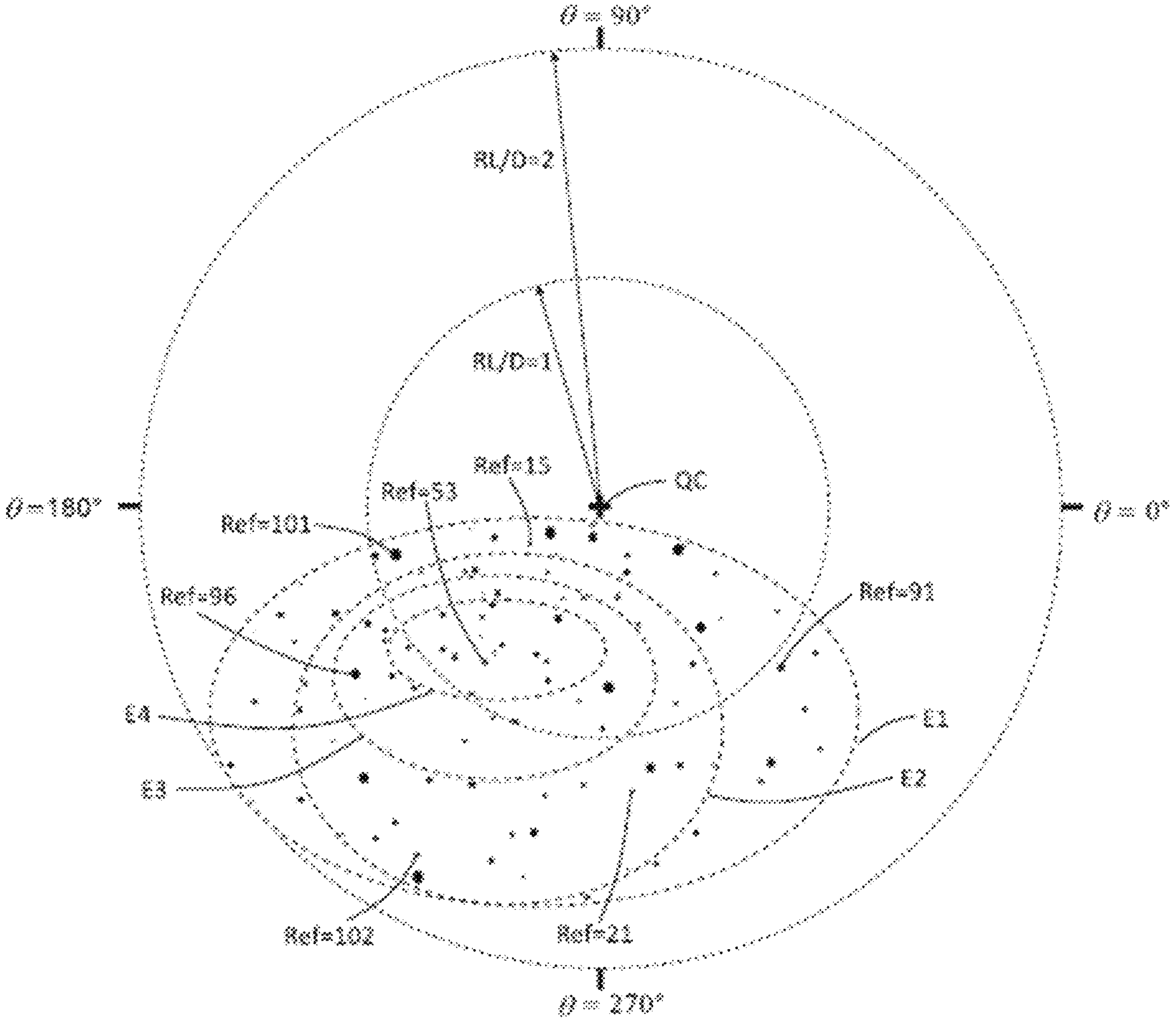
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref." refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2-50, 8-16, 10-15, 12-14, or 14-16 feet.

TABLE 1

P-location relative to airfoil section quarter chord point

| Ref. | Type of aircraft | RL | D | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
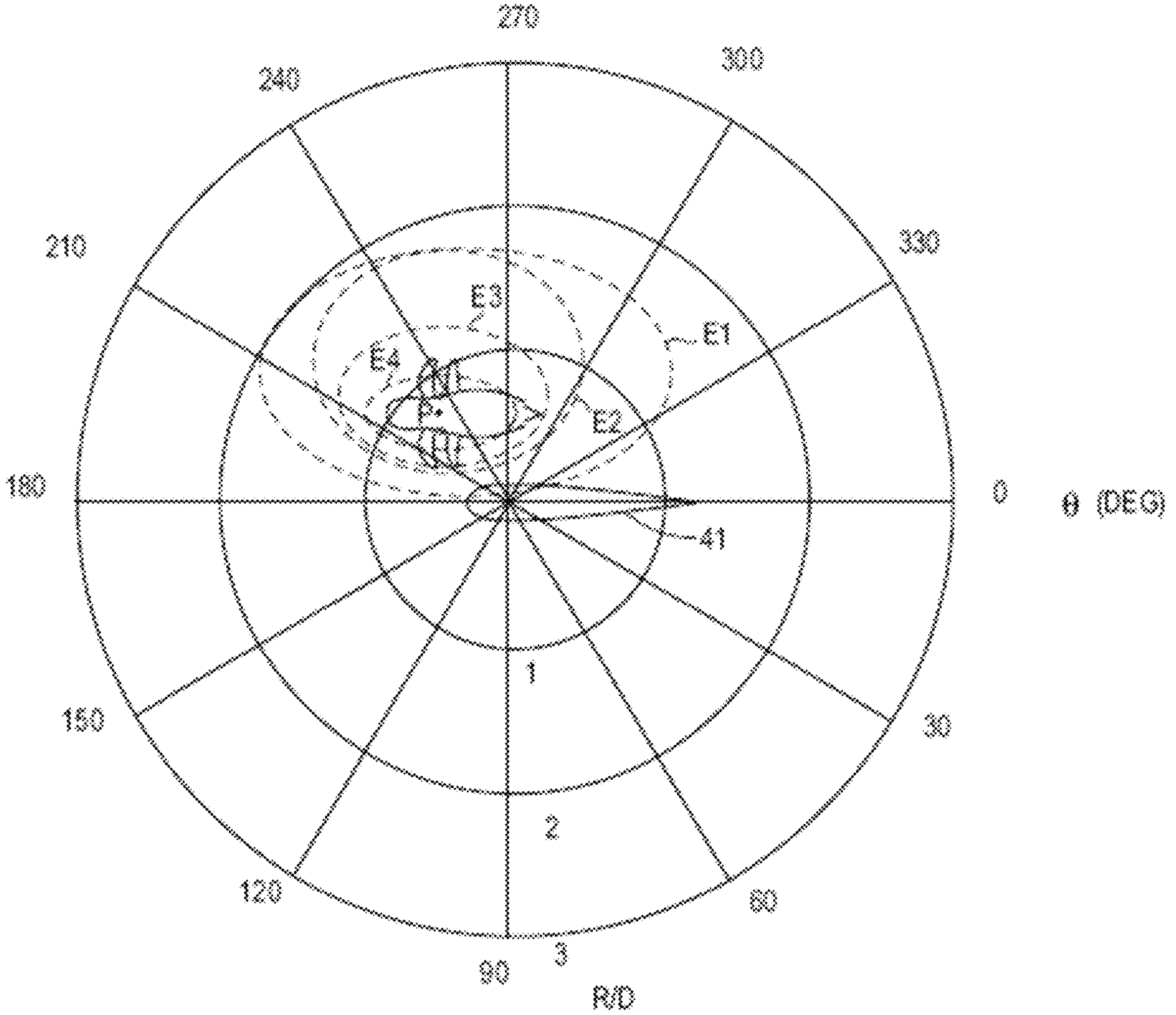
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15\frac{F_{net}}{\rho_0 A_{an} V_0^2} > 0.06.$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

Further improvements can be made with respect to the fan blades for an unducted fan engine by increasing the sweep and/or dihedral of a fan blade near the tip of the fan blade and/or by configuring an outer or tip portion of the fan blade to have a defined lean to minimize cruise flight condition pressure signatures. Combining the features of a fan blade with increased sweep and/or dihedral near the tip of the fan blade, and/or having an outer tip portion of the fan blade with a defined lead, with the features of the positioning of the propulsor relative to the aircraft wing by defining a P location between external OGV or IGV and a forward or aft rotating array of fan blades, respectively, and/or defining the distance from the effective QC to P, as described above, can result in synergistic effects to improve aerodynamic performance of the aircraft, by minimizing weight and reducing noise. Minimizing weight of fan blades and/or reducing noise may be particularly important for unducted fan engines, which include large and noisy fan blades.

Furthermore, the positioning of the propulsor relative to the aircraft wing, as described above, improves performance via the aerodynamics effects described herein, but the resulting improvements may amplify the flow distortion that the fan will be subjected to as compared to an isolated or undistorted flowfield. Increasing the sweep and/or dihedral of a fan blade near the tip of the fan blade, as described below, can improve upon the cabin noise (e.g., at cruise speeds) and/or community noise (e.g., at takeoff) without reference to installed distortion flow effects.

Moving the belly of a fan blade outboard past the halfway point of the tip radius of the fan blade results in noise reduction, particularly the reduction of cabin noise during a cruise portion of a flight. Increasing the chord length of a fan blade in a region outboard of the halfway point of the tip radius of the fan blade reduces community noise at takeoff. However, these adjustments to the shape of the fan blade may not, by themselves, provide any guidance on addressing installed distortion noise. Thus, combining the movement of the belly of the fan blade outboard past the halfway point of the tip radius of the fan blade, and/or increasing the chord length of the fan blade in a region outboard of the halfway point of the tip radius of the fan blade, with the positioning of the propulsor relative to the aircraft wing, as described above, may be further improved upon to account for installed distortion noise effects. Adding a dihedral shape to the suction side of the fan blade, and/or adjusting the leading edge thickness distribution of the fan blade, as further described below, may further reduce the noise generated by the fan blade. In particular, these adjustments may further reduce community noise during takeoff for an unducted fan propulsor.

Additionally, the adjustments to the shape of the fan blade described in the preceding paragraph (and further elaborated upon below) may reduce the installed weight of the fan for an unducted fan propulsor positioned relative to the wing as described above. The reduced weight of the fan improves the installed aeroacoustic capability, resulting in further improved performance of the unducted fan propulsor and reducing the noise generated by the unducted fan propulsor.

In certain aspects of the present disclosure, an unducted blade airfoil assembly is provided. The unducted blade airfoil assembly generally includes circumferentially spaced blade airfoils, sometimes referred to herein as "blades". The blade defines a leading edge and a trailing edge, and further defining a root and a tip extending radially to define a span of the blade airfoil. In some embodiments, a forward-most axial point of the leading edge is located at or greater than sixty percent of a tip radius of the blade airfoil. In some embodiments, a maximum chord extending from the leading edge to the trailing edge is located at or greater than sixty percent of the tip radius. Embodiments of the present disclosure increase the sweep and dihedral of the blade near the tip of the blade to reduce noise radiated by the blade. Embodiments of the present disclosure reduce noise at cruise and landing and takeoff (LTO) flight conditions while minimizing weight and mechanical complexity by localizing sweep in the acoustically sensitive portions of the blade by tailoring the chord and axial position of the leading edge of the blade. Additionally, a maximum thickness of the blade is moved closer to the leading edge in the acoustically sensitive portions of the blade.

In certain additional aspects of the present disclosure, an unducted blade airfoil assembly for a turbomachine is provided. The unducted blade airfoil assembly generally includes circumferentially spaced blade airfoils. Each blade airfoil has spaced-apart pressure and suction sides extending radially in span from a root to a tip, and extending axially in chord between spaced apart leading and trailing edges. The blade airfoil is arranged around a longitudinal axis and rotates about the longitudinal axis in a rotational direction. In some embodiments, the outer or tip portion of the blade airfoil is configured having a defined lean to minimize cruise flight condition pressure signatures. Embodiments of the present disclosure reduce noise by moving a maximum thickness of the blade airfoil closer to the leading edge in the acoustically sensitive portions of the blade airfoil.

Figure 12:
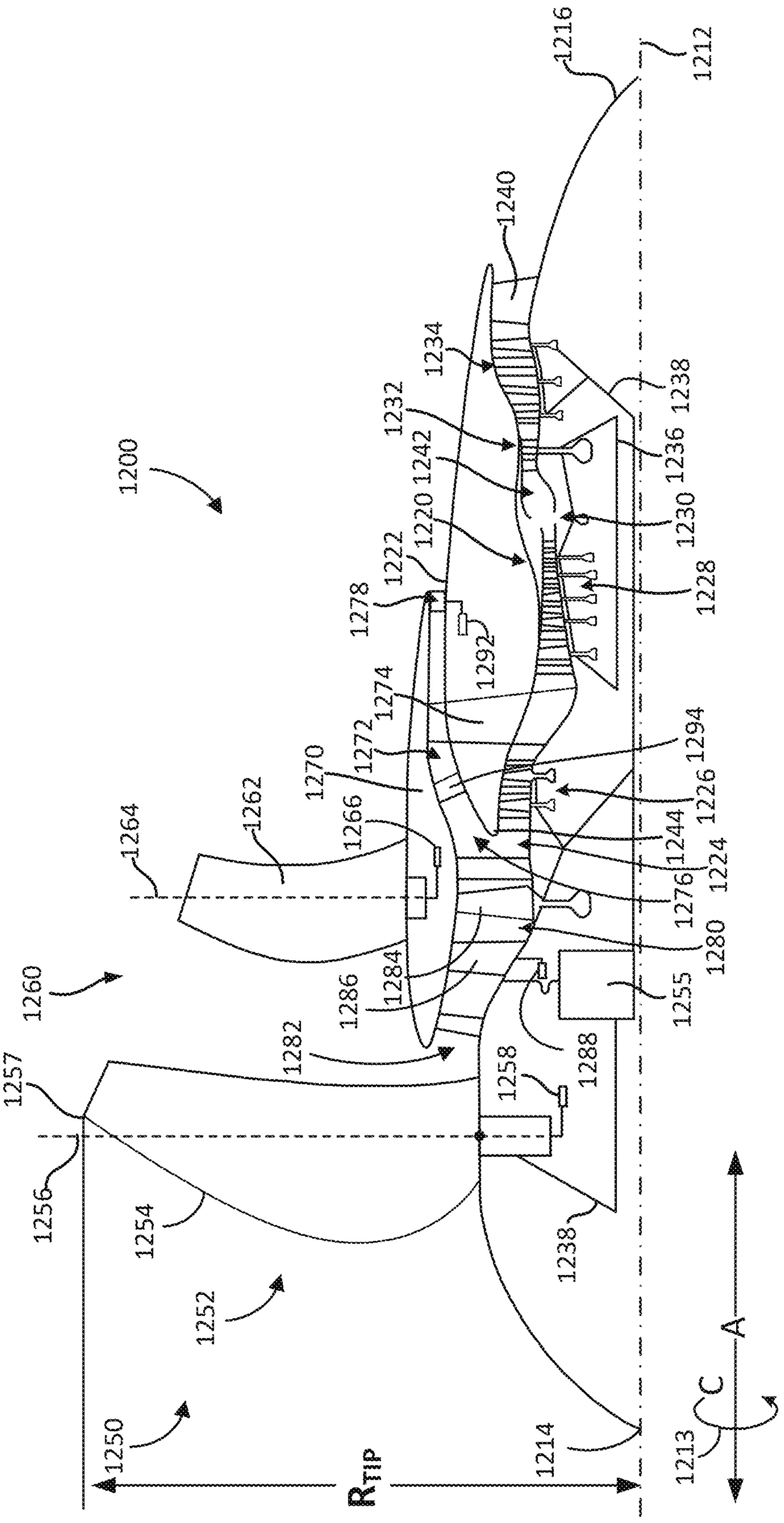
FIG. 12 is a schematic, cross-sectional view of an exemplary, unducted gas turbine engine according to various embodiments of the present subject disclosure.

Referring now to FIG. 12, a schematic cross-sectional view of a gas turbine engine 1200 is provided according to an example embodiment of the present disclosure. Particularly, FIG. 12 provides a turbofan engine 1200 having a rotor assembly with a single stage of unducted rotor blades. In such a manner, the rotor assembly may be referred to herein as an "unducted fan," or the entire gas turbine engine 1200 may be referred to as an "unducted turbofan engine." In addition, the gas turbine engine 1200 of FIG. 12 includes a third stream extending from the compressor section to a rotor assembly flowpath over the turbomachine, as will be explained in more detail below.

For reference, the gas turbine engine 1200 defines an axial direction A, a radial direction R, and a circumferential direction 1213. Moreover, the gas turbine engine 100 defines an axial centerline or longitudinal axis 1212 that extends along the axial direction A. In general, the axial direction A extends parallel to the longitudinal axis 1212, the radial direction R extends outward from and inward to the longitudinal axis 1212 in a direction orthogonal to the axial direction A, and the circumferential direction 1213 extends three hundred sixty degrees (360°) around the longitudinal axis 1212. The gas turbine engine 1200 extends between a forward end 1214 and an aft end 1216, e.g., along the axial direction A.

The gas turbine engine 1200 includes a turbomachine 1220 and a rotor assembly, also referred to as a fan section 1250, positioned upstream thereof. Generally, the turbomachine 1220 includes, in serial flow order, a compressor section, a combustion section, a turbine section, and an exhaust section. Particularly, as shown in FIG. 12, the turbomachine 1220 includes a core cowl 1222 that defines an annular core inlet 1224. The core cowl 1222 further encloses at least in part a low pressure system and a high pressure system. For example, the core cowl 1222 depicted encloses and supports at least in part a booster or low pressure ("LP") compressor 1226 for pressurizing the air that enters the turbomachine 1220 through core inlet 1224. A high pressure ("HP"), multi-stage, axial-flow compressor 1228 receives pressurized air from the LP compressor 1226 and further increases the pressure of the air. The pressurized air stream flows downstream to a combustor 1230 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 1230 downstream to a high pressure turbine 1232. The high pressure turbine 1232 drives the high pressure compressor 1228 through a high pressure shaft 1236. In this regard, the high pressure turbine 1232 is drivingly coupled with the high pressure compressor 1228. The high energy combustion products then flow to a low pressure turbine 1234. The low pressure turbine 1234 drives the low pressure compressor 1226 and components of the fan section 1250 through a low pressure shaft 1238. In this regard, the low pressure turbine 1234 is drivingly coupled with the low pressure compressor 1226 and components of the fan section 1250. The LP shaft 1238 is coaxial with the HP shaft 1236 in this example embodiment. After driving each of the turbines 1232, 1234, the combustion products exit the turbomachine 1220 through a turbomachine exhaust nozzle 1240.

Accordingly, the turbomachine 1220 defines a working gas flowpath or core duct 1242 that extends between the core inlet 1224 and the turbomachine exhaust nozzle 1240. The core duct 1242 is an annular duct positioned generally inward of the core cowl 1222 along the radial direction R. The core duct 1242 (e.g., the working gas flowpath through the turbomachine 1220) may be referred to as a second stream.

The fan section 1250 includes a fan 1252, which is the primary fan in this example embodiment. For the depicted embodiment of FIG. 12, the fan 1252 is an open rotor or unducted fan 1252. In such a manner, the gas turbine engine 1200 may be referred to as an open rotor engine.

As depicted, the fan 1252 includes an array of blade airfoils arranged around the longitudinal axis 1212 of engine

1200, and more particularly includes an array of fan blades 1254 (only one shown in FIG. 12) arranged around the longitudinal axis 1212 of engine 1200. The fan blades 1254 are rotatable, e.g., about the longitudinal axis 1212. As noted above, the fan 1252 is drivingly coupled with the low pressure turbine 1234 via the LP shaft 1238. For the embodiments shown in FIG. 12, the fan 1252 is coupled with the LP shaft 1238 via a speed reduction gearbox 1255, e.g., in an indirect-drive or geared-drive configuration.

Moreover, the array of fan blades 1254 can be arranged in equal spacing around the longitudinal axis 1212. Each fan blade 1254 has a proximal end or root and a distal end or tip and a span defined therebetween. For descriptive purposes, reference will be made to a "tip radius", referred to as $R_{tip}$, of the fan blade 1254. The tip radius $R_{tip}$ is the radial distance from the longitudinal axis 1212 to the outermost radial coordinate of the fan blade 1254, typically at the leading edge of the fan blade 1254 and typically referred to as a tip leading edge 1257. A point located at the tip leading edge 1257 would be referred to as 100% of tip radius $R_{tip}$, and a point at the longitudinal axis 1212 would be referred to as 0% of tip radius $R_{tip}$. Thus, a location on the fan blade 1254 may be defined in terms of $R/R_{tip}$ (e.g., a point at the tip leading edge 1257 would be defined as 1.0 $R/R_{tip}$ and a point at the longitudinal axis 1212 would be defined as 0.0 $R/R_{tip}$). Each fan blade 1254 defines a pitch change or central blade axis 1256. For this embodiment, each fan blade 1254 of the fan 1252 is pitchable about its central blade axis 1256, e.g., in unison with one another. One or more actuators 1258 are provided to facilitate such rotation and therefore may be used to change a pitch of the fan blades 1254 about their respective central blade axes 1256.

The fan section 1250 further includes an array of blade airfoils positioned aft of the fan blades 1254 and also disposed around longitudinal axis 1212, and more particularly includes a fan guide vane array 1260 that includes fan guide vanes 1262 (only one shown in FIG. 12) disposed around the longitudinal axis 1212. For this embodiment, the fan guide vanes 1262 are not rotatable about the longitudinal axis 1212. Each fan guide vane 1262 has a proximal end or root and a distal end or tip and a span defined therebetween. The fan guide vanes 1262 may be unshrouded as shown in FIG. 12 or, alternatively, may be shrouded, e.g., by an annular shroud spaced outward from the tips of the fan guide vanes 1262 along the radial direction R or attached to the fan guide vanes 1262.

Each fan guide vane 1262 defines a central blade axis 1264. For this embodiment, each fan guide vane 1262 of the fan guide vane array 1260 is rotatable about its respective central blade axis 1264, e.g., in unison with one another. One or more actuators 1266 are provided to facilitate such rotation and therefore may be used to change a pitch of the fan guide vane 1262 about its respective central blade axis 1264. However, in other embodiments, each fan guide vane 1262 may be fixed or unable to be pitched about its central blade axis 1264. The fan guide vanes 1262 are mounted to a fan cowl 1270.

As shown in FIG. 12, in addition to the fan 1252, which is unducted, a ducted fan 1284 is included aft of the fan 1252, such that the gas turbine engine 1200 includes both a ducted and an unducted fan which both serve to generate thrust through the movement of air without passage through at least a portion of the turbomachine 1220 (e.g., without passage through the HP compressor 1228 and combustion section for the embodiment depicted). The ducted fan 1284 is rotatable about the same axis (e.g., the longitudinal axis 1212) as the fan blade 1254. The ducted fan 1284 is, for the embodiment depicted, driven by the low pressure turbine 1234 (e.g. coupled to the LP shaft 1238). In the embodiment depicted, as noted above, the fan 1252 may be referred to as the primary fan, and the ducted fan 1284 may be referred to as a secondary fan. It will be appreciated that these terms "primary" and "secondary" are terms of convenience, and do not imply any particular importance, power, or the like.

The ducted fan 1284 includes a plurality of fan blades (not separately labeled in FIG. 12) arranged in a single stage, such that the ducted fan 1284 may be referred to as a single stage fan. The fan blades of the ducted fan 1284 can be arranged in equal spacing around the longitudinal axis 1212. Each blade of the ducted fan 1284 has a proximal end or root and a distal end or tip and a span defined therebetween.

The fan cowl 1270 annularly encases at least a portion of the core cowl 1222 and is generally positioned outward of at least a portion of the core cowl 1222 along the radial direction R. Particularly, a downstream section of the fan cowl 1270 extends over a forward portion of the core cowl 1222 to define a fan duct flowpath, or simply a fan duct 1272. According to this embodiment, the fan flowpath or fan duct 1272 may be understood as forming at least a portion of the third stream of the engine 1200.

Incoming air may enter through the fan duct 1272 through a fan duct inlet 1276 and may exit through a fan exhaust nozzle 1278 to produce propulsive thrust. The fan duct 1272 is an annular duct positioned generally outward of the core duct 1242 along the radial direction R. The fan cowl 1270 and the core cowl 1222 are connected together and supported by a plurality of substantially radially-extending, circumferentially-spaced stationary struts 1274 (only one shown in FIG. 12). The stationary struts 1274 may each be aerodynamically contoured to direct air flowing thereby. Other struts in addition to the stationary struts 1274 may be used to connect and support the fan cowl 1270 and/or core cowl 1222. In many embodiments, the fan duct 1272 and the core duct 1242 may at least partially co-extend (generally axially) on opposite sides (e.g., opposite radial sides) of the core cowl 1222. For example, the fan duct 1272 and the core duct 1242 may each extend directly from a leading edge 1244 of the core cowl 1222 and may partially co-extend generally axially on opposite radial sides of the core cowl 1222.

The gas turbine engine 1200 also defines or includes an inlet duct 1280. The inlet duct 1280 extends between an engine inlet 1282 and the core inlet 1224/fan duct inlet 1276. The engine inlet 1282 is defined generally at the forward end of the fan cowl 1270 and is positioned between the fan 1252 and the fan guide vane array 1260 along the axial direction A. The inlet duct 1280 is an annular duct that is positioned inward of the fan cowl 1270 along the radial direction R. Air flowing downstream along the inlet duct 1280 is split, not necessarily evenly, into the core duct 1242 and the fan duct 1272 by a fan duct splitter or the leading edge 1244 of the core cowl 1222. In the embodiment depicted, the inlet duct 1280 is wider than the core duct 1242 along the radial direction R. The inlet duct 1280 is also wider than the fan duct 1272 along the radial direction R.

Notably, for the embodiment depicted, the engine 1200 includes one or more features to increase an efficiency of a third stream thrust, Fn3S (e.g., a thrust generated by an airflow through the fan duct 1272 exiting through the fan exhaust nozzle 1278, generated at least in part by the ducted fan 1284). In particular, the engine 1200 further includes an array of inlet guide vanes 1286 positioned in the inlet duct 1280 upstream of the ducted fan 1284 and downstream of the engine inlet 1282. The array of inlet guide vanes 1286 are arranged around the longitudinal axis 1212. For this embodiment, the inlet guide vanes 1286 are not rotatable about the longitudinal axis 1212. Each inlet guide vanes 1286 defines a central blade axis (not labeled for clarity), and is rotatable or pitchable about its respective central blade axis, e.g., in unison with one another. In such a manner, the inlet guide vanes 1286 may be considered a variable geometry component. One or more actuators 1288 are provided to facilitate such rotation and therefore may be used to change a pitch of the inlet guide vanes 1286 about their respective central blade axes. However, in other embodiments, each inlet guide vanes 1286 may be fixed or unable to be pitched about its central blade axis.

Further, located downstream of the ducted fan 1284 and upstream of the fan duct inlet 1276, the gas turbine engine 1200 includes an array of outlet guide vanes 1290. As with the array of inlet guide vanes 1286, the array of outlet guide vanes 1290 are not rotatable about the longitudinal axis 1212. However, for the embodiment depicted, unlike the array of inlet guide vanes 1286, the array of outlet guide vanes 1290 are configured as fixed-pitch outlet guide vanes.

Further, it will be appreciated that for the embodiment depicted, the fan exhaust nozzle 1278 of the fan duct 1272 is further configured as a variable geometry exhaust nozzle. In such a manner, the engine 1200 includes one or more actuators 1292 for modulating the variable geometry exhaust nozzle. For example, the variable geometry exhaust nozzle may be configured to vary a total cross-sectional area (e.g., an area of the nozzle in a plane perpendicular to the longitudinal axis 1212) to modulate an amount of thrust generated based on one or more engine operating conditions (e.g., temperature, pressure, mass flowrate, etc. of an airflow through the fan duct 1272). A fixed geometry exhaust nozzle may also be adopted.

Moreover, referring still to FIG. 12, in exemplary embodiments, air passing through the fan duct 1272 may be relatively cooler (e.g., lower temperature) than one or more fluids utilized in the turbomachine 1220. In this way, one or more heat exchangers 1294 may be positioned in thermal communication with the fan duct 1272. For example, one or more heat exchangers 1294 may be disposed within the fan duct 1272 and utilized to cool one or more fluids from the core engine with the air passing through the fan duct 1272, as a resource for removing heat from a fluid, e.g., compressor bleed air, oil or fuel.

Figure 13:
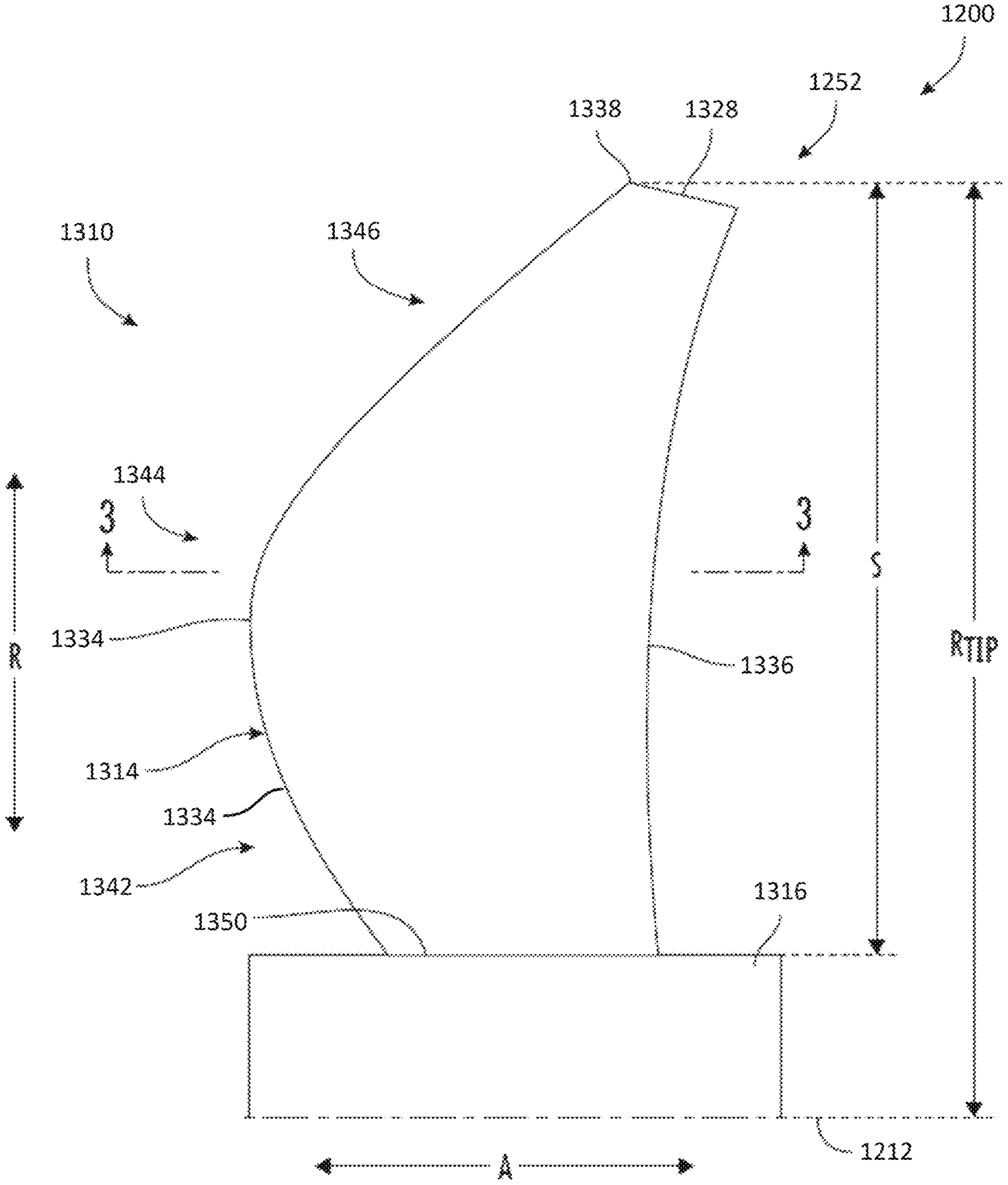
FIG. 13 is a schematic view of an exemplary airfoil according to various embodiments of the present disclosure.
Figure 14:
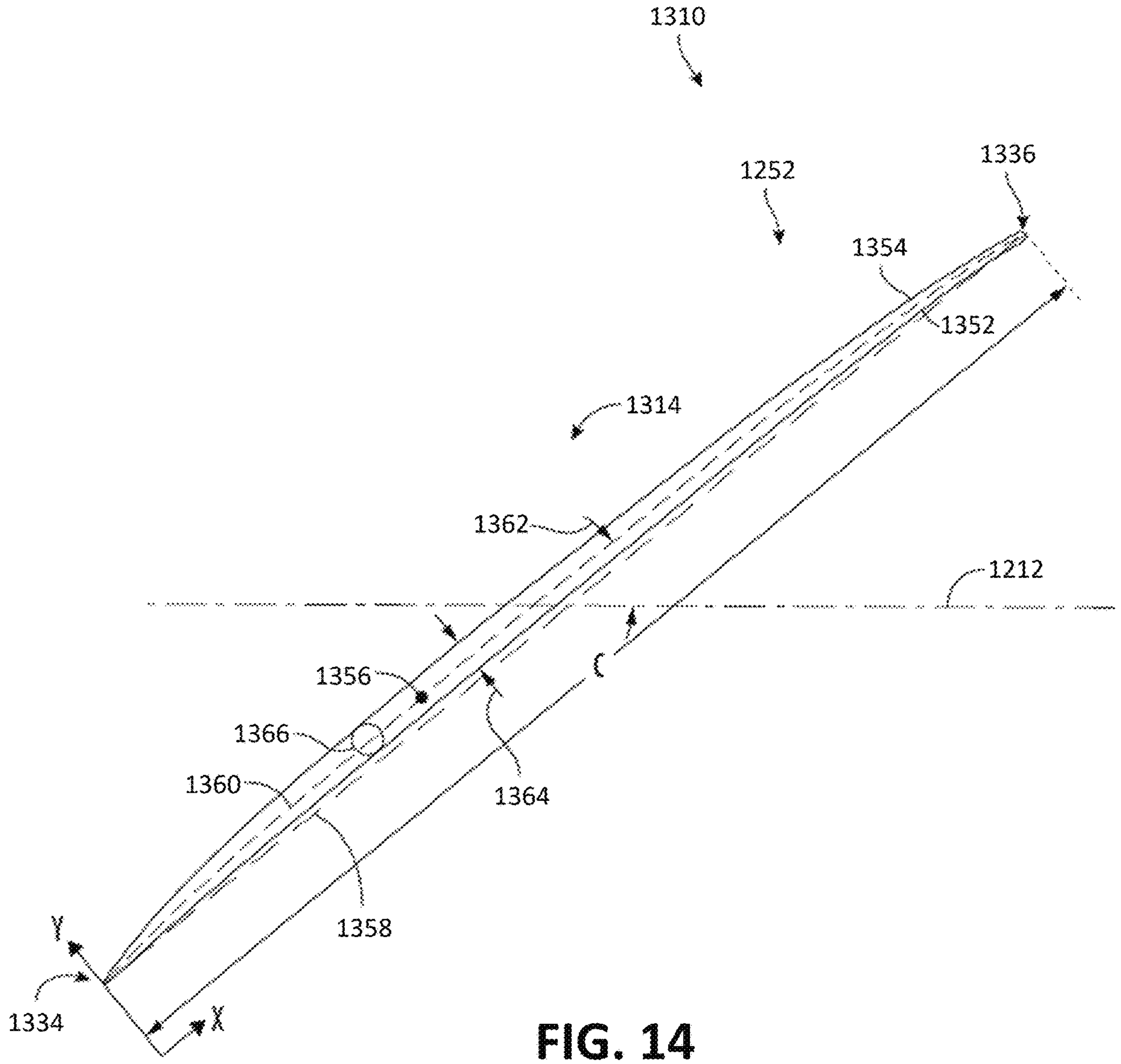
FIG. 14 is a schematic sectional view taken along line 3-3 of FIG. 13 in accordance with various embodiments of the present disclosure.

Referring now to FIGS. 13 and 14, FIG. 13 is a schematic view of an exemplary unducted blade airfoil assembly 1310 in accordance with various embodiments of the present disclosure, and FIG. 14 is a schematic sectional view taken along line 3-3 of FIG. 13 in accordance with various embodiments of the present disclosure. The exemplary unducted blade airfoil assembly 1310 may be configured for use as the fan 1252 or the fan guide vane array 1260 (FIG. 12). The unducted blade airfoil assembly 1310 includes an array of blade airfoils or blades 1314 (only one shown in FIG. 13) that are regularly spaced apart circumferentially around a disk or hub 1316 of a rotor centered on the longitudinal axis 1212 of the fan 1252 (FIG. 12). Each blade airfoil 1314 includes a leading edge 1334, a trailing edge 1336, a root or proximal end 1350 (i.e., an inboard end in the radial direction R toward the longitudinal axis 1212 (FIG. 12)), and a tip 1328. Also, a tip leading edge 1338 of the blade airfoil 1314 is defined as an intersection of the leading edge 1334 with the tip 1328. Each blade airfoil 1314 extends radially outward along a span "S" from the root or proximal end 1350 to the tip 1328. For descriptive purposes, and as described above, reference will also be made to a "tip radius", referred to as $R_{tip}$, of the blade airfoil 1314. The tip radius $R_{tip}$ is the radial distance from the longitudinal axis 1212 to the outermost radial coordinate (typically the tip leading edge 1338) of the blade airfoil 1314. A point located at the tip leading edge 1338 would be referred to as 100% of tip radius $R_{tip}$ (or 1.0 $R/R_{tip}$), and a point at the longitudinal axis 1212 would be referred to as 0% of tip radius $R_{tip}$ (or 0.0 $R/R_{tip}$).

In different embodiments, different hub radius ratios may be used. For example, each blade airfoil 1314 defines a tip radius $R_{tip}$ along the radial direction R from the longitudinal axis 1212 to the outermost radial coordinate of the blade airfoil 1314 (typically at the tip leading edge 1338), and a hub radius along the radial direction R from the longitudinal axis 1212 to the outer radius of the hub 1316 defined at the leading edge 1334 of the blade airfoil 1314. The hub radius ratio is typically the hub radius divided by the tip radius. As an example, for an exemplary embodiment where an outer radius of the hub 1316 (centered on the longitudinal axis 1212 (FIG. 12) of the fan 1252 (FIG. 12)) is located radially at approximately thirty percent (30%) of the tip radius, a value of 0.3 $R/R_{tip}$ corresponds to a zero percent (0%) span location. As indicated above, an $R/R_{tip}$ value of 0.0 corresponds to the longitudinal axis 1212. Thus, it should be understood that different hub radius ratios used in connection with the blade airfoil 1314 may result in different span coordinate values for different $R/R_{tip}$ coordinate values corresponding to various features of the blade airfoil 1314 according to the present disclosure.

Blade airfoil 1314 forms an aerodynamic surface extending along the axial direction A between the leading edge 1334 and the trailing edge 1336. The blade airfoil 1314 extends outward from the proximal end 1350 in the radial direction R. In exemplary embodiments, the leading edge 1334 includes an inboard portion 1342 that extends outward in the radial direction R to a particular span or $R/R_{tip}$ location, a medial portion 1344 that extends from the inboard portion 1342 toward the tip leading edge 1338, and a tip portion 1346 that extends radially from an outboard location of the medial portion 1344 to the tip leading edge 1338 and encompasses the tip leading edge 1338 and the tip 1328. As used herein, a "tip portion" of a blade airfoil is defined as a portion of the blade airfoil extending radially from a radial location of a forward-most axial point of the leading edge of the blade airfoil to a radial location of the tip leading edge of the blade airfoil when the blade airfoil is at its design orientation (e.g., at an orientation representative of subsonic cruise flight speed or operation).

In exemplary embodiments, the leading edge 1334 includes an inboard portion 1342 that extends outward in the radial direction R to a particular span location, a medial portion 1344 that extends from the inboard portion 1342 to a tip portion 1346, and the tip portion 1346 that extends from the medial portion 1344 to the tip 1328 and encompasses the tip 1328 and the tip leading edge 1338. As used herein, a "tip portion" of a blade airfoil is defined as a portion of the blade airfoil extending radially from a location of a forward-most axial point of the leading edge of the blade airfoil to the tip of the blade airfoil. For example, in exemplary embodiments, a forward-most axial point of the leading edge 1334 of the blade airfoil 1314 may be located radially at or greater than fifty percent (50%) of the tip radius, or a value of 0.5 R/Rtip, such that the tip portion 1346 of the blade airfoil 1314 extends from a radial value of 0.5 R/Rtip to the tip 1328 of the blade airfoil 1314. In exemplary embodiments, a forward-most axial point of the leading edge 1334 of the blade airfoil 1314 may be located radially at or greater than fifty-five percent (55%) of the tip radius, or a value of 0.55 R/Rtip, such that the tip portion 1346 of the blade airfoil 1314 extends from a radial value of 0.55R/Rtip to the tip 1328 of the blade airfoil 1314. In exemplary embodiments, a forward-most axial point of the leading edge 1334 of the blade airfoil 1314 may be located radially at or greater than fifty-eight percent (58%) of the tip radius, or a value of 0.58 R/Rtip, such that the tip portion 1346 of the blade airfoil 1314 extends from a radial value of 0.58R/Rtip to the tip 1328 of the blade airfoil 1314. In exemplary embodiments, a forward-most axial point of the leading edge 1334 of the blade airfoil 1314 may be located radially at or greater than sixty percent (60%) of the tip radius, or a value of 0.6 R/Rtip, such that the tip portion 1346 of the blade airfoil 1314 extends from a radial value of 0.6 R/Rtip to the tip 1328 of the blade airfoil 1314. In exemplary embodiments, a forward-most axial point of the leading edge 1334 of the blade airfoil 1314 may be located radially at or greater than forty percent (40%) of a span of the blade airfoil 1314, such that the tip portion 1346 of the blade airfoil 1314 extends from a radial location of forty percent (40%) of the span of the blade airfoil 1314 to the tip 1328 of the blade airfoil 1314. In exemplary embodiments, a forward-most axial point of the leading edge 1334 of the blade airfoil 1314 may be located radially at or greater than forty-five percent (45%) of a span of the blade airfoil 1314, such that the tip portion 1346 of the blade airfoil 1314 extends from a radial location of forty-five percent (45%) of the span of the blade airfoil 1314 to the tip 1328 of the blade airfoil 1314. In exemplary embodiments, a forward-most axial point of the leading edge 1334 of the blade airfoil 1314 may be located radially at or greater than forty-eight percent (48%) of a span of the blade airfoil 1314, such that the tip portion 1346 of the blade airfoil 1314 extends from a radial location of forty-eight percent (48%) of the span of the blade airfoil 1314 to the tip 1328 of the blade airfoil 1314. In exemplary embodiments, a forward-most axial point of the leading edge 1334 of the blade airfoil 1314 may be located radially at or greater than fifty percent (50%) of a span of the blade airfoil 1314, such that the tip portion 1346 of the blade airfoil 1314 extends from a radial location of fifty percent (50%) of the span of the blade airfoil 1314 to the tip 1328 of the blade airfoil 1314. In exemplary embodiments, a forward-most axial point of a leading edge of a blade airfoil may vary based on a pitch angle of the blade airfoil (e.g., for a variable pitch fan). Accordingly, in exemplary embodiments, a "tip portion" of a blade airfoil may be defined as a portion of the blade airfoil extending radially from a location of a forward-most axial point of the leading edge of the blade airfoil to the tip of the blade airfoil when the blade airfoil is at its design orientation (e.g., at an orientation representative of subsonic cruise flight speed or operation). For example, cruise is a phase of the flight that occurs when an aircraft levels to a set altitude after a climb and before it begins to descend.

Thus, as used herein, cruise represents a continuous, high speed, and stable condition of flight for which an aircraft is intended to operate. This description is to distinguish cruise from certain conditions that are abnormal or transient, such as dive, in which the aircraft can reach high flight speeds, but the aircraft is not intended to experience for a substantial portion of the mission from takeoff to landing. Thus, a subsonic cruise flight speed may refer to subsonic operation at a flight Mach number at or above 0.4, or at or above 0.5. Thus, in exemplary embodiments, the tip portion 1346 of the blade airfoil 1314 is defined as a portion of the blade airfoil 1314 extending radially from a radial location of a forward-most axial point of the leading edge 1334 of the blade airfoil 1314 to a radial location of the tip leading edge 1338 of the blade airfoil 1314 when the blade airfoil 1314 is at its design orientation (e.g., at an orientation representative of subsonic cruise flight speed or operation). In exemplary embodiments, the leading edge 1334 of the inboard portion 1342 sweeps forward in the axial direction A, and the leading edge 1334 of the medial portion 1344 begins sweeping aft in the axial direction A outboard of the inboard portion 1342. An acoustically active portion or span of the blade airfoil 1314 may be determined, for example, via a relationship between an acoustic source strength distributed radially along the blade airfoil 1314 and a radiation efficiency along the blade airfoil 1314. The acoustically active portion of the blade airfoil 1314 may be determined by multiplying an acoustic source strength distributed radially along the blade airfoil 1314 by an acoustic Green's function or radiation efficiency (e.g., the ability of noise sources to propagate acoustic energy to surrounding media) along the blade airfoil 1314. The radiation efficiency may be any known relation describing the effective strength of a noise source on the blade airfoil, fan or propeller blade to an observer location of interest, and may be dependent on the blade airfoil shape, size, flow conditions, combinations thereof, or the like. In some exemplary embodiments, the trailing edge 1336 of the blade airfoil 1314 is configured having a smooth, curved profile (e.g., without steps or abrupt axial sweep changes/transitions).

Each blade airfoil 1314 extends from the root or proximal end 1350 at the hub 1316 to the tip leading edge 1338 and includes a generally concave pressure side 1352 joined to a generally convex suction side 1354 at the leading edge 1334 and the trailing edge 1336. The blade airfoil 1314 may be represented as an array or "stack" of individual blade airfoil sections arrayed along a spanwise stacking line 1356 (e.g., in-and-out of the page as depicted in FIG. 14). For each individual blade airfoil section of the blade airfoil 1314, an imaginary straight line referred to as a "chord line" 1358 connects the leading edge 1334 and the trailing edge 1336. Also, for each individual blade airfoil section of the blade airfoil 1314, a curve called the "mean camber line" or "meanline" 1360 represents the locus of points lying halfway between the concave pressure side 1352 and the convex suction side 1354. Typically, the blade airfoil 1314 would incorporate "twist", a feature in which the stacked blade airfoil sections are rotated relative to each other about the spanwise stacking line 1356. Although not shown in the illustrated example, it will be understood that the blade airfoil 1314 may incorporate "lean", a shift in the circumferential direction 1213 (FIG. 12), and "axial sweep", a shift in the axial direction A.

As indicated above, each blade airfoil 1314 extends radially outward along the span "S" from the root 1350 to the tip 1328, and a chord (or chord dimension) "C" defined as the length of the chord line 1358. The chord dimension may be constant over the span S, or it may vary over the span S, as shown. An airfoil section of the blade airfoil 1314 has a meanline angle 1362, which refers to the angle between the tangent to the meanline 1360 and the longitudinal axis 1212. The meanline angle 1362 can be measured at any location along the meanline 1360. The value of the meanline angle 1362 is a function of both the curvature of the meanline 1360 and the pitch angle of the blade airfoil 1314 at a reference condition, usually the cruise phase/operation orientation or position. Thus, the absolute value of the meanline angle 1362 will change as the pitch angle of the blade airfoil 1314 changes. However, it will be understood that the overall meanline shape characteristic of the meanline 1360 is unchanging and depends solely on the curvature of the blade airfoil 1314.

The blade airfoil 1314 has a thickness 1364 which is a distance measured normal to the meanline 1360 between the concave pressure side 1352 and the convex suction side 1354, which can be measured at any location along the meanline 1360. In accordance with conventional practice, a thickness ratio is computed as the absolute value of the thickness divided by the length of the chord C, expressed as a percentage.

A location along the meanline 1360 of either the meanline angle 1362 or the thickness 1364 may be described using a chord fraction, the value of which may be expressed as a percentage. For reference purposes, a relevant thickness "T" is measured at a distance "X" aft of the leading edge 1334 where the distance "X" is represented or defined as a percentage or fraction of the total chord length, referred to herein as a percentage or fraction of "chord location," "chordwise location," or "chord fraction." For example, a "0.5" chord fraction" represents a location aft of the leading edge 1334 equal to 50% of the total chord length. Thus, as used herein, the chord fraction refers to a chordwise distance of the location from leading edge 1334 to a point of interest divided by the chord C. So, for example, the leading edge 1334 is located at 0% of the chord, and the trailing edge 1336 is located at 100% of the chord C (or at 1.0 chord fraction). A maximum thickness of the blade airfoil section of the blade airfoil 1314 at a particular chordwise location is represented by the diameter of an inscribed circle 1366 between the concave pressure side 1352 and the convex suction side 1354 along that particular chord. Further, a thickness ratio may be represented as the absolute value of the thickness T divided by the maximum thickness ($T_{MAX}$) of a particular airfoil blade section.

A thickness of an airfoil section of the blade airfoil 1314 at a particular chordwise location is represented by the diameter of an inscribed circle 1366 between the concave pressure side 1352 and the convex suction side 1354. In some embodiments, a chordwise fractional location (or a chordwise fractional distance) of a maximum thickness of the blade airfoil 1314 is furthest forward in the tip portion 1346 of the blade airfoil 1314. As used herein, "furthest forward" refers to a fractional distance of a chord for the maximum thickness location from the leading edge 1334 at a given radial location and chordwise section of the blade airfoil 1314. For example, in some embodiments, a maximum thickness for at least a portion of the blade airfoil 1314 in the tip portion 1346 for a chord C extending from the leading edge 1334 to the trailing edge 1336 is located between five percent to forty percent of the chord C (between 0.05 to 0.40 chord fraction) as measured from the leading edge 1334. In some embodiments, a maximum thickness for at least a portion of the blade airfoil 1314 in the tip portion 1346 for a chord C extending from the leading edge 1334 to the trailing edge 1336 is located between five percent to thirty percent of the chord C (between 0.05 to 0.30 chord fraction) as measured from the leading edge 1334. In some embodiments, a maximum thickness for at least a portion of the blade airfoil 1314 in the tip portion 1346 for a chord C extending from the leading edge 1334 to the trailing edge 1336 is located between five percent to twenty-five percent of the chord C (between 0.05 to 0.25 chord fraction) as measured from the leading edge 1334. In some embodiments, a maximum thickness for at least a portion of the blade airfoil 1314 in the tip portion 1346 for a chord C extending from the leading edge 1334 to the trailing edge 1336 is located between five percent to twenty percent of the chord C (between 0.05 to 0.20 chord fraction) as measured from the leading edge 1334. In some embodiments, a maximum thickness for at least a portion of the blade airfoil 1314 in the tip portion 1346 for a chord C extending from the leading edge 1334 to the trailing edge 1336 is located between the leading edge 1334 and forty percent of the chord C (0.40 chord fraction) as measured from the leading edge 1334. In some embodiments, a maximum thickness for at least a portion of the blade airfoil 1314 in the tip portion 1346 for a chord C extending from the leading edge 1334 to the trailing edge 1336 is located between the leading edge 1334 and thirty percent of the chord C (0.30 chord fraction) as measured from the leading edge 1334. In some embodiments, a maximum thickness for at least a portion of the blade airfoil 1314 in the tip portion 1346 for a chord C extending from the leading edge 1334 to the trailing edge 1336 is located between the leading edge 1334 and twenty-five percent of the chord C (0.25 chord fraction) as measured from the leading edge 1334. In some embodiments, a maximum thickness for at least a portion of the blade airfoil 1314 in the tip portion 1346 for a chord C extending from the leading edge 1334 to the trailing edge 1336 is located between the leading edge 1334 and twenty percent of the chord C (0.20 chord fraction) as measured from the leading edge 1334. Thus, in exemplary embodiments, the chordwise fractional distance from the leading edge 1334 of a maximum thickness of the blade airfoil 1314 for a chordwise section of the blade airfoil 1314 is minimum in the tip portion 1346.

In some embodiments, a maximum thickness for at least twenty-five percent (25%) of the radial extent of the tip portion 1346 of the blade airfoil 1314 for a chord C extending from the leading edge 1334 to the trailing edge 1336 is located forward of forty percent of the chord C (0.40 chord fraction) as measured from the leading edge 1334. In some embodiments, a maximum thickness for at least fifty percent (50%) of the radial extent of the tip portion 1346 of the blade airfoil 1314 for a chord C extending from the leading edge 1334 to the trailing edge 1336 is located forward of forty percent of the chord C (0.40 chord fraction) as measured from the leading edge 1334. In some embodiments, a maximum thickness for at least sixty-seven percent (67%) of the radial extent of the tip portion 1346 of the blade airfoil 1314 for a chord C extending from the leading edge 1334 to the trailing edge 1336 is located forward of forty percent of the chord C (0.40 chord fraction) as measured from the leading edge 1334. In some embodiments, a maximum thickness for at least seventy-five percent (75%) of the radial extent of the tip portion 1346 of the blade airfoil 1314 for a chord C extending from the leading edge 1334 to the trailing edge 1336 is located forward of forty percent of the chord C (0.40 chord fraction) as measured from the leading edge 1334. In some embodiments, the above-referenced percentages of the tip portion 1346 of maximum thickness are located proximate the tip 1328.

In some embodiments, a maximum thickness for at least twenty-five percent (25%) of the radial extent of the tip portion 1346 of the blade airfoil 1314 for a chord C extending from the leading edge 1334 to the trailing edge 1336 is located forward of thirty percent of the chord C (0.30 chord fraction) as measured from the leading edge 1334. In some embodiments, a maximum thickness for at least fifty percent (50%) of the radial extent of the tip portion 1346 of the blade airfoil 1314 for a chord C extending from the leading edge 1334 to the trailing edge 1336 is located forward of thirty percent of the chord C (0.30 chord fraction)

as measured from the leading edge 1334. In some embodiments, a maximum thickness for at least sixty-seven percent (67%) of the radial extent of the tip portion 1346 of the blade airfoil 1314 for a chord C extending from the leading edge 1334 to the trailing edge 1336 is located forward of thirty percent of the chord C (0.30 chord fraction) as measured from the leading edge 1334. In some embodiments, a maximum thickness for at least seventy-five percent (75%) of the radial extent of the tip portion 1346 of the blade airfoil 1314 for a chord C extending from the leading edge 1334 to the trailing edge 1336 is located forward of thirty percent of the chord C (0.30 chord fraction) as measured from the leading edge 1334. In some embodiments, the above-referenced percentages of the tip portion 1346 of maximum thickness are located proximate the tip 1328.

In some embodiments, a maximum thickness for at least twenty-five percent (25%) of the radial extent of the tip portion 1346 of the blade airfoil 1314 for a chord C extending from the leading edge 1334 to the trailing edge 1336 is located forward of twenty-five percent of the chord C (0.25 chord fraction) as measured from the leading edge 1334. In some embodiments, a maximum thickness for at least fifty percent (50%) of the radial extent of the tip portion 1346 of the blade airfoil 1314 for a chord C extending from the leading edge 1334 to the trailing edge 1336 is located forward of twenty-five percent of the chord C (0.25 chord fraction) as measured from the leading edge 1334. In some embodiments, a maximum thickness for at least sixty-seven percent (67%) of the radial extent of the tip portion 1346 of the blade airfoil 1314 for a chord C extending from the leading edge 1334 to the trailing edge 1336 is located forward of twenty-five percent of the chord C (0.25 chord fraction) as measured from the leading edge 1334. In some embodiments, a maximum thickness for at least seventy-five percent (75%) of the radial extent of the tip portion 1346 of the blade airfoil 1314 for a chord C extending from the leading edge 1334 to the trailing edge 1336 is located forward of twenty-five percent of the chord C (0.25 chord fraction) as measured from the leading edge 1334. In some embodiments, the above-referenced percentages of the tip portion 1346 of maximum thickness are located proximate the tip 1328.

Further, as indicated above, the blade airfoil 1314 as depicted and described herein may be configured for use as a guide vane 1262 (FIG. 12).

Figure 15A:
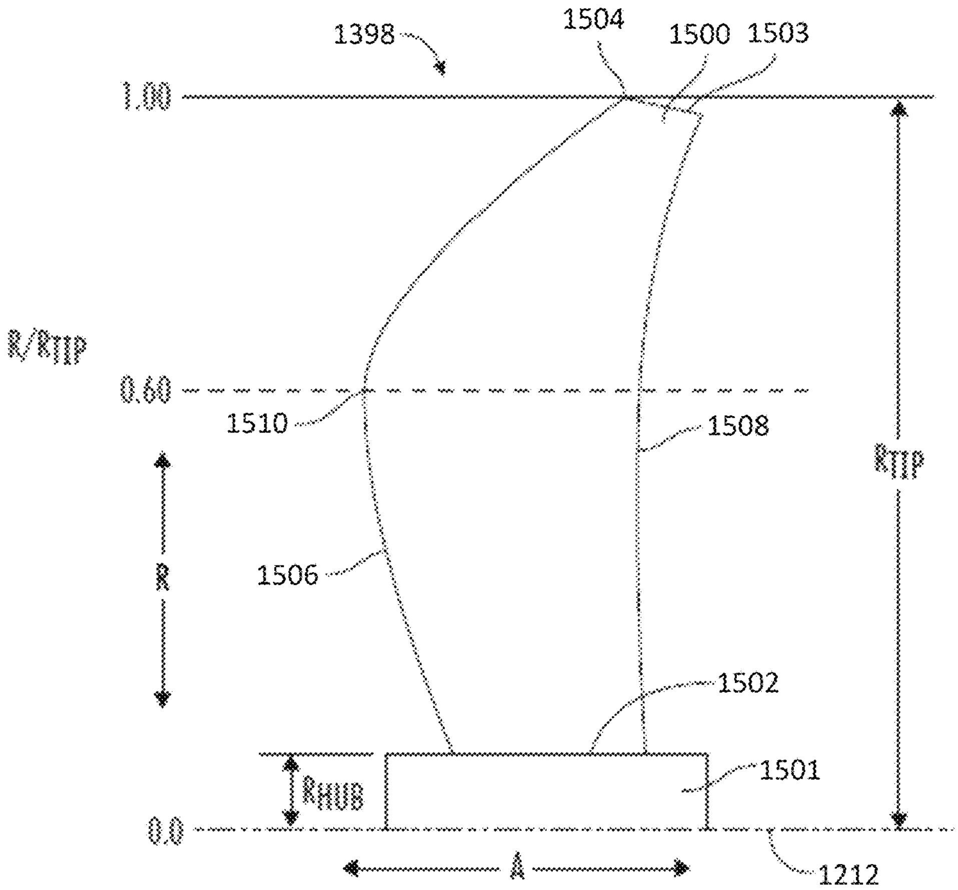
FIG. 15A is a schematic view of an exemplary airfoil according to another embodiment of the present disclosure.
Figure 15B:
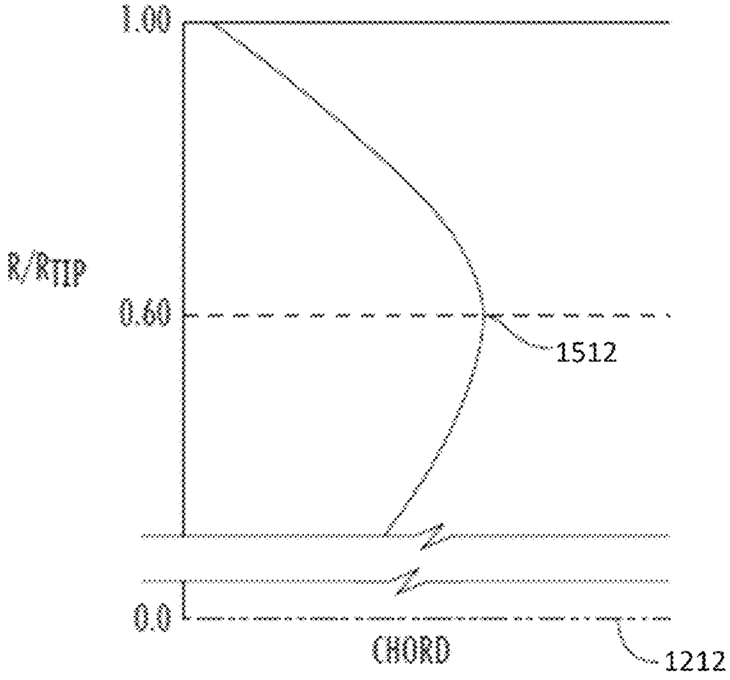
FIG. 15B is a graph plotting a chord length of a chord as a function of a radial location of the chord, expressed as a fraction of a tip radius of the airfoil, of the exemplary airfoil of FIG. 15A according to an embodiment of the present disclosure.

Referring to FIGS. 15A and 15B, FIG. 15A is a schematic view of an exemplary blade airfoil or blade 1500 of an unducted blade airfoil assembly 1398 according to an embodiment of the present disclosure, and FIG. 15B is a graph plotting a chord length of a chord as a function of a location of the chord of the blade airfoil 1500 of FIG. 15A according to an embodiment of the present disclosure. In some embodiments, the blade airfoil 1500 may be configured similarly to the blade airfoil 1314 (FIGS. 13 and 14). In FIGS. 15A and 15B, radial locations of certain features are expressed as a fraction of a tip radius $R_{tip}$ of the blade airfoil 1500, or as an $R/R_{tip}$ value. The blade airfoil 1500 may be configured for use as the fan 1252 or the fan guide vane array 1260 (FIG. 12).

An array or plurality of the blade airfoils 1500 (only one shown in FIG. 15A) may be regularly spaced apart circumferentially around a disk or hub 1501 of a rotor centered on the longitudinal axis 1212 of the fan 1252 (FIG. 12). Each blade airfoil 1500 includes a leading edge 1506, a trailing edge 1508, a root or proximal end 1502 (i.e., an inboard end in the radial direction R toward the longitudinal axis 1212 (FIG. 12)) and a tip 1503. Also, a tip leading edge 1504 of the blade airfoil 1500 is defined as an intersection of the leading edge 1506 with the tip 1503. Each blade airfoil 1500 extends radially outward along a span from the root 1502 to the tip 1503. In different embodiments, different hub radius ratios may be used. For example, each blade airfoil 1500 defines a tip radius $R_{tip}$ along the radial direction R from the longitudinal axis 1212 to the outermost radial coordinate of the blade airfoil 1500 (typically at the tip leading edge 1504), and a hub radius $R_{hub}$ along the radial direction R from the longitudinal axis 1212 to the outer radius of the hub 1501 defined at the leading edge 1506 of the blade airfoil 1500. The hub radius ratio is typically the hub radius $R_{hub}$ divided by the tip radius $R_{tip}$. As an example, for an exemplary embodiment where an outer radius of the hub 1501, or hub radius $R_{hub}$, (centered on the longitudinal axis 1212 (FIG. 12) of the fan 1252 (FIG. 12)) is located radially at approximately thirty percent (30%) of the tip radius $R_{tip}$, a value of 0.3 $R/R_{tip}$ corresponds to a zero percent (0%) span location. As indicated above, an $R/R_{tip}$ value of 0.0 corresponds to the longitudinal axis 1212. Thus, it should be understood that different hub radius ratios used in connection with the blade airfoil 1500 may result in different span coordinate values for different $R/R_{tip}$ coordinate values corresponding to various features of the blade airfoil 1500 according to the present disclosure.

Blade airfoil 1500 forms an aerodynamic surface extending along the axial direction A between the leading edge 1506 and the trailing edge 1508. FIG. 15A depicts an axial profile (e.g., axial coordinates of the blade airfoil 1500 expressed as a function of $R/R_{tip}$ of the blade airfoil 1500). Thus, a forward axial direction relative to the blade airfoil 1500 is right-to-left in FIG. 15A, and an aft axial direction relative to the blade airfoil 1500 is left-to-right in FIG. 15A. The blade airfoil 1500 extends outward from the proximal end 1502 in the radial direction R.

In the illustrated embodiment, the blade airfoil 1500 is configured such that a furthest forward or forward-most axial point 1510 of the leading edge 1506 at its design orientation (e.g., at an orientation representative of subsonic cruise operation) is defined or radially located at or greater than sixty percent (60%) of the tip radius $R_{tip}$ of the blade airfoil 1500 (or 0.60 $R/R_{tip}$). Additionally, a maximum chord 1512 (i.e., a maximum length of a chord of the blade airfoil 1500 extending from the leading edge 1506 to the trailing edge 1508) for the blade airfoil 1500 is defined or radially located at or greater than sixty percent (60%) of the tip radius $R_{tip}$ of the blade airfoil 1500 (or 0.60 $R/R_{tip}$).

Figure 16A:
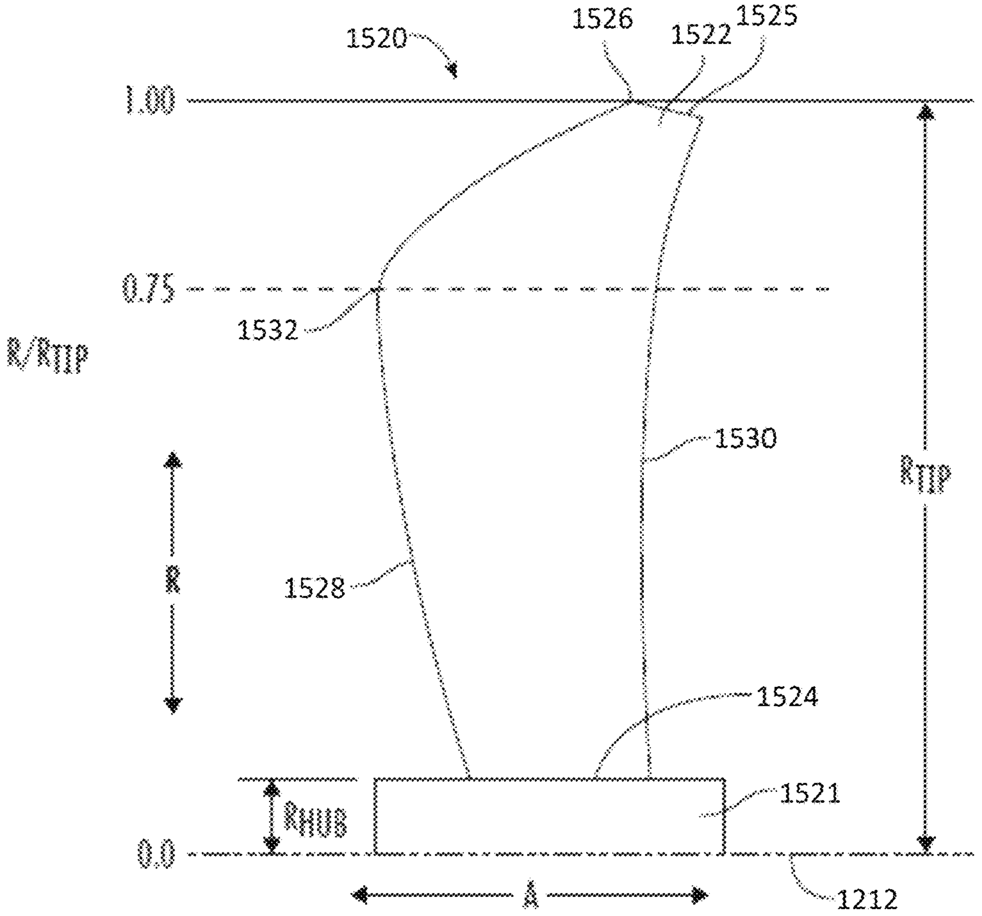
FIG. 16A is a schematic view of an exemplary airfoil according to another embodiment of the present disclosure.
Figure 16B:
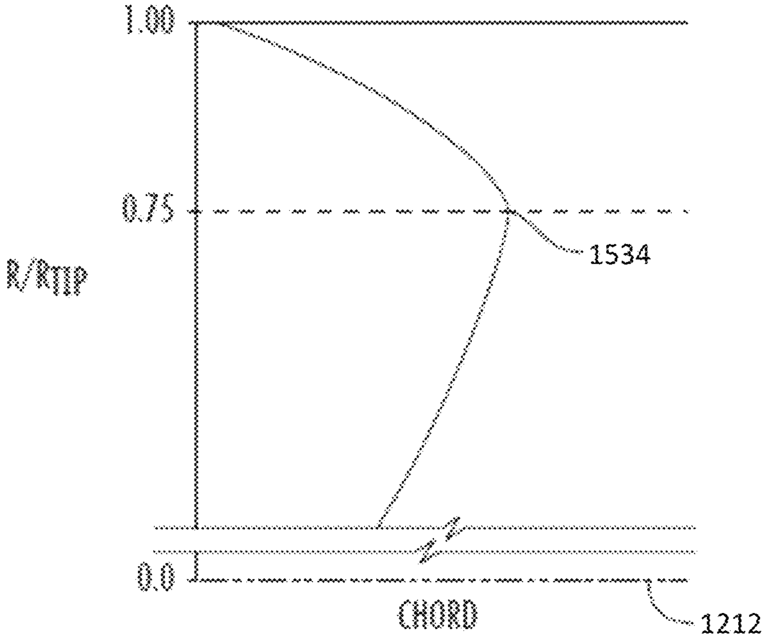
FIG. 16B is a graph plotting a chord length of a chord as a function of a radial location of the chord, expressed as a fraction of a tip radius of the airfoil, of the exemplary airfoil of FIG. 16A according to an embodiment of the present disclosure.

Referring to FIGS. 16A and 16B, FIG. 16A is a schematic view of an exemplary blade airfoil or blade airfoil 1522 of an unducted blade airfoil assembly 1520 according to an embodiment of the present disclosure, and FIG. 16B is a graph plotting a chord length of a chord as a function of a location of the chord of the blade airfoil 1522 of FIG. 16A according to an embodiment of the present disclosure. In some embodiments, the blade airfoil 1522 may be configured similarly to the blade airfoil 1314 (FIGS. 13 and 14) and the blade airfoil 1500 (FIGS. 15A and 15B). In FIGS. 16A and 16B, radial locations of certain features are expressed as a fraction of a tip radius $R_{tip}$ of the blade airfoil 1522, or as an $R/R_{tip}$ value. The blade airfoil 1522 may be configured for use as the fan 1252 or the fan guide vane array 1260 as depicted in FIG. 12.

An array or plurality of the blade airfoils 1522 (only one shown in FIG. 16A) may be regularly spaced apart circumferentially around a disk or hub 1521 of a rotor centered on the longitudinal axis 1212 of the fan 1252 (FIG. 12). Each blade airfoil 1522 includes a leading edge 1528, a trailing edge 1530, a root or proximal end 1524 (i.e., an inboard end in the radial direction R toward the longitudinal axis 1212 (FIG. 12)) and a tip 1525. Also, an intersection of the leading edge 1528 and the tip 1525 is defined as a tip leading edge 1526. Each blade airfoil 1522 extends radially outward along a span from the root 1524 to the tip 1525. Blade airfoil 1522 forms an aerodynamic surface extending along the axial direction A between the leading edge 1528 and the trailing edge 1530. FIG. 16A depicts an axial profile (e.g., axial coordinates of the blade airfoil 1522 expressed as a function of $R/R_{tip}$ of the blade airfoil 1522). Thus, a forward axial direction relative to the blade airfoil 1522 is right-to-left in FIG. 16A, and an aft axial direction relative to the blade airfoil 1522 is left-to-right in FIG. 16A. The blade airfoil 1522 extends outward from the proximal end 1524 in the radial direction R.

In the illustrated embodiment, the blade airfoil 1522 is configured such that a furthest forward or forward-most axial point 1532 of the leading edge 1528 at its design orientation (e.g., at an orientation representative of subsonic cruise operation) is defined or radially located at or greater than seventy-five (75%) of the tip radius $R_{tip}$ of the blade airfoil 1522 (or 0.75 $R/R_{tip}$). Additionally, a maximum chord 1534 (i.e., a maximum length of a chord of the blade airfoil 1522 extending from the leading edge 1528 to the trailing edge 1530) for the blade airfoil 1522 is defined or radially located at or greater than seventy-five percent (75%) of the tip radius $R_{tip}$ of the blade airfoil 1522 (or 0.75 $R/R_{tip}$).

Referring to FIGS. 15A-16B, in some embodiments, the blade airfoil 1500/1522 is configured such that a furthest forward or forward-most axial point 1510/1532 of the leading edge 1506/1528 is defined or radially located at or greater than sixty-five percent (65%) of the tip radius $R_{tip}$ of the blade airfoil 1500/1522 (or 0.65 $R/R_{tip}$). Additionally, in some embodiments, the maximum chord 1512/1534 (i.e., a maximum length of a chord of the blade airfoil 1500/1522 extending from the leading edge 1506/1526 to the trailing edge 1508/1530) for the blade airfoil 1500/1522 is defined or radially located at or greater than sixty-five percent (65%) of the tip radius $R_{tip}$ of the blade airfoil 1500/1522 (or 0.65 $R/R_{tip}$). In some embodiments, the blade airfoil 1500/1522 is configured such that a furthest forward or forward-most axial point 1510/1532 of the leading edge 1506/1528 is defined or radially located at or greater than sixty-eight percent (68%) of the tip radius $R_{tip}$ of the blade airfoil 1500/1522 (or 0.68 $R/R_{tip}$). Additionally, in some embodiments, the maximum chord 1512/1534 (i.e., a maximum length of a chord of the blade airfoil 1500/1522 extending from the leading edge 1506/1528 to the trailing edge 1508/1530) for the blade airfoil 1500/1522 is defined or radially located at or greater than sixty-eight percent (68%) of the tip radius $R_{tip}$ of the blade airfoil 1500/1522 (or 0.68 $R/R_{tip}$). In some embodiments, the blade airfoil 1500/1522 is configured such that a furthest forward or forward-most axial point 1510/1532 of the leading edge 1506/1528 is defined or radially located at or greater than seventy-two percent (72%) of the tip radius $R_{tip}$ of the blade airfoil 1500/1522 (or 0.72 $R/R_{tip}$). Additionally, in some embodiments, the maximum chord 1512/1534 (i.e., a maximum length of a chord of the blade airfoil 1500/1522 extending from the leading edge 1506/1528 to the trailing edge 1508/1530) for the blade airfoil 1500/1522 is defined or radially located at or greater than seventy-two percent (72%) of the tip radius $R_{tip}$ of the blade airfoil 1500/1522 (or 0.72 $R/R_{tip}$).

In some embodiments, the furthest forward or forward-most axial point 1510/1532 of the leading edge 1506/1528 and/or the maximum chord 1512/1534 (i.e., a maximum length of a chord of the blade airfoil 1500/1522 extending from the leading edge 1506/1528 to the trailing edge 1508/1530) for the blade airfoil 1500/1522 may be defined as a function of the span of the blade airfoil 1500/1522. As indicated above, depending on a particular hub radius ratio corresponding to a particular blade airfoil 1500/1522, the spanwise location of the furthest forward or forward-most axial point 1510/1532 of the leading edge 1506/1528 and/or the maximum chord 1512/1534 (i.e., a maximum length of a chord of the blade airfoil 1500/1522 extending from the leading edge 1506/1528 to the trailing edge 1508/1530) for the blade airfoil 1500/1522 may vary. For example, in some embodiments, the blade airfoil 1500/1522 is configured such that the furthest forward or forward-most axial point 1510/1532 of the leading edge 1506/1528 at its design orientation (e.g., at an orientation representative of subsonic cruise operation) is defined or radially located at or greater than fifty percent (50%) of the span of the blade airfoil 1500/1522. Additionally, the maximum chord 1512/1534 (i.e., a maximum length of a chord of the blade airfoil 1500/1522 extending from the leading edge 1506/1528 to the trailing edge 1508/1530) for the blade airfoil 1500/1522 is defined or radially located at or greater than fifty percent (50%) of the span of the blade airfoil 1500/1522. In some embodiments, the blade airfoil 1500/1522 is configured such that a furthest forward or forward-most axial point 1510/1532 of the leading edge 1506/1528 is defined or radially located at or greater than fifty-five percent (55%) of the span of the blade airfoil 1500/1522. Additionally, in some embodiments, the maximum chord 1512/1534 (i.e., a maximum length of a chord of the blade airfoil 1500/1522 extending from the leading edge 1506/1528 to the trailing edge 1508/1530) for the blade airfoil 1500/1522 is defined or radially located at or greater than fifty-five percent (55%) of the span of the blade airfoil 1500/1522. In some embodiments, the blade airfoil 1500/1522 is configured such that a furthest forward or forward-most axial point 1510/1532 of the leading edge 1506/1528 is defined or radially located at or greater than sixty percent (60%) of the span of the blade airfoil 1500/1522. Additionally, in some embodiments, the maximum chord 1512/1534 (i.e., a maximum length of a chord of the blade airfoil 1500/1522 extending from the leading edge 1506/1528 to the trailing edge 1508/1530) for the blade airfoil 1500/1522 is defined or radially located at or greater than sixty percent (60%) of the span of the blade airfoil 1500/1522.

Figure 17:
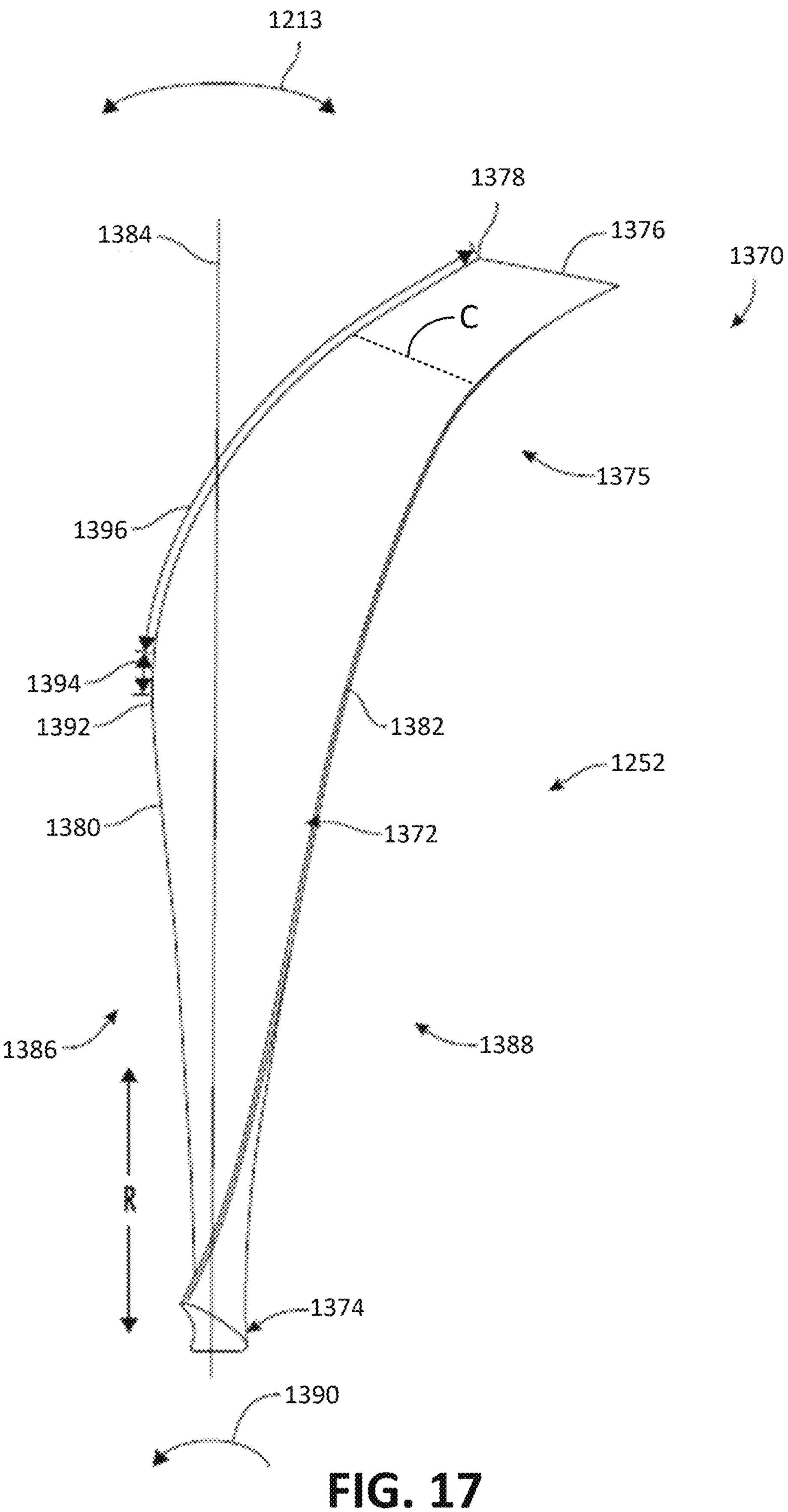
FIG. 17 is a schematic view of an exemplary airfoil according to various embodiments of the present disclosure.

Referring to FIG. 17, FIG. 17 is a schematic view of an exemplary blade airfoil or blade 1372 of an unducted blade airfoil assembly 1370 according to an embodiment of the present disclosure. In some embodiments, blade airfoil 1372 may be configured similarly to the blade airfoil 1314 (FIGS. 13 and 14), the blade airfoil 1500 (FIGS. 15A and 15B), or the blade airfoil 1522 (FIGS. 16A and 16B). In FIG. 17, the blade airfoil 1372 is viewed from the aft direction looking in the forward direction. The exemplary unducted blade airfoil assembly 1370 may be configured for use as the fan 1252 or the fan guide vane array 1260 of FIG. 12. The unducted blade airfoil assembly 1370 includes an array of the blade airfoils 1372 (only one shown in FIG. 17) that are regularly spaced apart circumferentially (e.g., in the circumferential direction 1213 (FIG. 12)) around a disk or hub of a rotor centered on the longitudinal axis 1212 (FIG. 12) of the fan 1252 (FIG. 12). Each blade airfoil 1372 includes a leading edge 1380, a trailing edge 1382, a root or proximal end 1374 (i.e., an inboard end in the radial direction R toward the longitudinal axis 1212 (FIG. 12)) and a tip portion 1375 defining a tip 1376 and a tip leading edge 1378 (defined at an intersection of the tip 1376 with the leading edge 1380) such that a span or spanwise direction of the blade airfoil 1372 is defined between the root 1374 and the tip 1376. As indicated above, the "tip portion" 1375 is defined as a portion of the blade airfoil 1372 extending radially from the radial location of a forward-most axial point of the leading edge 1380 of the blade airfoil 1372 to the radial location of the tip leading edge 1378 of the blade airfoil 1372 when the blade airfoil 1372 is at its design orientation (e.g., at an orientation representative of subsonic cruise operation). The blade airfoil 1372 forms an aerodynamic surface extending along the axial direction between the leading edge 1380 and the trailing edge 1382. Each fan blade airfoil 1372 defines a central blade axis 1384. In some embodiments, each fan blade airfoil 1372 is pitchable about its central blade axis 1384.

In the illustrated embodiment, the blade airfoil 1372 includes a pressure side 1386 and a circumferentially or laterally opposite suction side 1388. The pressure side 1386 is generally concave and precedes the generally convex suction side 1388 as the blade airfoil 1372 rotates in a rotational direction 1390. In one aspect of the present disclosure, the blade airfoil 1372 includes certain geometries having specific circumferential lean and axial sweep features for the leading edge 1380, the trailing edge 1382, and the tip leading edge 1378. In exemplary embodiments, the blade airfoil 1372 includes certain geometries having specific circumferential lean and axial sweep features for the leading edge 1380, the trailing edge 1382, and the tip leading edge 1378 at its design orientation (e.g., as in a variable pitch fan with the blade airfoil 1372 positioned at an orientation representative of subsonic cruise operation). For example, in the embodiment illustrated in FIG. 17, the blade airfoil 1372 includes a forward-most axial point 1392 on the leading edge 1380. In the illustrated embodiment, a circumferential coordinate of the tip leading edge 1378 is located in a direction opposite a direction of rotation of the blade airfoil 1372 (e.g., a direction opposite the rotational direction 1390) with respect to a circumferential coordinate of the forward-most axial point 1392. Additionally, as illustrated in FIG. 17, circumferential coordinates of the leading edge 1380 and the trailing edge 1382 of the tip portion 1375 lean in a direction opposite a direction of rotation of the blade airfoil 1372 (e.g., a direction opposite the rotational direction 1390). In other words, the tip portion 1375 leans toward the suction side 1388 of the blade airfoil 1372. Thus, in exemplary embodiments, the entire tip portion 1375 leans in a direction opposite the rotational direction 1390. Thus, in exemplary embodiments, the tip leading edge 1378 is circumferentially offset in a direction opposite the rotational direction 1390 relative to a circumferential coordinate of the forward-most axial point 1392.

Additionally, in some embodiments, a fractional chord location (or a chordwise fractional distance) of a maximum thickness of the blade airfoil 1372 relative to the leading edge 1380 for a chordwise section of the blade airfoil 1372 is furthest forward in the tip portion 1375 of the blade airfoil 1372. As used herein, "furthest forward" refers to a fractional distance of an axial chord for the maximum thickness location from the leading edge 1380 at a given radial location and chordwise section of the blade airfoil 1372. In some embodiments, a maximum thickness of the blade airfoil 1372 in the tip portion 1375 for a chord C extending from the leading edge 1380 to the trailing edge 1382 is located between five percent to forty percent of the chord C (between 0.05 to 0.40 chord fraction) relative to the leading edge 1380. In some embodiments, a maximum thickness of the blade airfoil 1372 in the tip portion 1375 for a chord C extending from the leading edge 1380 to the trailing edge 1382 is located between five percent to thirty percent of the chord C (between 0.05 to 0.30 chord fraction) relative to the leading edge 1380. In some embodiments, a maximum thickness of the blade airfoil 1372 in the tip portion 1375 for a chord C extending from the leading edge 1380 to the trailing edge 1382 is located between five percent to twenty-five percent of the chord C (between 0.05 to 0.25 chord fraction) relative to the leading edge 1380. In some embodiments, a maximum thickness of the blade airfoil 1372 in the tip portion 1375 for a chord C extending from the leading edge 1380 to the trailing edge 1382 is located between five percent to twenty percent of the chord C (between 0.05 to 0.20 chord fraction) relative to the leading edge 1380. In some embodiments, a maximum thickness of the blade airfoil 1372 in the tip portion 1375 for a chord C extending from the leading edge 1380 to the trailing edge 1382 is located between the leading edge 1380 and forty percent of the chord C (0.40 chord fraction) relative to the leading edge 1380. In some embodiments, a maximum thickness of the blade airfoil 1372 in the tip portion 1375 for a chord C extending from the leading edge 1380 to the trailing edge 1382 is located between the leading edge 1380 and thirty percent of the chord C (0.30 chord fraction) relative to the leading edge 1380. In some embodiments, a maximum thickness of the blade airfoil 1372 in the tip portion 1375 for a chord C extending from the leading edge 1380 to the trailing edge 1382 is located between the leading edge 1380 and twenty-five percent of the chord C (0.25 chord fraction) relative to the leading edge 1380. In some embodiments, a maximum thickness of the blade airfoil 1372 in the tip portion 1375 for a chord C extending from the leading edge 1380 to the trailing edge 1382 is located between the leading edge 1380 and twenty percent of the chord C (0.20 chord fraction) relative to the leading edge 1380. Thus, in exemplary embodiments, the chordwise fractional distance from the leading edge 1380 of a maximum thickness of the blade airfoil 1372 for a chordwise section of the blade airfoil 1372 is minimum in the tip portion 1375.

Further, in some embodiments of the present disclosure, circumferential coordinates of the leading edge 1380 in a radial direction monotonically increase relative to a circumferential coordinate of the forward-most axial point 1392 of the leading edge 1380 in a direction away from a rotation of a rotor assembly (e.g., rotor assembly 1250 (FIG. 12)) containing the blade airfoil 1372 (e.g., in a direction away or opposite the rotational direction 1390) beyond certain $R/R_{tip}$ values. For example, in some embodiments, circumferential coordinates of the leading edge 1380 in a radial direction monotonically increase relative to a circumferential coordinate of the forward-most axial point 1392 in a direction away from a rotation of a rotor assembly (e.g., rotor assembly 1250 (FIG. 12)) containing the blade airfoil 1372 (e.g., in a direction away or opposite the rotational direction 1390) at or beyond an $R/R_{tip}$ value of 0.6. In some embodiments, circumferential coordinates of the leading edge 1380 in a radial direction monotonically increase relative to a circumferential coordinate of the forward-most axial point 1392 in a direction away from a rotation of a rotor assembly (e.g., rotor assembly 1250 (FIG. 12)) containing the blade airfoil 1372 (e.g., in a direction away or opposite the rotational direction 1390) at or beyond an $R/R_{tip}$ value of 0.65. In some embodiments, circumferential coordinates of the leading edge 1380 in a radial direction monotonically increase relative to a circumferential coordinate of the forward-most axial point 1392 in a direction away from a rotation of a rotor assembly (e.g., rotor assembly 1250 (FIG. 12)) containing the blade airfoil 1372 (e.g., in a direction away or opposite the rotational direction 1390) at or beyond an $R/R_{tip}$ value of 0.68. In some embodiments, circumferential coordinates of the leading edge 1380 in a radial direction monotonically increase relative to a circumferential coordinate of the forward-most axial point 1392 in a direction away from a rotation of a rotor assembly (e.g., rotor assembly 1250 (FIG. 12)) containing the blade airfoil 1372 (e.g., in a direction away or opposite the rotational direction 1390) at or beyond an $R/R_{tip}$ value of 0.72. It should also be understood that in exemplary embodiments where the blade airfoil 1372 comprises a guide vane (e.g., the fan guide vane 1262), the lean of the blade airfoil 1372 will be in the direction of rotation.

In some embodiments, relative to the circumferential coordinate of the forward-most axial point 1392 of the leading edge 1380, circumferential coordinates of a first sub-portion 1394 of the leading edge 1380 in the tip portion 1375 immediately outboard of the forward-most axial point 1392 lean in the direction of rotation of a rotor assembly (e.g., rotor assembly 1250 (FIG. 12)) containing the blade airfoil 1372, and for a second sub-portion 1396 of the leading edge 1380 in the tip portion 1375 immediately outboard of the first sub-portion 1394 extending to the tip 1376, circumferential coordinates of the leading edge 1380 monotonically increase, in a radial direction, in a direction away from a rotation of a rotor assembly (e.g., rotor assembly 1250 (FIG. 12)) containing the blade airfoil 1372 (e.g., in a direction away or opposite the rotational direction 1390). In some embodiments, the first sub-portion 1394 comprises less than twenty-five percent (25%) of the tip portion 1375. In some embodiments, the first sub-portion 1394 comprises less than fifteen percent (15%) of the tip portion 1375. In some embodiments, the first sub-portion 1394 comprises less than ten percent (10%) of the tip portion 1375.

Figure 18:
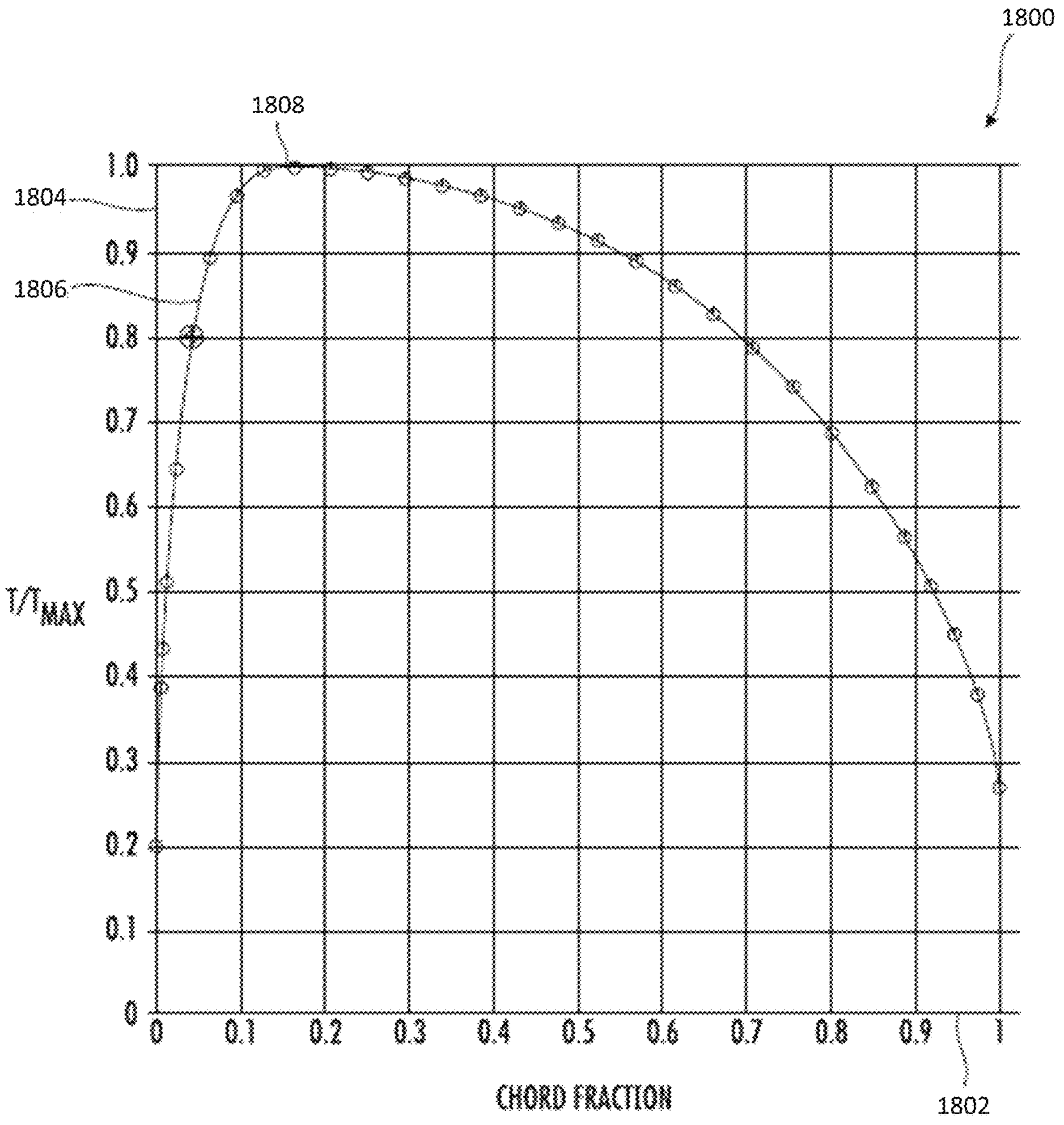
FIG. 18 is a graph illustrating a thickness ratio profile of an airfoil section as a function of a chord fraction according to embodiments of the present disclosure.

FIG. 18 is a graph 1800 illustrating a thickness ratio profile of a blade airfoil section as a function of a chord fraction according to embodiments of the present disclosure. The graph 1800 may be representative of the blade airfoil 1314 (FIGS. 13 and 14) and the blade airfoil 1372 (FIG. 17) as described herein. In the illustrated embodiment, the graph 1800 illustrates a thickness ratio near the tip 1328/1376 (FIGS. 13, 14, and 17) of the blade airfoil 1314/1372 (FIGS. 13, 14, and 17). It should be understood that the thickness ratio may correspond to different blade airfoil sections near the tip of the blade airfoil (e.g., in at least a portion of the tip portions 1346/1375 of the blade airfoils 1314/1372 (FIG. 17)) or elsewhere. Graph 1800 includes a horizontal axis 1802 graduated in units of chord fraction and a vertical axis 1804 expressed as thickness ratio (i.e., blade airfoil section thickness at a point of interest divided by a maximum thickness of the blade airfoil section). The blade airfoil section of the exemplary embodiment is designed for low noise and high efficiency (i.e., within blade airfoil 1314 (FIGS. 13 and 14) or blade airfoil 1372 (FIG. 17)) having a thickness ratio 1806 substantially increased between 0.0 to 0.16 chord fraction. In one embodiment, a peak or maximum thickness 1808 of the blade airfoil section of the blade airfoil 1314/1372 (FIGS. 13, 14, and 17) in at least a portion of the tip portion 1346/1375 is at approximately 0.16 chord fraction. Thus, in this example, $T_{MAX}$ of the blade airfoil 1314/1372 (FIGS. 13, 14, and 17) is between 0.05 and 0.2 chord fraction. Further, in the illustrated embodiment, the thickness ratio 1806 is equal to or greater than 0.8 at a chord fraction of 0.05. In other words, in some embodiments, the thickness ratio 1806 is equal to or greater than 0.8 at a chord fraction between 0.05 and 0.16. In some embodiments, the thickness ratio 1806 is equal to or greater than 0.8 at a chord fraction between 0.05 and 0.15. In some embodiments, the thickness ratio 1806 is equal to or greater than 0.8 at a chord fraction between 0.05 and 0.10.

In some embodiments, the thickness profile of the blade airfoil section (e.g., in at least a portion of the tip portion 1346/1375 of the blade airfoil 1314/1372 (FIG. 17)) remains substantially flat over a particular chord fraction range relative to a $T_{MAX}$ chord fraction. For example, using the blade airfoil 1372 (FIG. 17) as an example, in some embodiments, the thickness T does not decrease from $T_{MAX}$ by more than ten percent (10%) over a chord fraction range extending from the $T_{MAX}$ chord fraction location to a chord fraction located midway between either the leading edge 1380 (FIG. 17) or trailing edge 1382 (FIG. 17) of the blade airfoil 1372 (FIG. 17). For example, in some embodiments, $T_{MAX}$ is located at 0.16 chord fraction. Midway between the $T_{MAX}$ chord fraction of 0.16 and the leading edge 1380 (FIG. 17) is 0.08 chord fraction, and midway between the $T_{MAX}$ chord fraction of 0.16 and the trailing edge 1382 (FIG. 17) is 0.58 chord fraction. Thus, in this embodiment, the thickness T of the blade airfoil 1372 (FIG. 17) does not decrease from $T_{MAX}$ by more than ten percent (10%) between 0.08 and 0.58 chord fractions. Thus, in this embodiment, $T/T_{MAX}$ is equal to or greater than 0.9 between chord fractions 0.08 and 0.58. Thus, in this embodiment, for a particular $T_{MAX}$ chord fraction, $T/T_{MAX}$ is equal to or greater than 0.90 over a chord fraction range extending from a chord fraction location midway between the leading edge 1380 (FIG. 17) and the $T_{MAX}$ chord fraction to a chord fraction location midway between the trailing edge 1382 (FIG. 17) and the $T_{MAX}$ chord fraction.

In some embodiments (e.g., in at least a portion of the tip portion 1346/1375 of the blade airfoil 1314/1372 (FIG. 17)), $T/T_{MAX}$ is equal to or greater than 0.85 between chord fractions 0.08 and 0.58. For example, in this embodiment and as shown in FIG. 5, the thickness T of the blade airfoil 1372 (FIG. 17) does not decrease from $T_{MAX}$ by more than fifteen percent (15%) between 0.08 and 0.58 chord fractions. Accordingly, in some embodiments, for a particular $T_{MAX}$ chord fraction, $T/T_{MAX}$ is equal to or greater than 0.85 over a chord fraction range extending from a chord fraction midway between the leading edge 1380 (FIG. 17) and the $T_{MAX}$ chord fraction to a chord fraction midway between the trailing edge 1382 (FIG. 17) and the $T_{MAX}$ chord fraction. In some embodiments, the thickness T of the blade airfoil 1372 (FIG. 17) does not decrease from $T_{MAX}$ by more than twenty percent (20%) between 0.08 and 0.58 chord fractions. Accordingly, in this embodiment, for a particular $T_{MAX}$ chord fraction, $T/T_{MAX}$ is equal to or greater than 0.80 over a chord fraction range extending from a chord fraction midway between the leading edge 1380 (FIG. 17) and the $T_{MAX}$ chord fraction to a chord fraction midway between the trailing edge 1382 (FIG. 17) and the $T_{MAX}$ chord fraction.

Figure 19:
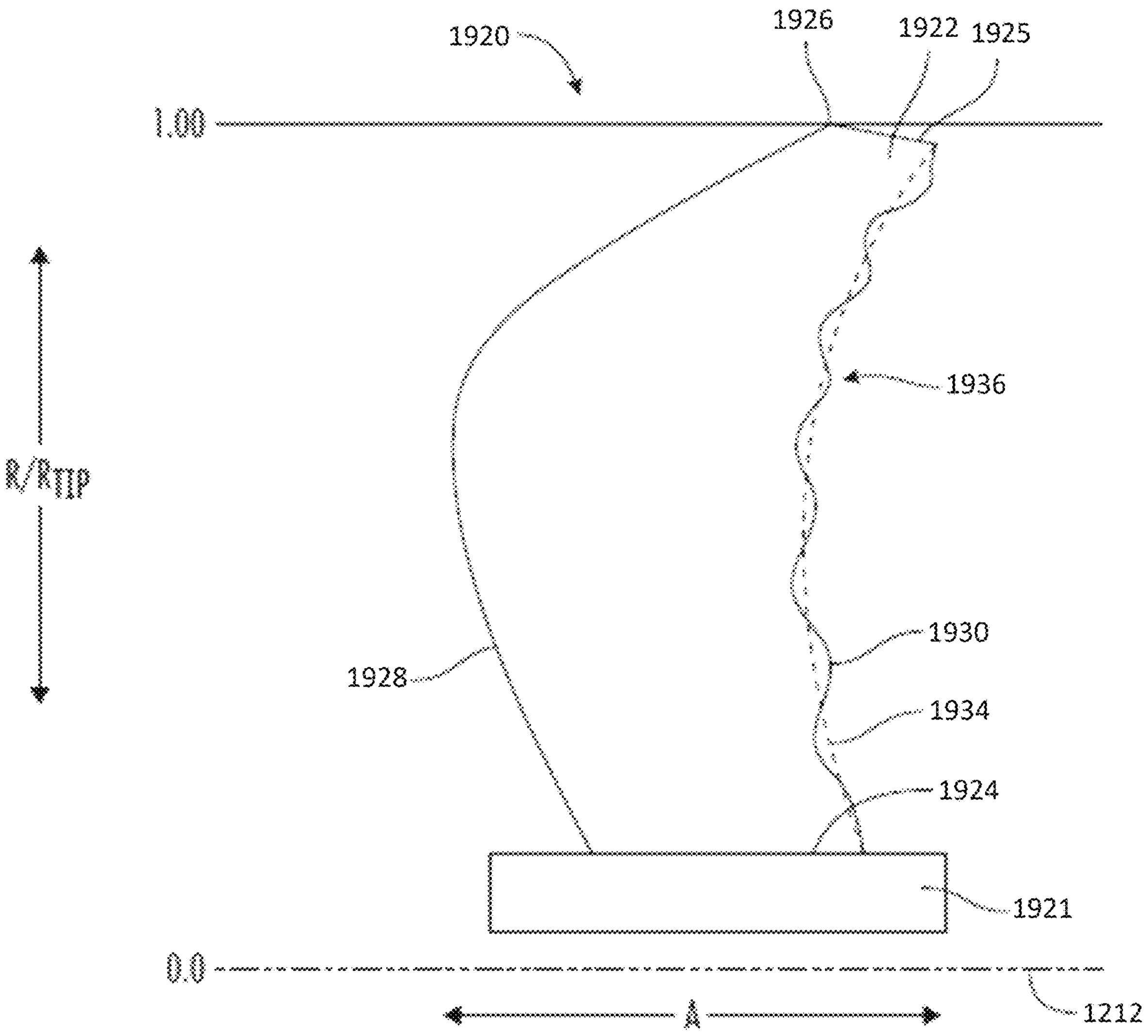
FIG. 19 is a schematic view of an exemplary airfoil according to another embodiment of the present disclosure.

Referring to FIG. 19, FIG. 19 is a schematic view of an exemplary blade airfoil or blade 1922 of an unducted blade airfoil assembly 1920 according to another embodiment of the present disclosure. The blade airfoil 1922 may be configured similarly to the blade airfoil 1314 (FIGS. 13 and 14), the blade airfoil 1500 (FIGS. 15A and 15B), the blade airfoil 1522 (FIGS. 16A and 16B), or the blade airfoil 1372 (FIG. 17). The blade airfoil 1922 may be configured for use as the fan 1252 or the fan guide vane array 1260 of the engine 1200 as depicted in FIG. 12. For example, an array or plurality of the blade airfoils 1922 (only one shown in FIG. 19) may be regularly spaced apart circumferentially around a disk or hub 1921 of a rotor centered on the longitudinal axis 1212 of the fan 1252 (FIG. 12).

In the illustrated embodiment, the blade airfoil 1922 includes a sculpted trailing edge feature 1936. For example, in the illustrated embodiment, blade airfoil 1922 includes a leading edge 1928, a trailing edge 1930, a root or proximal end 1924 (i.e., an inboard end in the radial direction toward the longitudinal axis 1212 (FIG. 12)) and a tip 1925. Also, an intersection of the tip 1925 and the leading edge 1928 is defined as a tip leading edge 1926 such that a span or spanwise direction of the blade airfoil 1922 is defined between the root 1924 and the tip 1925. Blade airfoil 1922 forms an aerodynamic surface extending along the axial direction A between the leading edge 1928 and the trailing edge 1930. In the illustrated embodiment, the blade airfoil 1922 includes at its trailing edge 1930 the sculpted trailing edge feature 1936 (e.g., a wavy feature or plurality of features) configured to facilitate wake mixing to reduce interaction noise caused by the blade airfoil 1922 wakes impinging on downstream stationary blade airfoils or stators (or stator vanes), as described in U.S. Pat. No. 8,083,487 B2 which is hereby incorporated by reference in its entirety. A baseline 1934 trailing edge having a smooth profile is depicted to further illustrate the sculpted trailing edge feature 1936. Alternatively or additionally, the sculpted trailing edge feature 1936 may be applied on the fan guide vanes 1262 of the engine 1200 (FIG. 12) to reduce the broadband noise generated by the turbulence in the stator vane boundary layer convecting past its trailing edge.

Figure 20:
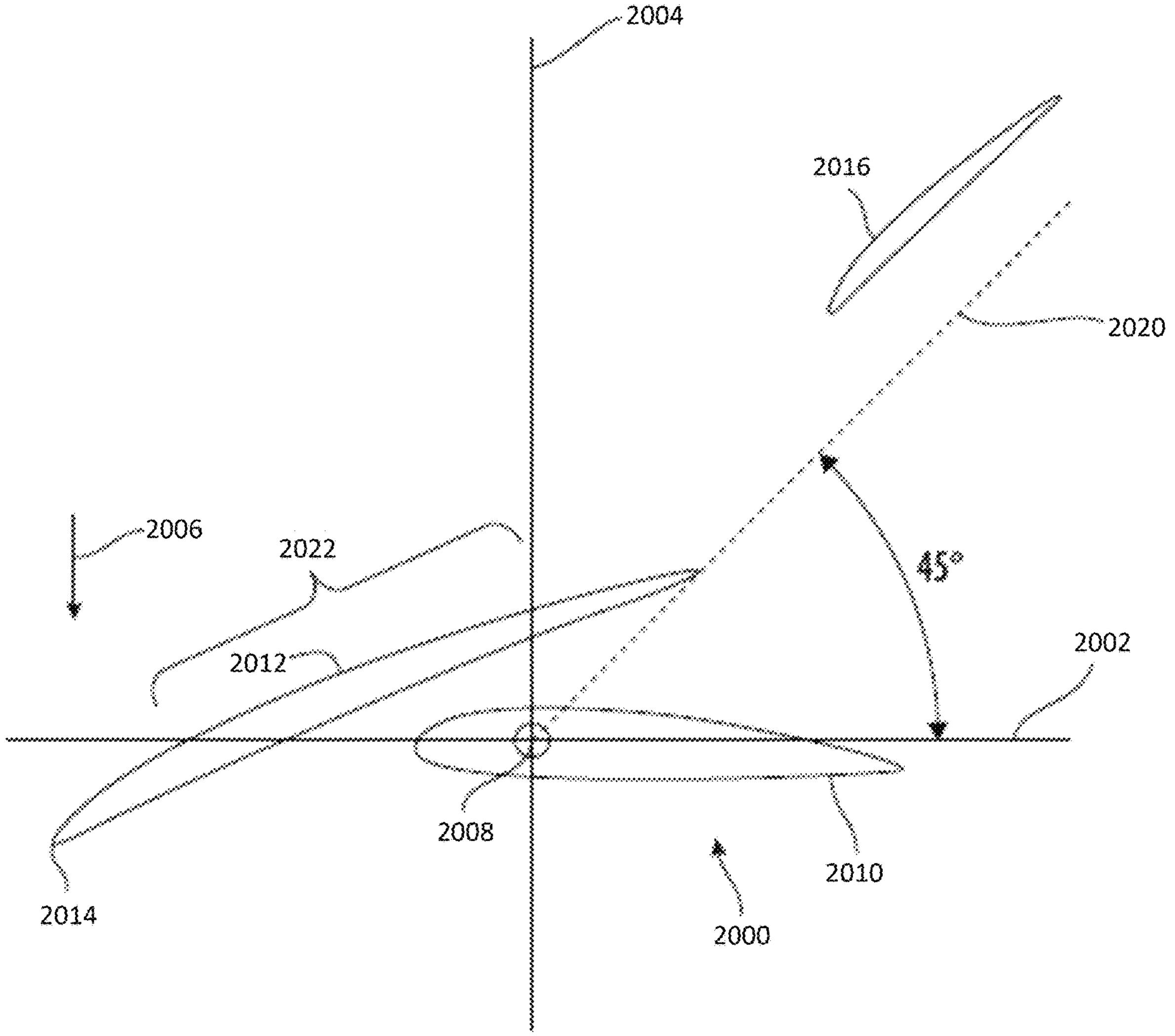
FIG. 20 is a schematic view of exemplary airfoil sections taken at different radial locations of an airfoil according to embodiments of the present disclosure.

Referring to FIG. 20, FIG. 20 is a schematic view of exemplary sections of a blade airfoil 2000 taken at different radial locations of the blade airfoil 2000 according to embodiments of the present disclosure. For example, in exemplary embodiments, exemplary sections of the blade airfoil 2000 taken at different radial locations of the blade airfoil 2000 depicted in FIG. 20 may correspond to the blade airfoil 2000 being positioned at its design orientation (e.g., in a variable pitch fan with the blade airfoil 2000 positioned at an orientation representative of high subsonic cruise flight speed or operation). The blade airfoil 2000 may be configured similarly to the blade airfoil 1314 (FIGS. 13 and 14), the blade airfoil 1372 (FIG. 17), or the blade airfoil 1922 (FIG. 19). In FIG. 20, a horizontal axis 2002 represents an axial direction A (e.g., left-to-right in FIG. 20 representing the aft direction), a vertical axis 2004 represents a circumferential direction, the direction of rotation of the blade airfoil 2000 is represented by an arrow 2006, and the intersection of the horizontal axis 2002 with the vertical axis 2004 represents a pitch change axis 2008 of the blade airfoil 2000.

In FIG. 20, a blade airfoil section 2010 of the blade airfoil 2000 is taken at a hub location (e.g., the hub 1316 (FIG. 13) for the blade airfoil 1314 (FIG. 13)) of the blade airfoil 2000, an blade airfoil section 2012 of the blade airfoil 2000 is taken at a forward-most axial point 2014 of the blade airfoil 2000 (e.g., the forward-most axial point 1340 (FIG. 13) for the blade airfoil 1314 (FIG. 13), and a blade airfoil section 2016 of the blade airfoil 2000 is taken at a tip of the blade airfoil 2000 (e.g., the tip 1328 (FIG. 13) for the blade airfoil 1314 (FIG. 13)). As depicted in FIG. 20, in exemplary embodiments, the position of a point on the blade airfoil section 2016 at the tip of the blade airfoil 2000 (e.g., the tip 1328 (FIG. 13) for the blade airfoil 1314 (FIG. 13)) at a twenty-five percent (25%) chord fraction on the meanline of the blade airfoil section 2016 is such that the magnitude of its circumferential offset from the pitch change axis 2008 is greater than the magnitude of the axial offset from the pitch change axis 2008, and wherein the point is located axially aft of the pitch change axis 2008. For example, in FIG. 20, a line 2020 depicted at a forty-five degree (45°) angle relative to the horizontal axis 2002 represents points of equal magnitude of circumferential offset and axial offset relative to the pitch change axis 2008. Thus, in the portion of FIG. 20 above the horizontal axis 2002 and to the right of the vertical axis 2004, points above and to the left of the line 2020 represent a greater magnitude of circumferential offset relative to the pitch change axis 2008 than the magnitude of an axial offset relative to the pitch change axis 2008. Additionally, in some embodiments, at least a portion 2022 of the blade airfoil 2000 in the tip portion (e.g., as depicted at least by the blade airfoil section 2012) lies axially forward and circumferentially away from the direction of rotation 2006 relative to the pitch change axis 2008 (e.g., in the portion of FIG. 20 above the horizontal axis 2002 and to the left of the vertical axis 2004).

Thus, embodiments of the present disclosure include circumferentially spaced blade airfoils or blades where the blades include a leading edge and a trailing edge, and further defining a root and a tip extending radially to define a span of the blade airfoil. Embodiments of the present disclosure increase the lean and axial sweep of the blade airfoil near the tip of the blade airfoil to reduce noise radiated by the blade airfoil. Embodiments of the present disclosure reduce noise at cruise and LTO flight conditions while minimizing weight and mechanical complexity by localizing sweep in the acoustically sensitive portions of the blade airfoil by tailoring the chord and axial position of the leading edge of the blade airfoil. For example, in some embodiments, a forward-most axial point of the leading edge is located at or between sixty percent and seventy-five percent of a tip radius of the blade airfoil. Additionally, in some embodiments, a maximum chord extending from the leading edge to the trailing edge is located at or between sixty percent and seventy-five percent of a tip radius of the blade airfoil.

Thus, embodiments of the present disclosure include circumferentially spaced blade airfoils or blades where the blades in the outer or tip portion are configured having a defined lean to minimize cruise flight condition pressure signatures. Additionally, in some embodiments, a thickness distribution in the outer or tip portion of the blade airfoil is configured to minimize wakes at landing and takeoff (LTO) flight conditions. Further, embodiments of the present disclosure provide greater mechanical stability while reducing noise radiated by the blade airfoil. For example, embodiments of the present disclosure have an increased leading edge thickness that improves incidence tolerance at off-design flight conditions, thereby reducing noise. Moreover, embodiments of the present disclosure move the thickness distribution forward without changing a maximum thickness value in regions where desired while maintaining blade airfoil weight and reducing noise.

As will be appreciated from the description herein, various embodiments of a gas turbine engine are provided. Certain of these embodiments may be an unducted, single rotor gas turbine engine. Various additional aspects of one or more of these embodiments are discussed below. These exemplary aspects may be combined with one or more of the exemplary gas turbine engine(s) discussed above with respect to the figures.

For example, in some embodiments of the present disclosure, the engine may include a heat exchanger located in an annular duct, such as in a third stream. The heat exchanger may extend substantially continuously in a circumferential direction of the gas turbine engine (e.g., at least about 300 degrees, such as at least about 330 degrees).

In one or more of these embodiments, a threshold power or disk loading for a fan (e.g., an unducted single rotor or primary forward fan) may range from 25 horsepower per square foot (hp/ft2) or greater at cruise altitude during a cruise operating mode. In particular embodiments of the engine, structures and methods provided herein generate power loading between 80 hp/ft2 and 160 hp/ft2 or higher at cruise altitude during a cruise operating mode.

In various embodiments, an engine of the present disclosure is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature. In some exemplary embodiments, the fan may have an aerodynamic loading distribution to maximize cruise efficiency as described in U.S. Pat. No. 10,202,865 B2 which is hereby incorporated by reference in its entirety.

As such, it will be appreciated that an engine of such a configuration may be configured to generate at least about 20,000 pounds and less than about 80,000 of thrust during operation at a rated speed, such as between about 20,000 and 50,000 pounds of thrust during operation at a rated speed, such as between about 20,000 and 40,000 pounds of thrust during operation at a rated speed.

In various exemplary embodiments, the fan may include twelve (12) fan blades. From a loading standpoint, such a blade count may allow a span of each blade to be reduced such that the overall diameter of the primary fan may also be reduced (e.g., to about twelve feet in one exemplary embodiment). That said, in other embodiments, the fan may have any suitable blade count and any suitable diameter. In certain suitable embodiments, the fan includes at least eight (8) blades. In another suitable embodiment, the fan may have at least twelve (12) blades. In yet another suitable embodiment, the fan may have at least fifteen (15) blades. In yet another suitable embodiment, the fan may have at least eighteen (18) blades. In one or more of these embodiments, the fan includes twenty-six (26) or fewer blades, such as twenty (20) or fewer blades. In some embodiments, the improvements to the shape of the fan blades described herein, including, for example, one or more of a forward-most axial point of a leading edge of a fan blade being radially located at or greater than sixty percent of a tip radius of the blade airfoil, a tip leading edge of the fan blade being circumferentially offset in a direction opposite a rotational direction relative to a circumferential location of the forward-most axial point (i.e. toward the suction side of the fan blade), a maximum thickness of the fan blade in the tip portion for a chord extending from the leading edge to the trailing edge being located between five percent to thirty percent of the chord relative to the leading edge, a maximum chord of the fan blade extending from the leading edge to the trailing edge being located at or greater than sixty percent of the tip radius, and/or a chordwise fractional distance to a maximum thickness being minimum in a tip portion of the blade airfoil, may be applied to all of the rotating fan blades of an unducted fan propulsor. In other embodiments, these improvements need not be applied to all of the fan blades. For example, the improvements to the fan blades may be applied to every other fan blade, to every two out of three fan blades, to every three out of four fan blades, etc., resulting in a balanced distribution of the fan blades with these improvements in an array of rotating fan blades. Further, in certain exemplary embodiments, the rotor assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet.

In various embodiments, it will be appreciated that the engine includes a ratio of a quantity of blades to a quantity of vanes that could be less than, equal to, or greater than 1:1. For example, in particular embodiments, the engine includes twelve (12) fan blades and ten (10) vanes. In other embodiments, the vane assembly includes a greater quantity of vanes to fan blades. For example, in particular embodiments, the engine includes ten (10) fan blades and twenty-three (23) vanes. For example, in certain embodiments, the engine may include a ratio of a quantity of blades to a quantity of vanes between 2:5 and 2:1, or between 2:4 and 3:2, or between 0.5 and 1.5. The ratio may be tuned based on a variety of factors including a size of the vanes to ensure a desired amount of swirl is removed for an airflow from the primary fan. In various embodiments, the quantity of blades is twenty (20) or fewer. In still certain embodiments, a sum of the quantity of blades and the quantity of vanes is between twenty (20) and thirty (30), or between twenty-four (24) and twenty-eight (28), or between twenty-five (25) and twenty-seven (27). In one embodiment, the engine includes a quantity of blades between eleven (11) and sixteen (16). In another embodiment, the engine includes twelve (12) blades and ten (10) vanes. In still another embodiment, the engine includes between three (3) and twenty (20) blades and between three (3) and twenty (20) vanes. In yet another embodiment, the engine includes an equal quantity of blades and vanes. In still yet another embodiment, the engine includes an equal quantity of blades and vanes, in which the quantity of blades is equal to or fewer than twenty (20). In various embodiments, the engine includes a combination of the quantity of blades to the quantity of vanes between 2:5 and 2:1, the difference between the quantity of blades and the quantity of vanes between two (2) and negative two (−2), and the quantity of blades between eleven (11) and sixteen (16). For example, a difference between the quantity of blades and the quantity of vanes may correspond to an engine having fourteen (14) blades and sixteen (16) vanes, or fourteen (14) blades and twelve (12) vanes, or sixteen (16) blades and eighteen (18) vanes, or sixteen (16) blades and fourteen (14) vanes, or eleven (11) blades and thirteen (13) vanes, or eleven (11) blades and nine (9) vanes, etc.

Additionally, in certain exemplary embodiments, where the engine includes the third stream and a mid-fan (a ducted fan aft of the primary, forward fan), a ratio R1/R2 may be between about 1 and 10, or 2 and 7, or at least about 3.3, at least about 3.5, at least about 4 and less than or equal to about 7, where R1 is the radius of the primary fan and R2 is the radius of the mid-fan.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps). In other embodiments, the rotor blade tip speed at a cruise flight condition can be 600 to 900 fps, or 700 to 800 fps.

A fan pressure ratio (FPR) for the fan of the fan assembly can be 1.04 to 1.20, or in some embodiments 1.05 to 1.1, or in some embodiments less than 1.08, as measured across the fan blades at a cruise flight condition.

In order for the gas turbine engine to operate with a fan having the above characteristics to define the above FPR, a gear assembly may be provided to reduce a rotational speed of the fan assembly relative to a driving shaft (such as a low pressure shaft coupled to a low pressure turbine). In some embodiments, a gear ratio of the input rotational speed to the output rotational speed is greater than 4.1. For example, in particular embodiments, the gear ratio is within a range of 4.1 to 14.0, within a range of 4.5 to 14.0, or within a range of 6.0 to 14.0. In certain embodiments, the gear ratio is within a range of 4.5 to 12 or within a range of 6.0 to 11.0. As such, in some embodiments, the fan can be configured to rotate at a rotational speed of 700 to 1500 rpm at a cruise flight condition, while the power turbine (e.g., the low-pressure turbine) is configured to rotate at a rotational speed of 2,500 to 15,000 rpm at a cruise flight condition. In particular embodiments, the fan can be configured to rotate at a rotational speed of 850 to 1,350 rpm at a cruise flight condition, while the power turbine is configured to rotate at a rotational speed of 5,000 to 10,000 rpm at a cruise flight condition.

With respect to a turbomachine of the gas turbine engine, the compressors and/or turbines can include various stage counts. As disclosed herein, the stage count includes the number of rotors or blade stages in a particular component (e.g., a compressor or turbine). For example, in some embodiments, a low pressure compressor may include 1 to 8 stages, a high-pressure compressor may include 8 to 15 stages, a high-pressure turbine may include 1 to 2 stages, and/or a low pressure turbine (LPT) may include 3 to 7 stages. In particular, the LPT may have 4 stages, or between 4 and 7 stages. For example, in certain embodiments, an engine may include a one stage low pressure compressor, an 11 stage high pressure compressor, a two stage high pressure turbine, and 4 stages, or between 4 and 7 stages for the LPT. As another example, an engine can include a three stage low-pressure compressor, a 10 stage high pressure compressor, a two stage high pressure turbine, and a 7 stage low pressure turbine.

A core engine is generally encased in an outer casing defining one half of a core diameter (Dcore), which may be thought of as the maximum extent from a centerline axis (datum for R). In certain embodiments, the engine includes a length (L) from a longitudinally (or axial) forward end to a longitudinally aft end. In various embodiments, the engine defines a ratio of L/Dcore that provides for reduced installed drag. In one embodiment, L/Dcore is at least 2. In another embodiment, L/Dcore is at least 2.5. In some embodiments, the L/Dcore is less than 5, less than 4, and less than 3. In various embodiments, it should be appreciated that the L/Dcore is for a single unducted rotor engine.

The reduced installed drag may further provide for improved efficiency, such as improved specific fuel consumption. Additionally, or alternatively, the reduced drag may provide for cruise altitude engine and aircraft operation at the above describe Mach numbers at cruise altitude. Still particular embodiments may provide such benefits with reduced interaction noise between the blade assembly and the vane assembly and/or decreased overall noise generated by the engine by virtue of structures located in an annular duct of the engine.

Additionally, it should be appreciated that ranges of power loading and/or rotor blade tip speed may correspond to certain structures, core sizes, thrust outputs, etc., or other structures at the core engine. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Further aspects of the disclosure are provided by the subject matter of the following clauses:

Clause 1: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1 MajAL/D is 2.8 and 1MinAL/D is 1.7.

In the preceding clause, the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

In any of the preceding clauses, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 2: An aircraft is provided including a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein 0.065<RL/D<1.98 and θ is between 187° and 340°, and wherein RL/D and θ of the P of the unducted fan propulsor adhere to the following expressions:

$$\frac{RL}{D}+\frac{\left(\begin{array}{c}\sqrt{1.4161*[1.88978*\sin^2(\theta)-0.0875*\cos^2(\theta)+0.477*\sin(\theta)*\cos(\theta)]}\ +\\ 1.764*\sin(\theta)+0.19146*\cos(\theta)\end{array}\right)}{1.96*\sin^2(\theta)+0.7225*\cos^2(\theta)}>0$$

and $$\frac{RL}{D}+\frac{\left(\begin{array}{c}-\sqrt{1.4161*[1.88978*\sin^2(\theta)-0.0875*\cos^2(\theta)+0.477*\sin(\theta)*\cos(\theta)]}\ +\\ 1.764*\sin(\theta)+0.19146*\cos(\theta)\end{array}\right)}{1.96*\sin^2(\theta)+0.7225*\cos^2(\theta)}<0.$$

In the preceding clause, 0.254<RL/D<1.86 and θ is between 199° and 306°, and the P of the unducted fan propulsor is defined by the following expressions:

$$\frac{RL}{D}+\frac{\left(\begin{array}{c}\sqrt{0.52621*[0.7205*\sin^2(\theta)-0.352*\cos^2(\theta)+0.7448*\sin(\theta)*\cos(\theta)]}\ +\\ 0.8476*\sin(\theta)+0.23119*\cos(\theta)\end{array}\right)}{0.8649*\sin^2(\theta)+0.6084*\cos^2(\theta)}>0$$

and $$\frac{RL}{D}+\frac{\left(\begin{array}{c}\sqrt{-0.52621*[0.7205*\sin^2(\theta)-0.352*\cos^2(\theta)+0.7448*\sin(\theta)*\cos(\theta)}\ +\\ 0.8476*\sin(\theta)+0.23119*\cos(\theta)\end{array}\right)}{0.8649*\sin^2(\theta)+0.6084*\cos^2(\theta)}<0.$$

In any of the two preceding clauses, 0.369<RL/D<1.43 and θ is between 204° and 291°, and the P of the unducted fan propulsor is defined by the following expressions:

$$\frac{RL}{D}+\frac{\left(\begin{array}{c}\sqrt{0.52621*[0.7205*\sin^2(\theta)-0.352*\cos^2(\theta)+0.7448*\sin(\theta)*\cos(\theta)]}\ +\\ 0.8476*\sin(\theta)+0.23119*\cos(\theta)\end{array}\right)}{0.8649*\sin^2(\theta)+0.6084*\cos^2(\theta)}>0$$

-continued and $$\frac{RL}{D}+\frac{\left(\begin{array}{c}\sqrt{-0.52621*\left[0.7205*\sin^2(\theta)-0.352*\cos^2(\theta)+0.7448*\sin(\theta)*\cos(\theta)\right]}+\\0.8476*\sin(\theta)+0.23119*\cos(\theta)\end{array}\right)}{0.8649*\sin^2(\theta)+0.6084*\cos^2(\theta)}<0.$$

In any of the three preceding clauses: 0.477<RL/D<0.9455 and θ is between 211° and 274°, and the P of the unducted fan propulsor is defined by the following expressions:

$$\frac{RL}{D}+\frac{\left(\begin{array}{c}\sqrt{0.01069156*\left[0.036*\sin^2(\theta)-0.3485*\cos^2(\theta)+0.5418*\sin(\theta)*\cos(\theta)\right]}+\\0.139167*\sin(\theta)+0.020812*\cos(\theta)\end{array}\right)}{0.2209*\sin^2(\theta)+0.0484*\cos^2(\theta)}>0$$

and $$\frac{RL}{D}+\frac{\left(\begin{array}{c}-\sqrt{0.01069156*\left[0.036*\sin^2(\theta)-0.3485*\cos^2(\theta)+0.5418*\sin(\theta)*\cos(\theta)\right]}+\\0.139167*\sin(\theta)+0.020812*\cos(\theta)\end{array}\right)}{0.2209*\sin^2(\theta)+0.0484*\cos^2(\theta)}<0.$$

In any of the four preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

Clause 3: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

In any of the preceding clauses, 0.15≤RL/D.

In any of the preceding clauses, 0.35≤RL/D, and preferably RL/D is about 0.72.

In any of the preceding clauses, wherein θ is between 198° and 310°, and preferably between 205° and 285°.

In any of the preceding clauses, the unducted fan propulsor operates at a cruise flight Mach $M_0$ of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15\frac{F_{net}}{\rho_0 A_{an} V_0^2}>0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

In any of the preceding clauses, wherein the unducted propulsor has two arrays of blades and only one of the array of blades is rotating.

Clause 4: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of counterclockwise rotating blades arranged in a forward array and a plurality clockwise rotating blades arranged in a rearward array, wherein one of the forward and rearward array of blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 5: An aircraft is provided that includes a fuselage; an airfoil extending from the fuselage, the airfoil having an airfoil section and the airfoil section having an effective quarter chord point (QC), and a plurality of rotating blades defining a maximum outer diameter (D); a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 6: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein 0.065<RL/D<1.98 and θ is between 187° and 340°; and wherein RL/D and θ of the P of the unducted fan propulsor adhere to the following expressions:

$$\frac{RL}{D}+\frac{\left(\begin{array}{c}\sqrt{1.4161*\left[1.88978*\sin^2(\theta)-0.0875*\cos^2(\theta)+0.477*\sin(\theta)*\cos(\theta)\right]}\ +\\ 1.764*\sin(\theta)+0.19146*\cos(\theta)\end{array}\right)}{1.96*\sin^2(\theta)+0.7225*\cos^2(\theta)}>0$$

and $$\frac{RL}{D}+\frac{\left(\begin{array}{c}-\sqrt{1.4161*\left[1.88978*\sin^2(\theta)-0.0875*\cos^2(\theta)+0.477*\sin(\theta)*\cos(\theta)\right]}\ +\\ 1.764*\sin(\theta)+0.19146*\cos(\theta)\end{array}\right)}{1.96*\sin^2(\theta)+0.7225*\cos^2(\theta)}<0.$$

The aircraft of Clause 6, wherein: 0.254<RL/D<1.86 and θ is between 199° and 306°, and the P of the unducted fan propulsor is defined by the following expressions:

$$\frac{RL}{D}+\frac{\left(\begin{array}{c}\sqrt{0.52621*\left[0.7205*\sin^2(\theta)-0.352*\cos^2(\theta)+0.7448*\sin(\theta)*\cos(\theta)\right]}\ +\\ 0.8476*\sin(\theta)+0.23119*\cos(\theta)\end{array}\right)}{0.8649*\sin^2(\theta)+0.6084*\cos^2(\theta)}>0$$

and $$\frac{RL}{D}+\frac{\left(\begin{array}{c}-\sqrt{0.52621*\left[0.7205*\sin^2(\theta)-0.352*\cos^2(\theta)+0.7448*\sin(\theta)*\cos(\theta)\right]}\ +\\ 0.8476*\sin(\theta)+0.23119*\cos(\theta)\end{array}\right)}{0.8649*\sin^2(\theta)+0.6084*\cos^2(\theta)}<0.$$

The aircraft of Clause 6, wherein: 0.369<RL/D<1.43 and θ is between 204° and 291°, and the P of the unducted fan propulsor is defined by the following expressions:

$$\frac{RL}{D}\frac{\left(\begin{array}{c}\sqrt{0.09923*\left[0.2964*\sin^2(\theta)-0.36*\cos^2(\theta)+0.66*\sin(\theta)*\cos(\theta)\right]}\ +\\ 0.3675*\sin(\theta)+0.0891*\cos(\theta)\end{array}\right)}{0.49*\sin^2(\theta)+0.2025*\cos^2(\theta)}>0$$

-continued and $$\frac{RL}{D} + \frac{\left(\begin{array}{c} -\sqrt{0.09923 * \left[0.2964 * \sin^2(\theta) - 0.36 * \cos^2(\theta) + 0.66 * \sin(\theta) * \cos(\theta)\right]} + \\ 0.3675 * \sin(\theta) + 0.0891 * \cos(\theta) \end{array}\right)}{0.49 * \sin^2(\theta) + 0.2025 * \cos^2(\theta)} < 0.$$

The aircraft of Clause 6, wherein: 0.477<RL/D<0.9455 and θ is between 211° and 274°, and the P of the unducted fan propulsor is defined by the following expressions:

$$\frac{RL}{D} + \frac{\left(\begin{array}{c} \sqrt{0.01069156 * \left[0.036 * \sin^2(\theta) - 0.3485 * \cos^2(\theta) + 0.5418 * \sin(\theta) * \cos(\theta)\right]} + \\ 0.139167 * \sin(\theta) + 0.020812 * \cos(\theta) \end{array}\right)}{0.2209 * \sin^2(\theta) + 0.0484 * \cos^2(\theta)} > 0$$

and $$\frac{RL}{D} + \frac{\left(\begin{array}{c} -\sqrt{0.01069156 * \left[0.036 * \sin^2(\theta) - 0.3485 * \cos^2(\theta) + 0.5418 * \sin(\theta) * \cos(\theta)\right]} + \\ 0.139167 * \sin(\theta) + 0.020812 * \cos(\theta) \end{array}\right)}{0.2209 * \sin^2(\theta) + 0.0484 * \cos^2(\theta)} < 0.$$

The aircraft of Clause 6, wherein the unducted fan propulsor is undermounted to the airfoil with one or more intermediate structures.

The aircraft of Clause 6, wherein the P of the unducted fan propulsor is variable to accommodate different operating conditions.

Clause 7: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of Clause 7, wherein 0.15≤RL/D.

The aircraft of Clause 7, wherein 0.35≤RL/D, and preferably RL/D is about 0.72.

The aircraft of Clause 7, wherein θ is between 198° and 310°, and preferably between 205° and 285°.

The aircraft of Clause 7, wherein the unducted fan propulsor operates at a cruise flight Mach $M_0$ of between 0.5 and 0.9, preferably between 0.7 and 0.9, and more preferably between 0.75 and 0.9.

The aircraft of Clause 7, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of Clause 7, wherein the unducted fan propulsor is undermounted to the airfoil with one or more intermediate structures.

The aircraft of Clause 7, wherein the P of the unducted fan propulsor is variable to accommodate different operating conditions.

Clause 8: A method of assembly, comprising: using an aircraft body comprising a fuselage and an airfoil extending from the fuselage, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position; wherein 0.07≤RL/D≤2.0 and θ is between 187° and 342.°.

The method of Clause 8, wherein 0.15≤RL/D.

The method of Clause 8, wherein 0.35≤RL/D, and preferably RL/D is about 0.72.

The method of Clause 8, wherein θ is between 198° and 310°, and preferably between 205° and 285°.

The method of Clause 8, wherein the unducted fan propulsor operates at a cruise flight Mach $M_0$ of between 0.5 and 0.9, preferably between 0.7 and 0.9, and more preferably between 0.75 and 0.9.

The method of Clause 8, wherein the unducted fan propulsor has a dimensionless cruise fan net thrust parameter expressed as follows:

$$15\frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The method of Clause 8, wherein the unducted fan propulsor is undermounted to the airfoil with one or more intermediate structures.

The method of Clause 8, wherein the P of the unducted fan propulsor is variable to accommodate different operating conditions.

Clause 9: A method of assembly, comprising: using an aircraft body comprising a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC); and attaching an unducted fan propulsor to the aircraft body relative to the airfoil section on a high pressure side thereof; the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1 MinAL/D is 1.7.

The method of Clause 9, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The method of Clause 9, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The method of Clause 9, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 10: An aircraft comprising: a fuselage; a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC; a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°.

Clause 11: An aircraft comprising: a fuselage; a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC; a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing; wherein 0.07≤RL/D≤2.0 and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism may be a gas turbine engine and associated transmission to delivers torque from the drive mechanism to the propeller assembly.

In any of the preceding clauses, the unducted fan propulsor is incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) may be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and 0 degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

An unducted blade airfoil assembly for a turbomachine, the blade airfoil assembly comprising: a blade airfoil defining a leading edge, a trailing edge, a root, and a tip; and wherein a forward-most axial point of the leading edge is radially located at or greater than sixty percent of a tip radius of the blade airfoil when the blade airfoil is oriented at a design orientation for subsonic cruise operation.

The unducted blade airfoil assembly of any preceding clause, wherein the blade airfoil comprises a tip portion extending radially from the forward-most axial point to the tip, and wherein a maximum thickness of the blade airfoil in the tip portion for a chord extending from the leading edge to the trailing edge is located between five percent to thirty percent of the chord relative to the leading edge.

The unducted blade airfoil assembly of any preceding clause, wherein the maximum thickness of the blade airfoil in the tip portion for the chord extending from the leading edge to the trailing edge is located between five percent (5%) to twenty-five percent (25%) of the chord relative to the leading edge.

The unducted blade airfoil assembly of any preceding clause, wherein the maximum thickness of the blade airfoil in the tip portion for the chord extending from the leading edge to the trailing edge is located between five percent (5%) to twenty percent (20%) of the chord relative to the leading edge.

The unducted blade airfoil assembly of any preceding clause, wherein the maximum thickness of the blade airfoil in the tip portion for the chord extending from the leading edge to the trailing edge is located between five percent (5%) to forty percent (40%) of the chord relative to the leading edge.

The unducted blade airfoil assembly of any preceding clause, wherein the maximum thickness of the blade airfoil in the tip portion for the chord extending from the leading edge to the trailing edge is located between the leading edge and forty percent (40%) of the chord relative to the leading edge.

The unducted blade airfoil assembly of any preceding clause, wherein the maximum thickness of the blade airfoil in the tip portion for the chord extending from the leading edge to the trailing edge is located between the leading edge and thirty percent (30%) of the chord relative to the leading edge.

The unducted blade airfoil assembly of any preceding clause, wherein the maximum thickness of the blade airfoil in the tip portion for the chord extending from the leading edge to the trailing edge is located between the leading edge and twenty-five (25%) percent of the chord relative to the leading edge.

The unducted blade airfoil assembly of any preceding clause, wherein the maximum thickness of the blade airfoil in the tip portion for the chord extending from the leading edge to the trailing edge is located between the leading edge and twenty percent (20%) of the chord relative to the leading edge.

The unducted blade airfoil assembly of any preceding clause, wherein the radial location of the forward-most axial point of the leading edge is located at or greater than seventy-two percent (72%) of the tip radius.

The unducted blade airfoil assembly of any preceding clause, wherein the radial location of the forward-most axial point of the leading edge is located at or greater than seventy-five percent (75%) of the tip radius.

The unducted blade airfoil assembly of any preceding clause, wherein the radial location of the forward-most axial point of the leading edge is located at or greater than seventy-two percent (72%) of the tip radius.

The unducted blade airfoil assembly of any preceding clause, wherein the radial location of the forward-most axial point of the leading edge is located at or greater than sixty-eight percent (68%) of the tip radius.

The unducted blade airfoil assembly of any preceding clause, wherein the radial location of the forward-most axial point of the leading edge is located at or greater than sixty-five percent (65%) of the tip radius.

The unducted blade airfoil assembly of any preceding clause, wherein a maximum chord extending from the leading edge to the trailing edge is located at or greater than sixty-eight percent (68%) of the tip radius.

The unducted blade airfoil assembly of any preceding clause, wherein a maximum chord extending from the leading edge to the trailing edge is located at or greater than sixty-five percent (65%) of the tip radius.

The unducted blade airfoil assembly of any preceding clause, wherein a maximum chord extending from the leading edge to the trailing edge is located at or greater than sixty percent (60%) of the tip radius.

The unducted blade airfoil assembly of any preceding clause, wherein a maximum chord extending from the leading edge to the trailing edge is located at or greater than seventy-two percent (72%) of the tip radius.

The unducted blade airfoil assembly of any preceding clause, wherein a maximum chord extending from the leading edge to the trailing edge is located at or greater than seventy-five percent (75%) of the tip radius.

The unducted blade airfoil assembly of any preceding clause, wherein the trailing edge comprises a sculpted trailing edge feature.

The unducted blade airfoil assembly of any preceding clause, wherein the blade airfoil is arranged around a longitudinal axis and rotates about the longitudinal axis in a rotational direction, and wherein a tip leading edge of the blade airfoil is circumferentially offset in a direction opposite the rotational direction relative to a circumferential location of the forward-most axial point.

The unducted blade airfoil assembly of any preceding clause, wherein a chordwise fractional distance from the leading edge of a maximum thickness of an blade airfoil section of the blade airfoil is minimum in a tip portion of the blade airfoil.

The unducted blade airfoil assembly of any preceding clause, wherein a fractional chord location of a maximum thickness of the blade airfoil is located furthest forward relative to the leading edge in the tip portion.

The unducted blade airfoil assembly of any preceding clause, wherein the blade airfoil is a guide vane.

The unducted blade airfoil assembly of any preceding clause, wherein the blade airfoil is arranged around a longitudinal axis and rotates about the longitudinal axis in a rotational direction, and wherein the blade airfoil includes a tip portion, and wherein the leading edge in the tip portion leans in a direction opposite the rotational direction.

The unducted blade airfoil assembly of any preceding clause, wherein the blade airfoil is arranged around a longitudinal axis and rotates about the longitudinal axis in a rotational direction, and wherein the blade airfoil includes a tip portion, and wherein a circumferential coordinate of the leading edge in the tip portion leans in a direction opposite the rotational direction.

The unducted blade airfoil assembly of any preceding clause, wherein the blade airfoil is arranged around a longitudinal axis and rotates about the longitudinal axis in a rotational direction, and wherein the blade airfoil comprises a tip portion, and wherein the tip portion leans in a direction opposite the rotational direction.

The unducted blade airfoil assembly of any preceding clause, wherein circumferential coordinates of the leading edge in a radial direction monotonically increase relative to a circumferential coordinate of the forward-most axial point of the leading edge in a direction away from a rotational direction of the blade airfoil at or beyond an $R/R_{tip}$ value of 0.6.

The unducted blade airfoil assembly of any preceding clause, wherein circumferential coordinates of the leading edge in a radial direction monotonically increase relative to a circumferential coordinate of the forward-most axial point of the leading edge in a direction away from a rotational direction of the blade airfoil at or beyond an $R/R_{tip}$ value of 0.65.

The unducted blade airfoil assembly of any preceding clause, wherein circumferential coordinates of the leading edge in a radial direction monotonically increase relative to a circumferential coordinate of the forward-most axial point of the leading edge in a direction away from a rotational direction of the blade airfoil at or beyond an $R/R_{tip}$ value of 0.68.

The unducted blade airfoil assembly of any preceding clause, wherein circumferential coordinates of the leading edge in a radial direction monotonically increase relative to a circumferential coordinate of the forward-most axial point of the leading edge in a direction away from a rotational direction of the blade airfoil at or beyond an $R/R_{tip}$ value of 0.72.

The unducted blade airfoil assembly of any preceding clause, wherein, in a tip portion of the blade airfoil, circumferential coordinates of the leading edge increase monotonically in a direction away from the rotational direction of the blade airfoil, as a radial distance increases.

An unducted blade airfoil assembly for a gas turbine engine, the blade airfoil assembly comprising: a blade airfoil defining a leading edge and a trailing edge, and further defining a root and a tip; and at least one of a radial location of a forward-most axial point of the leading edge when the blade airfoil is oriented at a design orientation for subsonic cruise operation or a maximum chord extending from the leading edge to the trailing edge is located at or greater than sixty-five percent (65%) of a tip radius of the blade airfoil.

An unducted blade airfoil assembly for a gas turbine engine, the blade airfoil assembly comprising: a blade airfoil defining a leading edge and a trailing edge, and extending in span from a root to a tip; and wherein a radial location of a forward-most axial point of the leading edge is located at or greater than fifty percent (50%) of the span of the blade airfoil when the blade airfoil is oriented at a design orientation for subsonic cruise operation.

An unducted blade airfoil assembly for a gas turbine engine, the blade airfoil assembly comprising: a blade airfoil defining a leading edge and a trailing edge, and extending in span from a root to a tip; wherein a radial location of a forward-most axial point of the leading edge is located at or greater than fifty-five percent (55%) of the span of the blade airfoil when the blade airfoil is oriented at the design orientation for subsonic cruise operation.

An unducted blade airfoil assembly for a gas turbine engine, the blade airfoil assembly comprising: a blade airfoil defining a leading edge and a trailing edge, and extending in span from a root to a tip; wherein a radial location of a forward-most axial point of the leading edge is located at or greater than sixty percent (60%) of the span of the blade when the blade is oriented at the design orientation for subsonic cruise operation.

An unducted blade airfoil assembly for a gas turbine engine, the blade airfoil assembly comprising: a blade airfoil defining a leading edge and a trailing edge, and extending in span from a root to a tip, wherein a maximum chord extending from the leading edge to the trailing edge is located at or greater than fifty percent (50%) of the span of the blade airfoil.

An unducted blade airfoil assembly for a gas turbine engine, the blade airfoil assembly comprising: a blade airfoil defining a leading edge and a trailing edge, and extending in span from a root to a tip, wherein a maximum chord extending from the leading edge to the trailing edge is located at or greater than fifty-five percent (55%) of the span of the blade airfoil.

An unducted blade airfoil assembly for a gas turbine engine, the blade airfoil assembly comprising: blade airfoil defining a leading edge and a trailing edge, and extending in span from a root to a tip, wherein a maximum chord extending from the leading edge to the trailing edge is located at or greater than sixty percent (60%) of the span of the blade airfoil.

An unducted blade airfoil assembly, comprising: a blade airfoil having spaced-apart pressure and suction sides extending radially in span from a root to a tip, and extending axially in chord between spaced apart leading and trailing edges, and wherein the blade airfoil comprises a forward-most axial point; and wherein the blade airfoil is arranged around a longitudinal axis and rotates about the longitudinal axis in a rotational direction, and wherein a tip leading edge of the blade airfoil is circumferentially offset in a direction opposite the rotational direction relative to a circumferential location of the forward-most axial point.

The unducted blade airfoil assembly of the preceding clause, wherein the forward-most axial point is defined when the blade airfoil is oriented at a design orientation for subsonic cruise operation.

The unducted blade airfoil assembly of any preceding clause, wherein the forward-most axial point is radially located at or greater than fifty percent of a tip radius of the blade airfoil.

The unducted blade airfoil assembly of any preceding clause, wherein the forward-most axial point is radially located at or greater than fifty-five percent of a tip radius of the blade airfoil.

The unducted blade airfoil assembly of any preceding clause, wherein the forward-most axial point is radially located at or greater than fifty-eight percent of a tip radius of the blade airfoil.

The unducted blade airfoil assembly of any preceding clause, wherein the forward-most axial point is radially located at or greater than sixty percent of a tip radius of the blade airfoil.

The unducted blade airfoil assembly of any preceding clause, wherein the forward-most axial point is radially located at or greater than forty percent of the span of the blade airfoil.

The unducted blade airfoil assembly of any preceding clause, wherein the forward-most axial point is radially located at or greater than forty-five percent of the span of the blade airfoil.

The unducted blade airfoil assembly of any preceding clause, wherein the forward-most axial point is radially located at or greater than forty-eight percent of the span of the blade airfoil.

The unducted blade airfoil assembly of any preceding clause, wherein the forward-most axial point is radially located at or greater than fifty percent of the span of the blade airfoil.

The unducted blade airfoil assembly of any preceding clause, wherein a thickness of the blade airfoil is defined as a distance measured between the pressure side and the suction side, and wherein the blade airfoil comprises a maximum thickness, and wherein a chordwise fractional distance is defined from the leading edge, and wherein the chordwise fractional distance to the maximum thickness is minimum in a tip portion of the blade airfoil.

The unducted blade airfoil assembly of any preceding clause, wherein the blade airfoil comprises a tip portion extending radially from the forward-most axial point to the tip, and wherein a maximum thickness of the blade airfoil in at least a portion of the tip portion for a chord extending from the leading edge to the trailing edge is located between five percent to thirty percent of the chord as measured from the leading edge.

The unducted blade airfoil assembly of any preceding clause wherein the trailing edge comprises a sculpted trailing edge feature.

The unducted blade airfoil assembly of any preceding clause, wherein the blade airfoil comprises a tip portion extending radially from the forward-most axial point to the tip, and wherein a thickness ratio of an blade airfoil section is defined as a thickness of the blade airfoil section divided by a maximum thickness of the blade airfoil section, and wherein the thickness ratio of any blade airfoil section in the tip portion is greater than 0.8 at a chord fraction between 0.05 and 0.16.

The unducted blade airfoil assembly of any preceding clause, wherein the blade airfoil comprises a tip portion extending radially from the forward-most axial point to the tip, and wherein a maximum thickness for at least a portion of the blade airfoil in the tip portion is located between 0.05 and 0.40 chord fraction.

The unducted blade airfoil assembly of any preceding clause, wherein a maximum thickness for at least a portion of the blade airfoil in the tip portion is located between 0.05 and 0.30 chord fraction.

The unducted blade airfoil assembly of any preceding clause, wherein a maximum thickness for at least a portion of the blade airfoil in the tip portion is located between 0.05 and 0.25 chord fraction.

The unducted blade airfoil assembly of any preceding clause, wherein a maximum thickness for at least a portion of the blade airfoil in the tip portion is located between 0.05 and 0.20 chord fraction.

The unducted blade airfoil assembly of any preceding clause, wherein a maximum thickness for at least a portion of the blade airfoil in the tip portion is located between the leading edge and 0.40 chord fraction.

The unducted blade airfoil assembly of any preceding clause, wherein a maximum thickness for at least a portion of the blade airfoil in the tip portion is located between the leading edge and 0.30 chord fraction.

The unducted blade airfoil assembly of any preceding clause, wherein a maximum thickness for at least a portion of the blade airfoil in the tip portion is located between the leading edge and 0.25 chord fraction.

The unducted blade airfoil assembly of any preceding clause, wherein a maximum thickness for at least a portion of the blade airfoil in the tip portion is located between the leading edge and 0.20 chord fraction.

The unducted blade airfoil assembly of any preceding clause, wherein a maximum thickness for at least twenty-five percent (25%) of a radial extent of the tip portion of the blade airfoil is located forward of 0.40 chord fraction as measured from the leading edge.

The unducted blade airfoil assembly of any preceding clause, wherein a maximum thickness for at least fifty percent (50%) of a radial extent of the tip portion of the blade airfoil is located forward of 0.40 chord fraction as measured from the leading edge.

The unducted blade airfoil assembly of any preceding clause, wherein a maximum thickness for at least sixty-seven percent (67%) of a radial extent of the tip portion of the blade airfoil is located forward of 0.40 chord fraction as measured from the leading edge.

The unducted blade airfoil assembly of any preceding clause, wherein a maximum thickness for at least seventy-five percent (75%) of a radial extent of the tip portion of the blade airfoil is located forward of 0.40 chord fraction as measured from the leading edge.

The unducted blade airfoil assembly of any preceding clause, wherein a maximum thickness for at least twenty-five percent (25%) of a radial extent of the tip portion of the blade airfoil is located forward of 0.30 chord fraction as measured from the leading edge.

The unducted blade airfoil assembly of any preceding clause, wherein a maximum thickness for at least fifty percent (50%) of a radial extent of the tip portion of the blade airfoil is located forward of 0.30 chord fraction as measured from the leading edge.

The unducted blade airfoil assembly of any preceding clause, wherein, a maximum thickness for at least sixty-seven percent (67%) of a radial extent of the tip portion of the blade airfoil is located forward of 0.30 chord fraction as measured from the leading edge.

The unducted blade airfoil assembly of any preceding clause, wherein, a maximum thickness for at least seventy-five percent (75%) of a radial extent of the tip portion of the blade airfoil is located forward of 0.30 chord fraction as measured from the leading edge.

The unducted blade airfoil assembly of any preceding clause, wherein a maximum thickness for at least twenty-five percent (25%) of a radial extent of the tip portion of the blade airfoil is located forward of 0.25 chord fraction as measured from the leading edge.

The unducted blade airfoil assembly of any preceding clause, wherein a maximum thickness for at least fifty percent (50%) of a radial extent of the tip portion of the blade airfoil is located forward of 0.25 chord fraction as measured from the leading edge.

The unducted blade airfoil assembly of any preceding clause, wherein a maximum thickness for at least sixty-seven percent (67%) of a radial extent of the tip portion of the blade airfoil is located forward of 0.25 chord fraction as measured from the leading edge.

The unducted blade airfoil assembly of any preceding clause, wherein a maximum thickness for at least seventy-five percent (75%) of a radial extent of the tip portion of the blade airfoil is located forward of 0.25 chord fraction as measured from the leading edge.

The unducted blade airfoil assembly of any preceding clause, wherein the blade airfoil is a guide vane.

The unducted blade airfoil assembly of any preceding clause, wherein the blade airfoil is arranged around a longitudinal axis and rotates about the longitudinal axis in a rotational direction, and wherein the leading edge in the tip portion leans in a direction opposite the rotational direction.

The unducted blade airfoil assembly of any preceding clause, wherein a chordwise fractional distance from the leading edge of a maximum thickness of an blade airfoil section of the blade airfoil is minimum in a tip portion of the blade airfoil.

The unducted blade airfoil assembly of any preceding clause, wherein a chordwise fractional location of a maximum thickness of the blade airfoil is located furthest forward as measured from the leading edge in the tip portion.

The unducted blade airfoil assembly of any preceding clause, wherein the blade airfoil is arranged around a longitudinal axis and rotates about the longitudinal axis in a rotational direction, and wherein the blade airfoil includes a tip portion, and wherein the leading edge in the tip portion leans in a direction opposite the rotational direction.

The unducted blade airfoil assembly of any preceding clause, wherein the blade airfoil is arranged around a longitudinal axis and rotates about the longitudinal axis in a rotational direction, and wherein the blade airfoil includes a tip portion, and wherein a circumferential coordinate of the leading edge in the tip portion leans in a direction opposite the rotational direction.

The unducted blade airfoil assembly of any preceding clause, wherein circumferential coordinates of the leading edge monotonically increase, in a radial direction, relative to a circumferential coordinate of the forward-most axial point of the leading edge in a direction away from a rotational direction of the blade beyond a $R/R_{tip}$ value of 0.6.

The unducted blade airfoil assembly of any preceding clause, wherein circumferential coordinates of the leading edge monotonically increase, in a radial direction, relative to a circumferential coordinate of the forward-most axial point of the leading edge in a direction away from a rotational direction of the blade beyond a $R/R_{tip}$ value of 0.65.

The unducted blade airfoil assembly of any preceding clause, wherein circumferential coordinates of the leading edge monotonically increase, in a radial direction, relative to a circumferential coordinate of the forward-most axial point of the leading edge in a direction away from a rotational direction of the blade beyond a $R/R_{tip}$ value of 0.68.

The unducted blade airfoil assembly of any preceding clause, wherein circumferential coordinates of the leading edge monotonically increase, in a radial direction, relative to a circumferential coordinate of the forward-most axial point of the leading edge in a direction away from a rotational direction of the blade beyond a $R/R_{tip}$ value of 0.72.

The unducted blade airfoil assembly of any preceding clause, wherein circumferential coordinates of the leading edge monotonically increase, in a radial direction, relative to a circumferential coordinate of the forward-most axial point of the leading edge in a direction away from a rotational direction of the blade airfoil for at least a sub-portion of the tip portion beyond a tip radius value of the forward-most axial point.

The unducted blade airfoil assembly of any preceding clause, wherein circumferential coordinates of a first sub-portion of the leading edge in a tip portion of the blade airfoil immediately outboard of the forward-most axial point lean in the rotational direction of the blade airfoil, and for a second sub-portion of the leading edge in the tip portion immediately outboard of the first sub-portion extending to the tip, circumferential coordinates of the leading edge monotonically increase, in a radial direction, in a direction away from the rotational direction.

The unducted blade airfoil assembly of any preceding clause, wherein the first sub-portion comprises less than twenty-five percent (25%) of the tip portion.

The unducted blade airfoil assembly of any preceding clause, wherein the first sub-portion comprises less than fifteen percent (15%) of the tip portion.

The unducted blade airfoil assembly of any preceding clause, wherein the first sub-portion comprises less than ten percent (10%) of the tip portion.

The unducted blade airfoil assembly of any preceding clause, wherein the blade airfoil comprises a tip portion, and wherein a thickness ratio of an blade airfoil section is defined as a thickness of the blade airfoil section divided by a maximum thickness of the blade airfoil section, and wherein the thickness ratio of the tip portion is greater than 0.8 at 0.16 chord fraction.

The unducted blade airfoil assembly of any preceding clause, wherein the maximum thickness of an blade airfoil section of the blade airfoil is between 0.05 and 0.2 chord fraction as measured from the leading edge.

The unducted blade airfoil assembly of any preceding clause, wherein the thickness ratio is equal to or greater than 0.8 at a chord fraction of 0.05 as measured from the leading edge.

The unducted blade airfoil assembly of any preceding clause, wherein the thickness ratio is equal to or greater than 0.8 at a chord fraction between 0.05 and 0.16 as measured from the leading edge.

The unducted blade airfoil assembly of any preceding clause, wherein the thickness ratio is equal to or greater than 0.8 at a chord fraction between 0.05 and 0.15 as measured from the leading edge.

The unducted blade airfoil assembly of any preceding clause, wherein the thickness ratio is equal to or greater than 0.8 at a chord fraction between 0.05 and 0.10 as measured from the leading edge.

An unducted blade airfoil assembly, comprising: an blade airfoil having a root, a medial portion, and a tip portion, the blade airfoil having spaced-apart pressure and suction sides extending radially in span from the root to a tip defined in the tip portion, and extending axially in chord between spaced apart leading and trailing edges; and wherein a thickness of the blade airfoil is defined as a distance measured between the pressure side and the suction side, and wherein a thickness ratio is defined as the thickness of an blade airfoil section divided by a maximum thickness at the blade airfoil section, and wherein the thickness ratio in the tip portion is equal to or greater than 0.85 over a chord fraction range extending from a chord fraction location midway between the leading edge and a chord fraction location of the maximum thickness to a chord fraction location midway between the trailing edge and the chord fraction location of the maximum thickness.

The unducted blade airfoil assembly of any preceding clause, wherein the thickness ratio of the blade airfoil section in the tip portion is equal to or greater than 0.8 over a chord fraction range extending from the chord fraction location of the maximum thickness to a chord fraction located midway between the leading edge or the trailing edge.

The unducted blade airfoil assembly of any preceding clause, wherein the thickness of the blade in the tip portion remains within ten percent of the maximum thickness between 0.08 and 0.58 chord fractions as measured from the leading edge.

The unducted blade airfoil assembly of any preceding clause, wherein the thickness ratio is equal to or greater than 0.9 between chord fractions 0.08 and 0.58 as measured from the leading edge.

The unducted blade airfoil assembly of any preceding clause, wherein the thickness ratio in the tip portion is equal to or greater than 0.90 over a chord fraction range extending from a chord fraction location midway between the leading edge and a chord fraction location of the maximum thickness to a chord fraction location midway between the trailing edge and the chord fraction location of the maximum thickness.

The unducted blade airfoil assembly of any preceding clause, wherein the thickness ratio in the tip portion is equal to or greater than 0.85 between chord fractions 0.08 and 0.58 as measured from the leading edge.

The unducted blade airfoil assembly of any preceding clause, wherein the thickness of the blade airfoil in the tip portion remains within twenty percent of the maximum thickness of the blade airfoil in the tip portion between 0.08 and 0.58 chord fractions as measured from the leading edge.

The unducted blade airfoil assembly of any preceding clause, wherein a position of a point on an blade airfoil section at the tip at a twenty-five percent (25%) chord fraction on a meanline of the blade airfoil section is such that a magnitude of a circumferential offset of the point from a pitch change axis of the blade airfoil is greater than a magnitude of an axial offset of the point from the pitch change axis, and wherein the point is located axially aft of the pitch change axis.

The unducted blade airfoil assembly of any preceding clause, wherein at least a portion of the blade airfoil in the tip portion lies axially forward and circumferentially away from the direction of rotation of the blade airfoil relative to a pitch change axis of the blade airfoil.

An aircraft comprising: a fuselage; a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; an airfoil section having an effective quarter chord point QC; a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein $0.07 \leq RL/D \leq 2.0$ and θ is between 187° and 342°; and wherein the rotating blades include: at least one blade airfoil defining a leading edge and a trailing edge, a root and a tip; wherein a forward-most axial point of the leading edge is radially located at or greater than sixty percent of a tip radius of the at least one blade airfoil when the at least one blade airfoil is oriented at a design orientation for subsonic cruise operation; the at least one blade airfoil further having spaced-apart pressure and suction sides extending radially in span from the root to the tip, and extending axially in chord between the leading edge and the trailing edge, and wherein the at least one blade airfoil comprises a forward-most axial point; and wherein the at least one blade airfoil is arranged around a longitudinal axis and rotates about the longitudinal axis in a rotational direction, and wherein a tip leading edge of the at least one blade airfoil is circumferentially offset in a direction opposite the rotational direction relative to a circumferential location of the forward-most axial point.

The aircraft of the preceding clause, wherein the at least one blade airfoil comprises a tip portion extending radially from the forward-most axial point to the tip, and wherein a maximum thickness of the at least one blade airfoil in the tip portion for a chord extending from the leading edge to the trailing edge is located between five percent to thirty percent of the chord relative to the leading edge.

The aircraft of any of the preceding two clauses, wherein a maximum chord extending from the leading edge to the trailing edge is located at or greater than sixty percent of the tip radius.

The aircraft of any of the preceding three clauses, wherein a thickness of the at least one blade airfoil is defined as a distance measured between the pressure side and the suction side, and wherein the at least one blade airfoil comprises a maximum thickness, and wherein a chordwise fractional distance is defined from the leading edge, and wherein the chordwise fractional distance to the maximum thickness is minimum in a tip portion of the at least one blade airfoil.

The aircraft of any of the preceding four preceding clauses, wherein the at least one blade airfoil includes all the rotating blades.

An aircraft, comprising: a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7; and wherein the rotating blades include: at least one blade airfoil defining a leading edge and a trailing edge, a root and a tip; wherein a forward-most axial point of the leading edge is radially located at or greater than sixty percent of a tip radius of the at least one blade airfoil when the at least one blade airfoil is oriented at a design orientation for subsonic cruise operation; the at least one blade airfoil further having spaced-apart pressure and suction sides extending radially in span from the root to the tip, and extending axially in chord between the leading edge and the trailing edge, and wherein the at least one blade airfoil comprises a forward-most axial point; and wherein the at least one blade airfoil is arranged around a longitudinal axis and rotates about the longitudinal axis in a rotational direction, and wherein a tip leading edge of the at least one blade airfoil is circumferentially offset in a direction opposite the rotational direction relative to a circumferential location of the forward-most axial point.

An aircraft, comprising: a fuselage; an airfoil extending from the fuselage, the airfoil having an airfoil section defining an effective quarter-chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D}+\frac{\left(\begin{array}{c}\sqrt{1.4161*\left[1.88978*\sin^2(\theta)-0.0875*\cos^2(\theta)+0.477*\sin(\theta)*\cos(\theta)\right]}+\\ 1.764*\sin(\theta)+0.19146*\cos(\theta)\end{array}\right)}{1.96*\sin^2(\theta)+0.7225*\cos^2(\theta)}>0$$

and $$\frac{RL}{D}+\frac{\left(\begin{array}{c}-\sqrt{1.4161*\left[1.88978*\sin^2(\theta)-0.0875*\cos^2(\theta)+0.477*\sin(\theta)*\cos(\theta)\right]}+\\ 1.764*\sin(\theta)+0.19146*\cos(\theta)\end{array}\right)}{1.96*\sin^2(\theta)+0.7225*\cos^2(\theta)}<0;$$

and wherein the rotating blades include: at least one blade airfoil defining a leading edge and a trailing edge, a root and a tip; wherein a forward-most axial point of the leading edge is radially located at or greater than sixty percent of a tip radius of the at least one blade airfoil when the at least one blade airfoil is oriented at a design orientation for subsonic cruise operation; the at least one blade airfoil further having spaced-apart pressure and suction sides extending radially in span from the root to the tip, and extending axially in chord between the leading edge and the trailing edge, and wherein the at least one blade airfoil comprises a forward-most axial point; and wherein the at least one blade airfoil is arranged around a longitudinal axis and rotates about the longitudinal axis in a rotational direction, and wherein a tip leading edge of the at least one blade airfoil is circumferentially offset in a direction opposite the rotational direction relative to a circumferential location of the forward-most axial point.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°; and wherein the rotating blades include:

at least one blade airfoil defining a leading edge and a trailing edge, a root and a tip;

wherein a forward-most axial point of the leading edge is radially located at or greater than sixty percent of a tip radius of the at least one blade airfoil when the at least one blade airfoil is oriented at a design orientation for subsonic cruise operation;

the at least one blade airfoil further having spaced-apart pressure and suction sides extending radially in span from the root to the tip, and extending axially in chord between the leading edge and the trailing edge, and wherein the at least one blade airfoil comprises a forward-most axial point; and wherein the at least one blade airfoil is arranged around a longitudinal axis and rotates about the longitudinal axis in a rotational direction, and wherein a tip leading edge of the at least one blade airfoil is circumferentially offset in a direction opposite the rotational direction relative to a circumferential location of the forward-most axial point.

2. The aircraft of claim 1, wherein 0.15≤RL/D.

3. The aircraft of claim 1, wherein the at least one blade airfoil comprises a tip portion extending radially from the forward-most axial point to the tip, and wherein a maximum thickness of the at least one blade airfoil in the tip portion for a chord extending from the leading edge to the trailing edge is located between five percent to thirty percent of the chord relative to the leading edge.

4. The aircraft of claim 1, wherein a maximum chord extending from the leading edge to the trailing edge is located at or greater than sixty percent of the tip radius.

5. The aircraft of claim 1, wherein a thickness of the at least one blade airfoil is defined as a distance measured between the pressure side and the suction side, and wherein the at least one blade airfoil comprises a maximum thickness, and wherein a chordwise fractional distance is defined from the leading edge, and wherein the chordwise fractional distance to the maximum thickness is minimum in a tip portion of the at least one blade airfoil.

6. The aircraft of claim 1, wherein the at least one blade airfoil includes all the rotating blades.

7. The aircraft of claim 1, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

8. The aircraft of claim 1, wherein the unducted fan propulsor is undermounted to the airfoil with one or more intermediate structures.

9. The aircraft of claim 1, wherein the P of the unducted fan propulsor is variable to accommodate different operating conditions.

10. An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7; and wherein the rotating blades include:

at least one blade airfoil defining a leading edge and a trailing edge, a root and a tip;

wherein a forward-most axial point of the leading edge is radially located at or greater than sixty percent of a tip radius of the blade airfoil when the blade airfoil is oriented at a design orientation for subsonic cruise operation;

the blade airfoil further having spaced-apart pressure and suction sides extending radially in span from the root to the tip, and extending axially in chord between the leading edge and the trailing edge, and wherein the blade airfoil comprises a forward-most axial point; and wherein the blade airfoil is arranged around a longitudinal axis and rotates about the longitudinal axis in a rotational direction, and wherein a tip leading edge of the blade airfoil is circumferentially offset in a direction opposite the rotational direction relative to a circumferential location of the forward-most axial point.

11. The aircraft of claim 10, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

12. The aircraft of claim 10, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

13. The aircraft of claim 10, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

14. An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein $0.065<RL/D<1.98$ and θ is between 187° and 340°; and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0;\text{ and}$$

wherein the rotating blades include:

at least one blade airfoil defining a leading edge and a trailing edge, a root and a tip;

wherein a forward-most axial point of the leading edge is radially located at or greater than sixty percent of a tip radius of the at least one blade airfoil when the at least one blade airfoil is oriented at a design orientation for subsonic cruise operation;

the at least one blade airfoil further having spaced-apart pressure and suction sides extending radially in span from the root to the tip, and extending axially in chord between the leading edge and the trailing edge, and wherein the at least one blade airfoil comprises a forward-most axial point; and wherein the at least one blade airfoil is arranged around a longitudinal axis and rotates about the longitudinal axis in a rotational direction, and wherein a tip leading edge of the at least one blade airfoil is circumferentially offset in a direction opposite the rotational direction relative to a circumferential location of the forward-most axial point.

* * * * *